US008065852B2

(12) United States Patent
Tonyan et al.

(10) Patent No.: US 8,065,852 B2
(45) Date of Patent: *Nov. 29, 2011

(54) NON-COMBUSTIBLE REINFORCED CEMENTITIOUS LIGHTWEIGHT PANELS AND METAL FRAME SYSTEM FOR ROOFING

(75) Inventors: Timothy D. Tonyan, Wheaton, IL (US); James M. Ullett, McHenry, IL (US); James E. Reicherts, Cary, IL (US)

(73) Assignee: U.S. Gypsum Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/916,565

(22) Filed: Oct. 31, 2010

(65) Prior Publication Data
US 2011/0041443 A1 Feb. 24, 2011

Related U.S. Application Data

(63) Continuation of application No. 11/319,748, filed on Dec. 29, 2005, now Pat. No. 7,841,148.

(60) Provisional application No. 60/647,017, filed on Jan. 27, 2005.

(51) Int. Cl.
*E04B 2/30* (2006.01)
(52) U.S. Cl. ............. 52/745.13; 52/309.13; 52/483.1; 52/653.1; 428/192; 106/735
(58) Field of Classification Search .......... 52/309.12, 52/309.13, 343, 344, 653.1, 293, 309, 414, 52/474, 483.1, 633, 745.05, 745.09, 745.1, 52/745.13; 428/60, 70, 192, 325; 106/735; 260/29.6
See application file for complete search history.

(56) References Cited

U.S. PATENT DOCUMENTS

| | | | |
|---|---|---|---|
| 1,684,624 | A | 9/1928 | Hayden |
| 2,230,823 | A | 2/1941 | Clements |

(Continued)

FOREIGN PATENT DOCUMENTS

| | | |
|---|---|---|
| CL | 33183 | 9/1982 |

(Continued)

OTHER PUBLICATIONS

Russian Office Action of Dec. 25, 2009, for RU 2007132186/03 (corresponding to U.S. Appl. No. 11/321,069) with concise statement of relevance.

(Continued)

*Primary Examiner* — Eileen D Lillis
*Assistant Examiner* — William Gilbert
(74) *Attorney, Agent, or Firm* — Novak Druce + Quigg, LLP; David J. Janci; Philip T. Petti

(57) ABSTRACT

A roofing system including horizontal or sloped metal framing members, for example, C-joists, U-joists, open web joists, or other metal frame systems that support a reinforced, lightweight, dimensionally stable SCP panel. The roofing system is non-combustible, water durable, mold and rot resistant, termite resistant and is capable of resisting shear loads equal to or exceeding shear loads provided by plywood or oriented strand board panels. The panels employ one or more layers of a continuous phase resulting from the curing of an aqueous mixture of inorganic binder, for example, calcium sulfate alpha hemihydrate, hydraulic cement, an active pozzolan and lime. The continuous phase is reinforced with glass fibers and contains lightweight filler particles, for example, ceramic microspheres.

21 Claims, 17 Drawing Sheets

U.S. PATENT DOCUMENTS

| | | | |
|---|---|---|---|
| 2,276,237 A | 3/1942 | Lowrey | |
| 2,410,922 A | 11/1946 | Balduf | |
| 2,541,784 A | 2/1951 | Shannon | |
| 2,590,687 A | 3/1952 | Crafton | |
| 2,856,766 A | 10/1958 | Huntley | |
| 2,883,852 A | 4/1959 | Midby | |
| 3,216,163 A | 11/1965 | Carew | |
| 3,397,497 A | 8/1968 | Shea | |
| 3,780,482 A | 12/1973 | DeLange | |
| 3,797,179 A | 3/1974 | Jackson | |
| 3,826,051 A | 7/1974 | Miller et al. | |
| 3,956,861 A | 5/1976 | Rasmussen | |
| 3,974,607 A | 8/1976 | Balinski | |
| 4,016,697 A | 4/1977 | Ericson | |
| 4,052,829 A | 10/1977 | Chapman | |
| 4,142,340 A | 3/1979 | Howard | |
| 4,239,396 A | 12/1980 | Arribau et al. | |
| 4,241,555 A | 12/1980 | Dickens et al. | |
| 4,276,730 A | 7/1981 | Lewis | |
| 4,379,729 A | 4/1983 | Cross | |
| 4,435,940 A | 3/1984 | Davenport | |
| 4,601,151 A | 7/1986 | Nunley et al. | |
| 4,647,496 A | 3/1987 | Lehnert et al. | |
| 4,707,961 A | 11/1987 | Nunley et al. | |
| 4,736,561 A | 4/1988 | Lehr et al. | |
| 4,783,942 A | 11/1988 | Nunley et al. | |
| 4,852,316 A | 8/1989 | Webb | |
| 4,982,545 A | 1/1991 | Stromback | |
| 4,986,051 A | 1/1991 | Meyer et al. | |
| 5,100,258 A | 3/1992 | VanWagoner | |
| 5,353,560 A | 10/1994 | Heydon | |
| 5,463,873 A | 11/1995 | Early et al. | |
| 5,507,427 A | 4/1996 | Burgett | |
| 5,584,153 A | 12/1996 | Nunley et al. | |
| 5,596,860 A | 1/1997 | Hacker | |
| 5,609,416 A | 3/1997 | Duckworth | |
| 5,657,597 A | 8/1997 | Loftus | |
| 5,687,538 A | 11/1997 | Frobosilo et al. | |
| 5,743,056 A | 4/1998 | Balla-Goddard et al. | |
| 5,768,841 A | 6/1998 | Swartz et al. | |
| 5,842,314 A | 12/1998 | Porter | |
| 5,913,788 A | 6/1999 | Herren | |
| 6,000,194 A | 12/1999 | Nakamura | |
| 6,009,677 A | 1/2000 | Anderson | |
| 6,073,410 A | 6/2000 | Schimpf et al. | |
| 6,151,855 A | 11/2000 | Campbell | |
| 6,187,409 B1 | 2/2001 | Mathieu | |
| 6,192,639 B1 | 2/2001 | Germain | |
| 6,226,946 B1 | 5/2001 | Stough et al. | |
| 6,241,815 B1 | 6/2001 | Bonen | |
| 6,260,322 B1 | 7/2001 | Lindsay | |
| 6,260,329 B1 | 7/2001 | Mills | |
| 6,269,608 B1 | 8/2001 | Porter | |
| 6,301,854 B1 | 10/2001 | Daudet et al. | |
| 6,412,247 B1 | 7/2002 | Menchetti | |
| 6,418,694 B1 | 7/2002 | Daudet et al. | |
| 6,421,968 B2 | 7/2002 | Degelsegger | |
| 6,488,792 B2 | 12/2002 | Mathieu | |
| 6,510,667 B1 | 1/2003 | Cottier et al. | |
| 6,536,168 B1 | 3/2003 | Cugini et al. | |
| 6,620,487 B1* | 9/2003 | Tonyan et al. | 428/192 |
| 6,691,478 B2 | 2/2004 | Daudet et al. | |
| 6,694,695 B2 | 2/2004 | Collins | |
| 6,761,001 B2 | 7/2004 | Mueller | |
| 6,761,005 B1 | 7/2004 | Daudet et al. | |
| 6,799,407 B2 | 10/2004 | Saldana | |
| 6,986,812 B2 | 1/2006 | Dubey et al. | |
| 7,845,130 B2 | 12/2010 | Tonyan et al. | |
| 7,849,648 B2 | 12/2010 | Tonyan et al. | |
| 7,849,649 B2 | 12/2010 | Tonyan et al. | |
| 7,849,650 B2 | 12/2010 | Tonyan et al. | |
| 7,870,698 B2 | 1/2011 | Tonyan et al. | |
| 2002/0088199 A1* | 7/2002 | Linn | 52/745.19 |
| 2003/0084637 A1 | 5/2003 | Daudet et al. | |
| 2003/0200721 A1* | 10/2003 | Gleeson et al. | 52/746.1 |
| 2004/0050006 A1 | 3/2004 | Park | |
| 2004/0074178 A1 | 4/2004 | Daudet et al. | |
| 2005/0064055 A1 | 3/2005 | Porter | |
| 2005/0064164 A1 | 3/2005 | Dubey et al. | |
| 2005/0086905 A1 | 4/2005 | Ralph et al. | |

FOREIGN PATENT DOCUMENTS

| | | |
|---|---|---|
| CL | 44335 | 11/1999 |
| CN | 1394167 | 1/2003 |
| CN | 1425836 | 6/2003 |
| CN | 1773036 | 5/2006 |
| GB | 2334045 | 8/1999 |
| JP | 59000430 | 1/1984 |
| JP | 7259243 | 10/1995 |
| JP | 2001107488 | 4/2001 |
| JP | 2001262773 | 9/2001 |
| JP | 2002180580 | 6/2002 |
| WO | 9708111 | 3/1997 |

OTHER PUBLICATIONS

Saruh Mazure editor/publisher, Walls & Ceilings,Higher Value, Posted on Sep. 27, 2001 on http://www.wconline.com/CDA/ArticleInformation/features/BNP by BNP Media, pp. 1-5, copyright 2005, BNP Media.

How Do I Design the Best Shear Wall, http://www.sureboard.com pp. 1-2 printed on Sep. 16, 2005, last modified Nov. 6, 2004 at 6:52 PM.

Saruh Mazure editor/publisher, Walls & Ceilings, Higher Value, Posted on Sep. 27, 2001 on http://www.wconline.com/CDA/ArticleInformation/features/BNP by BNP Media, pp. 1-4, copyright 2004, BNP Media.

ICC Evaluation Service, Inc., Legacy Report ER-5762, entitled Legacy report on the 1997 Uniform Building Code TM, the 2000 International Building Code, and the 2000 International Residential Code, pp. 1-2 Reissued Jul. 1, 2003.

ConcreteNetwork.com, Sheet Membranes, [online], [retrieved on May 15, 2007]. Retrieved from the Internet: < URL: http://www.concretenetwork.com/concrete/waterproofing_concrete_foundations/sheet_membranes.htm >.

ConcreteNetwork.com, Liquid Membranes, [online], [retrieved on May 15, 2007]. Retrieved from the Internet: < URL: http://www.concretenetwork.com/concrete/waterproofing_concrete_foundations/liquid_membranes.htm >.

TREMCO Global Sealants Division, [online], [retrieved on May 23, 2007]. Retrieved from the Internet: < http://www.tremcosealants.com/pressroom/kits.asp?id=4 >.

Applied Technologies, "Why Use a Polymer-modified Foundation Waterproofing Membrane?", [online], May 15, 2007 [retrieved on May 15, 2007]. Retrieved from the Internet: < http://www.appliedtechnologies.com/pages_blocks_v3_exp/index.cgi?Key=570&Field=ke... >.

Hydra-Guard Waterproofing System, published on or before May 19, 2007.

Hydra-Guard Waterproofing Membrane, published on or before May 19, 2007.

Protective Coatings, Poly Wall Crack Guard Systems, Dec. 9, 2005.

TREMCO Global Sealants Division, Fight Basement Moisture three ways, published on or before May 19, 2007.

GYPTEK, "Glass Microspheres", pp. 1-3, [online], [retrieved on Dec. 14, 2004]. Retrieved from the Internet <URL: http://www.gyptek.com/new_page_5.htm>.

Wood Floors OnLine.com, "Wood Floor Installation and Finishing Procedures", pp. 1-3, [online], [retrieved on Dec. 15, 2004]. Retrieved from the Internet <URL: http://www.woodfloorsonline.com/techtalk/installfin.html>.

NOFMA The Wood Flooring Manufacturers Association, EST. 1909, "Laying and Fastening the Flooring", pp. 1-3, [online], [retrieved on Dec. 15, 2004]. Retrieved from the Internet <URL: http://www.nofma.org/installation2.htm>.

CEM-STEEL, pp. 1-2, [online], [retrieved on Dec. 15, 2004]. Retrieved from the Internet <URL: http://www.architecturalproducts.com/cemsteel.htm>.

USG, "Fiberock Brand Underlayment—AQUA—Tough", pp. 1-2, [online], [retrieved on Dec. 15, 2004]. Retrieved from the Internet.

Underwriters Laboratories Inc. (UL), "Fire Tests of Building Construction and Materials", UL Standard for Safety, Dated Jun. 2, 1998, pp. tr1-tr4, 1-26 and A1-C2, Twelfth Edition, Northbrook, IL, United States.
Underwriters Laboratories Inc. (UL), Fire Resistance Ratings—ANSI/UL 263, Dec. 17, 2005, pp. 1-7, [online], [retrieved on Jan. 14, 2005]. Retrieved from the Internet <URL: http://database.ul.com/cgi-bin/XYV/template/LISEXT/1FRAME/showpage2.html?...>.
USG, "Important Fire Safety Information", pp. 1-5, [online], [retrieved on Jan. 14, 2005]. Retrieved from the Internet <URL: http://www.usg.com/Design_Solutions/2_2_13_typeXstdstestcerts.asp>.
USG, "How to Select the Best Residential Fire Separation Walls", 1990, pp. 1-6, [online], [retrieved on Jan. 14, 2005]. Retrieved from the Internet <URL: http://www.usg.com/Design_Solutions/2_2_8_separation wall.asp>.
USG, "Specifying the Most Important Walls in Your Building", 1991, pp. 1-8, [online], [retrieved on Jan. 14, 2005]. Retrieved from the Internet <URL: http://www.usg.com/Design_Solutions/2_2_7_importantwall.asp>.
USG, "Fire Wall Stands Up to Ultimate Test", 1995, pp. 1-3, [online], [retrieved on Jan. 14, 2005]. Retrieved from the Internet <URL: http://www.usg.com/Design_Solutions/2_2_4_ultimatetest.asp>.
USG, "Fire Resistance", pp. 1-5, [online], [retrieved on Jan. 14, 2005]. Retrieved from the Internet <URL: http://www.usg.com/Design_Solutions/2_2_10_fire_endure.asp>.
Brick Industry Association, Technical Notes 16 "Fire Resistance", Technical Notes on Brick Construction, Apr. 2002, pp. 1-12, [online], [retrieved on Jan. 11, 2005]. Retrieved from the Internet <URL: http://www..bia.org/BIA/technotes/t16.htm>.
Brick Industry Association, Technical Notes 16B "Calculated Fire Resistance", Technical Notes on Brick Construction, [Jun. 1991] (Reissued Aug. 1991), pp. 1-13, [online], [retrieved on Jan. 11, 2005]. Retrieved from the Internet <URL: http://www.bia.org/BIA/technotes/t16.htm>.
Brick Industry Association, Technical Notes 21 "Brick Masonry Cavity Walls", Technical Notes on Brick Construction, Aug. 1998, pp. 1-16, [online], [retrieved on Jan. 11, 2005]. Retrieved from the Internet <URL: http://www.bia.org/BIA/technotes/t21.htm>.
Gypsum Association, "Fire Resistance Design Manual", Apr. 2003, 17th Edition GA-600-2003, pp. 1-19 and 71-84, Washington D.C., United States.
"Differences in Drywall", Construction Dimensions p. 27-29 (Sep. 1983).
Submittal Sheet 09210, Imperial Brand Gypsum Base (Firecode and Firecode C Core), USG (1999).
Proprietary Gypsum Panel Products for Use in UL Classified Systems, Gypsum Association, GA-605 (Rev. Aug. 1, 2008).
Greenwell et al., Moisture Movement (Wicking) within Gypsum Wallboard, AWMA Control# 05-A-580-AWMA Abstract Submitted Sep. 17, 2004; URL:< oaspub.epa.gov/eims/eimscomm.getfile?p_download_id=446305>, retrieved from the internet Apr. 11, 2010.
Grabberman.com (http://web.archive.org/web/20040111002211/www.grabberman.com/metalscrews.htm) dated Oct. 23, 2003 as taken from archive.org. see p. 3.
Non-Final Office Action issued in U.S. Appl. No. 11/297,426 mailed Apr. 5, 2007.
Final Office Action issued in U.S. Appl. No. 11/297,426 mailed Nov. 14, 2007.
Advisory Action issued in U.S. Appl. No. 11/297,426 mailed Jun. 11, 2008.
Non-Final Office Action issued in U.S. Appl. No. 11/297,426 mailed Sep. 30, 2008.
Final Office Action issued in U.S. Appl. No. 11/297,426 mailed Jul. 6, 2009.
Non-Final Office Action issued in U.S. Appl. No. 11/297,426 mailed Jan. 6, 2010.
Notice of Allowance issued in U.S. Appl. No. 11/297,426 mailed Aug. 5, 2010.
Advisory Action issued in U.S. Appl. No. 11/297,426 mailed Oct. 27, 2009.
Restriction issued in U.S. Appl. No. 11/608,107 mailed Nov. 21, 2007.
Non-Final Office Action issued in U.S. Appl. No. 11/608,107 mailed Mar. 18, 2008.
Final Office Action issued in U.S. Appl. No. 11/608,107 mailed Nov. 12, 2008.
Advisory Action issued in U.S. Appl. No. 11/608,107 mailed Mar. 31, 2009.
Non-Final Office Action issued in U.S. Appl. No. 11/608,107 mailed Jul. 6, 2009.
Final Office Action issued in U.S. Appl. No. 11/608,107 mailed Dec. 23, 2009.
Advisory Action issued in U.S. Appl. No. 11/608,107 mailed May 12, 2010.
Notice of Allowance issued in U.S. Appl. No. 11/608,107 mailed Aug. 3, 2010.
Supplemental Notice of Allowability issued in U.S. Appl. No. 11/608,107 mailed Dec. 10, 2010.
Non-Final Office Action issued in U.S. Appl. No. 11/334,549 mailed Nov. 13, 2007.
Final Office Action issued in U.S. Appl. No. 11/334,549 mailed Oct. 2, 2008.
Advisory Action issued in U.S. Appl. No. 11/334,549 mailed Mar. 30, 2009.
Non-Final Office Action issued in U.S. Appl. No. 11/334,549 mailed Jun. 23, 2009.
Final Office Action issued in U.S. Appl. No. 11/334,549 mailed Dec. 17, 2009.
Advisory Action issued in U.S. Appl. No. 11/334,549 mailed May 11, 2010.
Notice of Allowance issued in U.S. Appl. No. 11/334,549 mailed Aug. 5, 2010.
Non-Final Office Action issued in U.S. Appl. No. 11/321,069 mailed Apr. 5, 2007.
Final Office Action issued in US Appl. No. 11/321,069 mailed Nov. 14, 2007.
Advisory Action issued in U.S. Appl. No. 11/321,069 mailed May 30, 2008.
Non-Final Office Action issued in U.S. Appl. No. 11/321,069 mailed Sep. 12, 2008.
Final Office Action issued in U.S. Appl. No. 11/321,069 mailed May 27, 2009.
Advisory Action issued in U.S. Appl. No. 11/321,069 mailed Oct. 14, 2009.
Non-Final Office Action issued in U.S. Appl. No. 11/321,069 mailed Dec. 8, 2009.
Notice of Allowance issued in U.S. Appl. No. 11/321,069 mailed Aug. 5, 2010.
Non-Final Office Action issued in U.S. Appl. No. 11/763,548 mailed Jun. 15, 2007.
Non-Final Office Action issued in U.S. Appl. No. 11/763,548 mailed Aug. 21, 2008.
Final Office Action issued in U.S. Appl. No. 11/763,548 mailed May 28, 2009.
Advisory Action issued in U.S. Appl. No. 11/763,548 mailed Oct. 15, 2009.
Non-Final Office Action issued in U.S. Appl. No. 11/763,548 mailed Dec. 16, 2009.
Notice of Allowance issued in U.S. Appl. No. 11/763,548 mailed Aug. 5, 2010.
Supplemental Notice of Allowance issued in U.S. Appl. No. 11/763,548 mailed Dec. 10, 2010.

* cited by examiner

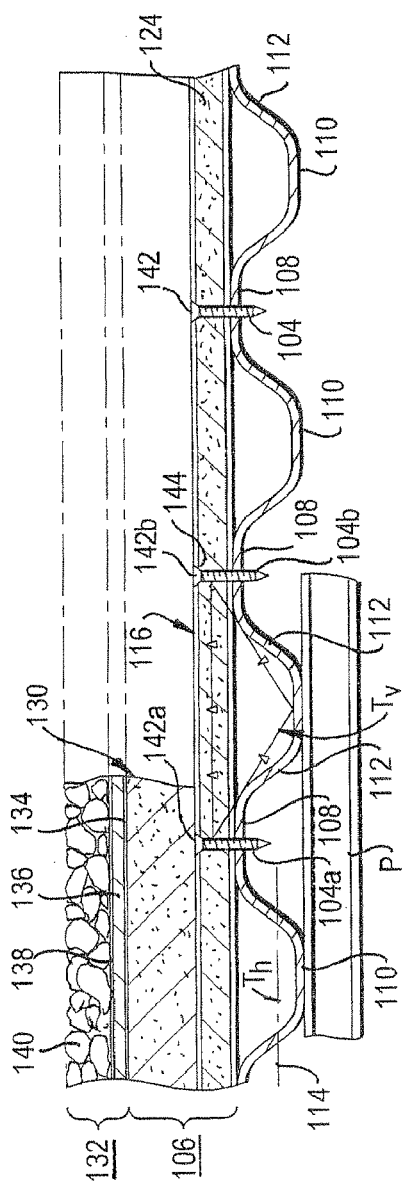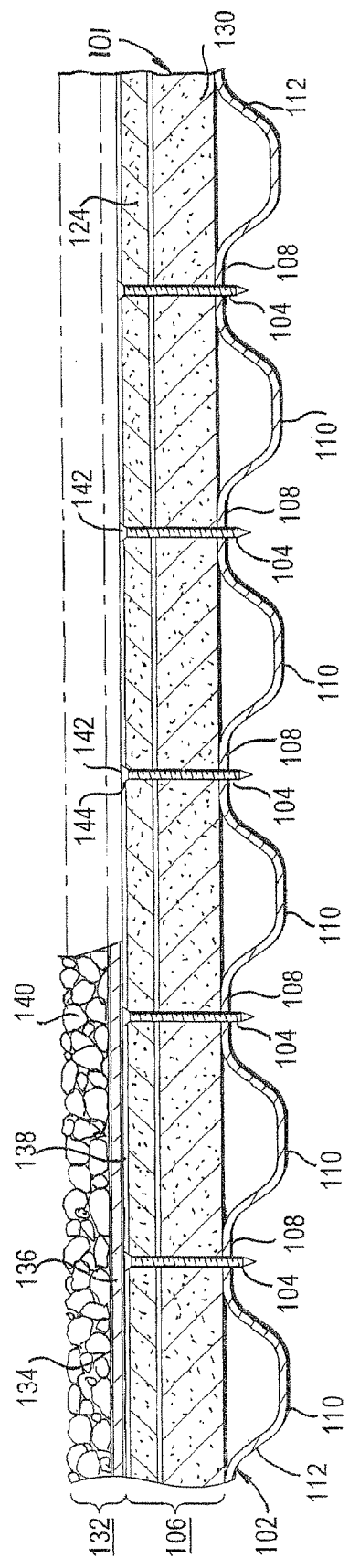

(BB)

(DD)

(CC)

(EE)

(FF)

TEST AT DESIGN LOAD

FLOOR AT FAILURE

FIG. 27
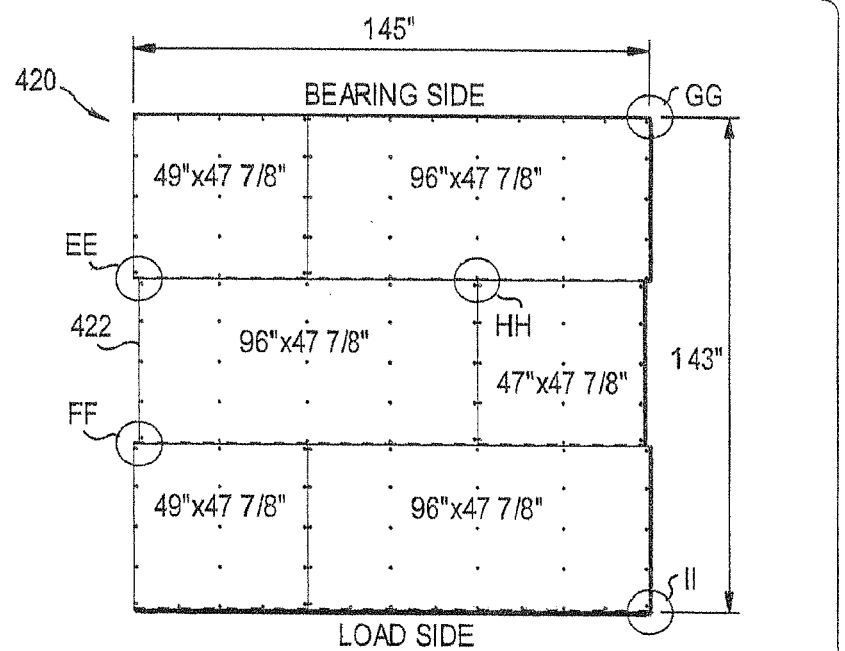
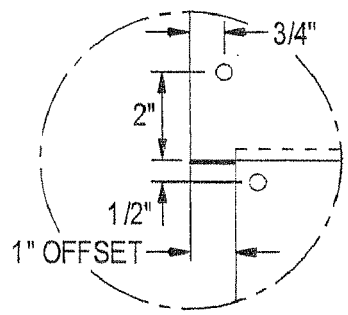
(EE)
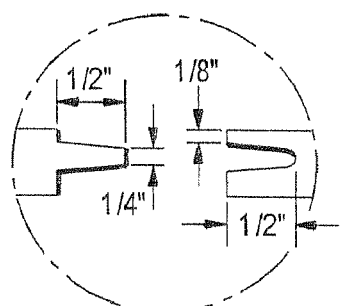
(FF)
"V" SHAPED 1/2" TONGUE
AND GROOVE JOINT
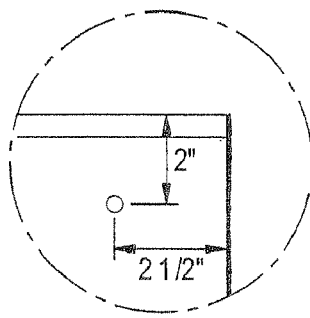
(GG)
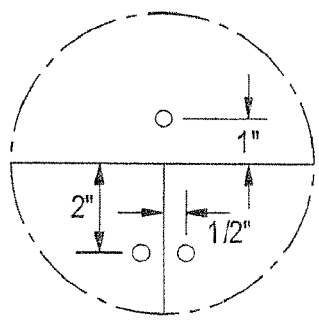
(HH)
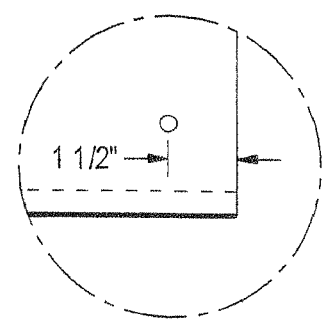
(II)

NON-COMBUSTIBLE REINFORCED CEMENTITIOUS LIGHTWEIGHT PANELS AND METAL FRAME SYSTEM FOR ROOFING

This application is a Continuation of U.S. patent application Ser. No. 11/319,748 filed Dec. 29, 2005 and claims the benefit of U.S. Provisional Patent Application No. 60/647,017, filed Jan. 27, 2005, each of which is incorporated herein by reference.

FIELD OF THE INVENTION

This invention relates generally to a roofing system comprising metal framing and lightweight structural cementitious panels, termed here as SCP panels, in residential and commercial construction. More particularly, the invention relates to a non-combustible roofing system, having panels mechanically or adhesively fastened to steel frame roofing systems. The panels provide a shear resistant diaphragm and axial load carrying roof element. The system typically provides the following advantageous performance attributes when used with steel framing: non-combustibility, water durability, mold resistance, and economy of building design that results in speed of assembly.

BACKGROUND OF THE INVENTION

Roof construction for commercial, residential, and industrial buildings, must meet performance standards generated by legislation primarily at the state and local levels through the adoption of state and local building codes which set forth very specific performance factors. In general, these performance standards are divided into two broad areas: (1) Sloped roofs, generally 30 degrees or greater from horizontal and (2) Flat roofs, 0 degrees to 30 degrees slope from horizontal.

The performance standards for flat roof construction vary slightly from area to area but generally conform to the following:

1. Vertical Load Strength: A roof must be able to carry a total load consisting of dead load plus live load and satisfy legislated design or performance values for the materials being utilized in the roof assembly. Example: Conventional steel roofs manufactured from 50,000 to 60,000 psi steel must not be stressed under working conditions beyond a flexural tensile stress of 20,000 psi.

2. Live Load Deflections: While supporting the designed dead load (weight of steel, built-up roof and insulation) the roof must not deflect under live load application more than 1/240th of the distance between the support members or less deflection as dictated by local building codes or other considerations.

Example: A roof supported by members 6'0" on center must not deflect more than 6'0"×12 in./ft.×1/240 equal 0.30" under live load application. Live loads will vary in different climate areas from 20 pounds per sq. ft. to 60 lbs./sq. ft., depending upon weather conditions.

3. Wind Up-Lift Resistance: Typically, the roof must resist negative and positive pressures applied to it and remain structurally serviceable. Performance values for this standard vary depending upon geographical areas, but in general, range from 30 psf uplift resistance (equivalent of 100 mph winds) to 90 psf uplift resistance (equivalent of 188 mph winds).

Typical steel roof assemblies have utilized sections formed from mild steel in patterns normally referred to as "Type A", "Type B", "Type AB", and the like. The common feature of the sections is a wide flat surface element, formed between stiffening ribs that provide the stiffness and strength to the section. The steel sections, supported by purlins, have been designed heretofore to meet strength requirements specified by building codes. The flat surfaces have been employed to provide a supporting surface for one or more layers of sheet material comprising a single board serving to insulate and provide a surface to which waterproof covering was attached.

A typical "Type A" section, for example, provides a flat portion of approximately 5 and ½ inches wide between 1 and ½ inch deep stiffening ribs spaced six inches apart. The "Type B, AB" and other sections are similar in profile to a Type A section except that the flat portions between stiffening ribs is progressively reduced in width to create a closer spacing of the stiffening ribs, increasing the load capacity for a given span. However, the width of rib openings on the top surface of the sheet, for example of a Type B section is greater than that of a Type A section.

The most efficient light gauge steel sections from a strength standpoint are those that have the greatest number of stiffening ribs per unit of width; the ultimate, being the symmetrical rib pattern sections, which have an equal distribution of steel above and below a neutral axis lying in a plane passing through the center of the sheet and disposed parallel with upper and lower surfaces of the sheet.

It may be mandatory in some cases, or desirable in other cases, for economy reasons, to utilize the roof assembly as a structural diaphragm to reinforce a building against lateral loads created by earthquake shocks (seismic), explosion forces or wind. In such application, the roof assembly is considered to be the plate web of a girder oriented in a horizontal plane with the perimeter members of the building serving as the compression and tension chords of the girder.

The diaphragm (plate web) strength of a given roof assembly is evaluated in terms of its ability to transfer diagonal tension stresses, which involves consideration of the shear resistance of the assembly, and in-plane deflection (referred to as "diaphragm deflection"), which is governed to a large extent by the "diaphragm stiffness" of the steel panel sections that are utilized. Diaphragm stiffness is related to the ability of the steel panel sections to resist distortion under load.

Since the flexural strength of a steel panel section is, to a large degree, a function of the depth of the section, it is naturally opposed to the reduction of depth (approaching a thin plane of steel) that contributes to diaphragm strength. The most efficient roof assemblies, from the standpoint of diaphragm strength, are those that can provide adequate flexural strength, utilizing steel sections with the maximum degree of effective steel in the diaphragm stress plane. Diaphragm stiffness increases proportionally to increases in the yield strength of the steel that is utilized, hence, steel sections made of high tensile steel are more effective than those made of mild steel.

Heavy gauge, mild steel (for example, 22 gauge, 20 gauge and 18 gauge with a stress limit of 20,000 lbs. per square inch) is generally employed in the manufacture of Type A and similar flat profile sections. This has been due to the fact that heavier gauges are necessary to satisfy the minimum steel thickness to element-width ratios that govern the design of light gauge steel sections. On the other hand, the symmetrical rib pattern sections have smaller unit-width elements and hence can utilize the more effective high tensile strength steel in lighter gauges providing greater working strength per pound of steel.

Asphalt built-up roof coverings usually consist of several layers of asphalt-saturated felt with a continuous layer of hot-mopped asphalt between the layers of felt. The top layer of such a roof covering may consist of a hot mopping of asphalt or coal tar pitch only, a top pouring of hot asphalt with slag or gravel embedded therein, or a mineral-surfaced cap sheet embedded in a hot mopping of asphalt.

Built-up roofs cannot generally be applied directly to steel roof sections and consequently an underlayment of substrate material has typically been installed after the steel roof sections have been secured in place. There have been embodiments which have employed a single sheet of underlayment material generally referred to as "rigid roof insulation board". However, the insulating efficiency of the rigid board insulation is generally directly related to the density of the materials of which it is constructed, lighter density materials providing proportionally better insulation for a given thickness. Strength characteristics of these boards are inversely related to reductions in density. Accordingly, the lighter the density of these boards, the less the strength. Since "rigid insulation board" has heretofore been used over steel to provide a suitable base for roofing as well as insulation, the board had to be manufactured in densities that would compromise the minimum requirements for strength versus insulation values. Typical of compromised situations, the "rigid insulation boards" have been made to be adequate, but under the circumstances could not be fully efficient in the performance of either function, i.e., providing thermal insulation and strength.

U.S. Pat. No. 4,736,561 to Lehr et al., U.S. Pat. No. 4,783,942 to Nunley et al., U.S. Pat. No. 4,601,151 to Nunley et al. and U.S. Pat. No. 4,707,961 to Nunley et al. disclose horizontally disposed multi-layer flat building roofs.

Steel framing can be used to build purlins and trusses like conventional framing for both flat and sloped roofs. Roof trusses made of steel framing resemble wood framing with rafters and ceiling joists formed of C-shaped studs. A ridge member constructed of a C-shaped stud inside a track section connects the rafters. In a conventional wood or steel framed house having peaked roof sections, the rafters are perpendicular to and rest on the load-bearing walls. The end walls and interior walls parallel to the rafters are typically non-load bearing.

A number of approaches have been proposed to utilize steel roof trusses. In U.S. Pat. No. 2,541,784 issued to H. S. Shannon, "C" or "U" shaped sections are used for the bottom chord member as well as the top chord members of a building truss.

U.S. Pat. No. 4,435,940 issued to Jeanne A. Davenport, et al. and U.S. Pat. No. 4,982,545 to Gustaf M. Stromback describe truss arrangements wherein the horizontal, bottom chord section of a roof truss is formed from a U-shaped section of sheet steel. In the Stromback patent the ends of the legs of the U are tightly folded back to form a double thick edge. The top chords of both the Davenport and the Stromback patent are formed of inverted U-shaped sections having flanges projecting outwardly from the ends of each of the legs to provide greater rigidity.

U.S. Pat. No. 5,463,873 to Early, et al. discloses a metal roof truss wherein, the bottom horizontal chord piece and the top chord pieces are of substantially uniform shape and cross-section. Both the bottom and top chord members include a radiused or rolled hem at the end of the legs. Further, one or more stiffening ribs are formed in the side walls of the chord members.

The trusses are typically arranged parallel to each other with 8", 16" or 24" between their respective centers, depending upon the load characteristics that the roof must accommodate. A sheathing material such as plywood or OSB is then fastened to the upper chords of the trusses using nails, screws or other mechanical fasteners to form the roof surface. To prevent the trusses from twisting or moving laterally, small pieces of wood or metal, known as purlins, are commonly nailed between adjacent trusses. Insulation is sometimes installed between the trusses and sheathing, drywall, plasterboard, etc. may then be applied to the bottom of the joists to form a ceiling for the space located under the roof truss system.

The outside dimensions of the metal framing members and studs, and the weight or gauge of the member or stud, vary. Typically the members are fabricated to be approximately 4 inches wide by 2 inches deep, corresponding thereby to the width and depth of wood framing and stud members, in which case the lips may extend ¼ to ½ inch from the sides of the studs. Eighteen to 20 gauge metal may be used for light gauge, residential construction and commercial wall construction. A heavier range of metal gauge is used in some residential and commercial framing and particularly in multiple story commercial construction.

Metal roofing framing members have been modified to include saw or punch slots, tabs and brackets intended to facilitate the interconnection of these studs and framing member to adjoining studs and framing members and/or to cross-bars and other non-framing members that serve to reinforce the studs and framing members. Known connectors, including bracket, plate and tie connectors, presently used to tie together and interconnect metal studs, are generally drilled and screwed on site. Drilling and screwing unsecured connectors pose a safety risk to the worker since the connectors tend to be small and light, and thus easily grabbed and spun by a hand drill.

It is known to place plywood or OSB sheathing on cold formed, light gauge steel roofing trusses. However, plywood and OSB are combustible.

U.S. Pat. No. 6,620,487 to Tonyan et al., incorporated herein by reference in its entirety, discloses a reinforced, lightweight, dimensionally stable structural cement panel (SCP) capable of resisting shear loads when fastened to framing equal to or exceeding shear loads provided by plywood or oriented strand board panels. The panels employ a core of a continuous phase resulting from the curing of an aqueous mixture of calcium sulfate alpha hemihydrate, hydraulic cement, an active pozzolan and lime, the continuous phase being reinforced with alkali-resistant glass fibers and containing ceramic microspheres, or a blend of ceramic and polymer microspheres, or being formed from an aqueous mixture having a weight ratio of water-to-reactive powder of 0.6/1 to 0.7/1 or a combination thereof. At least one outer surface of the panels may include a cured continuous phase reinforced with glass fibers and containing sufficient polymer spheres to improve nailability or made with a water-to-reactive powders ratio to provide an effect similar to polymer spheres, or a combination thereof.

U.S. Pat. No. 6,241,815 to Bonen, incorporated herein by reference in its entirety, also discloses formulations useful for SCP panels.

U.S. patent application Ser. No. 10/666,294, incorporated herein by reference, discloses a multi-layer process for producing structural cementitious panels (SCP's or SCP panels), and SCP's produced by such a process. After one of an initial deposition of loosely distributed, chopped fibers or a layer of slurry upon a moving web, fibers are deposited upon the slurry layer. An embedment device mixes the recently deposited fibers into the slurry, after which additional layers of slurry, then chopped fibers are added, followed by more embedment. The process is repeated for each layer of the board, as desired.

There is a need for an economical, easy to assemble, durable and non-combustible total framing and roofing system.

SUMMARY OF THE INVENTION

The present invention relates to a system for residential and light commercial construction including a metal frame and lightweight SCP panel roof sheathing. This roof sheathing is made from a mixture of inorganic binder and lightweight fillers. In particular it relates to a structural cementitious panel (SCP) mechanically and/or adhesively fastened to a roof framing system that acts as a shear resistant diaphragm and axial load carrying element. Selecting a combination of a metal frame with SCP panels achieves a synergy of a completely non-combustible roofing system. ASTM E119 establishes standard methods of performing tests to determine resistance of building materials to fire. However, by a fully non-combustible horizontal shear diaphragm on light gauge cold rolled (or cold formed) metal frame is meant a system in which all elements pass ASTM E-136. For example, the roof system may include SCP panels employed with a metal roof framing system employing any standard light-gauge steel C-channels, U-channels, 1-beams, square tubing, and light-gauge prefabricated building sections, such as roof trusses or open web bar joists, or corrugated metal sheeting.

The present system having a horizontal shear diaphragm on light gauge cold rolled (or cold formed) metal frame also is typically water durable. Preferably the horizontal shear diaphragm load carrying capacity of a system of the present invention will not be lessened by more than 25% (more preferably will not be lessened by more than 20%) when exposed to water in a test wherein a 2 inch head of water is maintained over ¾ inch thick SCP panels fastened on a 10 foot by 20 foot metal frame for a period of 24 hours. In this test, the 2 inch head is maintained by checking, and replenishing water, at 15 minute intervals.

Preferably the system of the present invention will not absorb more than 0.7 pounds per square foot of water when exposed to water in a test wherein a 2 inch head of water is maintained over ¾ inch thick SCP panels fastened on a 10 foot by 20 foot metal frame for a period of 24 hours. In this test, the 2 inch head is maintained by checking, and replenishing water, at 15 minute intervals.

Also, combining non-combustible SCP panels with metal framing results in an entire system that resists swelling due to moisture. Preferably in the system of the present invention a 10 foot wide by 20 foot long by ¾ inch thick diaphragm of the SCP panels attached to a 10 foot by 20 foot metal frame will not swell more than 5% when exposed to a 2 inch head of water maintained over the SCP panels fastened on the metal frame for a period of 24 hours. In this test, the 2 inch head is maintained by checking, and replenishing water, at 15 minute intervals.

Also, the present roof system of a diaphragm of SCP panel on metal frame leads to a mold and mildew resistant roof system. Preferably every component of the system of the present invention meets ASTM G-21 in which the system achieves approximately a rating of 1 and meets ASTM D-3273 in which the system achieves approximately a rating of 10. Preferably the system of the present invention supports substantially zero bacteria growth when clean.

Another preferred attribute of the present roof system of a diaphragm of SCP panel on metal frame is that preferably it is inedible to termites.

The system of the present invention may employ single layer or multi-layer SCP panels. In the multi-layer SCP panel the layers may be the same or different. For example, the SCP panel may have an inner layer of a continuous phase and at least one outer layer of a continuous phase on each opposed side of the inner layer, wherein at least one outer layer on each opposed side of the inner layer has a higher percentage of glass fibers than the inner layer. This has the ability to stiffen, strengthen and toughen the panel.

In contrast to plywood, the present system has the advantage of potentially being non-directional. In other words, the panels of the present system may be placed with their long dimension parallel or perpendicular to the metal trusses of the frame without losing strength or load carrying characteristics. Thus, the ability of the system to support dead and live loads without breaking is the same regardless of the orientation of the SCP panel on the metal framing.

Moreover, adding sound attenuating material or gypsum drywall can improve the sound insulation provided by the SCP roofs. This can especially reduce IIC (impact noise). Typical materials to add include roof mats (to make a roof which is non-combustible from the bottom), FIBEROCK AQUATOUGH brand panels (available from US Gypsum Corporation, Chicago, Ill.) (to make a non-combustible roof), or acoustical plaster (to make a non-combustible roof).

As the thickness of the board affects its physical and mechanical properties, e.g., weight, load carrying capacity, racking strength and the like, the desired properties vary according to the thickness of the board. Thus, for example, the desired properties which a shear rated panel with a nominal, thickness of 0.75 inches (19.1 mm) or 0.50 inches (12.5 mm) should meet include the following.

When used for roofs, a typical panel when tested according to ASTM 661 and American Plywood Association (APA) Test Method S-1 over a span of 16 inches (406.4 mm) on centers, typically has an ultimate load capacity greater than 550 lbs (250 kg) under static loading, an ultimate load capacity greater than 400 lbs (182 kg) under impact loading and a deflection of less than 0.078 inches (1.98 mm) under both static and impact loading with a 200 lb (90.9 kg) load.

A 4×8 ft, ¾ inch thick panel (1.22×2.44 m, 19.1 mm thick) typically weighs no more than 156 lbs (71 kg) and preferably no more than 144 lbs (65.5 kg).

Typical compositions for embodiments of panels of the present invention which achieve the combination of low density, improved flexural strength, and nailability/cuttability comprise inorganic binder (examples—gypsum-cement, Portland cement or other hydraulic cements) having, distributed throughout the full thickness of the panel, selected glass fibers, lightweight fillers (examples—hollow glass microspheres, hollow ceramic microspheres and/or perlite uniformly), and superplasticizer/high-range water reducing admixtures (examples—polynapthalene sulfonates, poly acrylates, etc.).

The panels may be single layer panels or multilayer panels. A typical panel is made from a mixture of water and inorganic binder with the selected glass fibers, lightweight ceramic microspheres and superplasticizer throughout the mixture. Other additives such as accelerating and retarding admixtures, viscosity control additives may optionally be added to the mixture to meet the demands of the manufacturing process involved.

A single or multi layer panel may also be provided with a sheet of mesh, e.g. fiber glass mesh if desired.

In embodiments having multiple (two or more) layers, the composition of the layers may be the same or different. For example, a multi-layer panel structure may be created to contain at least one outer layer having improved nailability and cutability. This is provided by using a higher water-toreactive powder (defined below) ratio in making the outer layer(s) relative to the core of the panel. A small thickness of the skin coupled with a small dosage of polymer content may improve the nailability without necessarily failing the non-combustibility test. Of course, dosages of polymer content would lead to failure of the product in the non-combustibility test.

The glass fibers can be used alone or in combination with other types of non-combustible fibers such as steel fibers.

Connecting the SCP panels directly or indirectly to the metal framing may achieve a composite action such that the metal framing and panels work together to carry greater loads.

In its method respects, the present invention comprises a method of making the non-combustible roofing system of the present invention, comprising placing the SCP panel on metal roofing elements.

The present invention has an unexpected advantage in cold weather performance. Conventional cementitious panels can be brittle in cold weather. Thus, installing such panels in cold weather would require careful handling by the construction workers during installation. However, in the present system the SCP panels can preferably withstand being installed on metal roofing elements when the ambient temperature is less than 32 degrees F. (0 degrees C.), or even less than 20 degrees F. (minus 7.5 degrees C.) without cracking. This is a very significant advantage because it facilitates building in harsh climates in winter thus increasing builder productivity. The present SCP panels can preferably withstand being subjected to normal rough treatment during installation at these cold temperatures. For instance, at these cold temperatures placing the SCP panel may include a step of dropping the panel on the metal roofing elements, e.g., trusses, such that at least one end of the panel falls in free fall at least 2 feet, typically at least 3 feet, for example, 3 to 4 feet without cracking. For example, this occurs when one end of the panel is placed on one or more metal roofing elements and then the opposing other end is released to drop in free fall on one or more metal roofing elements.

For use in roofing construction, SCP panels should meet building code standards for shear resistance, load capacity, water-induced expansion and resistance to combustion, as measured by recognized tests, such as ASTM E72, ASTM 661, and ASTM C 1185 or equivalent, as applied to structural plywood sheets. SCP panels are also tested under ASTM E-136 for non-combustibility—plywood does not meet this test.

Typically, the nominal racking shear strength of a 0.5 inch (12.7 mm) thick panel measured by the ASTM E72 test using the appropriate metal studs, fasteners, stud spacing and fastener spacing typically is at least 720 lbs per lineal foot (1072 kg per lineal meter).

The SCP panel should be capable of being cut with the circular saws used to cut wood.

The SCP panel should be dimensionally stable when exposed to water, i.e., it should expand as little as possible, preferably less than 0.1% as measured by ASTM C 1185.

The SCP panel should provide a bondable substrate for roofing materials.

The SCP panel should be non-combustible as determined by ASTM E136.

After curing for 28 days, the flexural strength of a 0.75 inch (19. mm) thick SCP panel having a dry density of 65 lb/ft$^3$ (1041 kg/m$^3$) to 90 lb/ft$^3$ (1442 kg/m$^3$) or 65 lb/ft$^3$ (1041 kg/m$^3$) to 95 lb/ft$^3$ (1522 kg/m$^3$) after being soaked in water for 48 hours should be at least 1000 psi (7 MPa), e.g. at least 1300 psi (9 MPa) preferably at least 1650 psi (11.4 MPa), more preferably at least 1700 psi (11.7 MPa), as measured by ASTM C 947. The panel should retain at least 75% of its dry strength.

A non-combustible roof tile, e.g., concrete shingles, composite slate tiles, etc. or other noncombustible roof covering, may be applied over the SCP roof sheathing material to achieve a completely non-combustible roof assembly.

When the SCP panels are laid side by side on a roof truss, a seam forms between abutting SCP panels. Where the seam is parallel to the roof trusses, and lies between the roof trusses, H-shaped clips may be employed to assist is supporting the panels at the seam. Such H-shaped clips are commonly used in seams between plywood roofing panels. However, due to the higher stiffness of SCP panels relative to plywood panels, an advantage of the present invention is that fewer H-shaped clips are employed with SCP panels than would be employed with comparably sized plywood panels, or in some instances the H-shaped clips are omitted.

Water tests show systems employing SCP panels show water does not go through the panel. This makes the panels useful for permanent or temporary roofs. The present invention permits flat or sloped cement roofs. In contrast, it is impossible to make a sloped cement roof with cement and pan construction.

BRIEF DESCRIPTION OF THE DRAWINGS

This specification includes the following drawings where like numbered elements may or may not be the same.

FIG. 6B is a cross-sectional view of a fourth form of the non-combustible roofing system of the present invention comprising a roof assembly wherein insulation material is secured over the structural cementitious panel (SCP) panel.

FIG. 6C is a cross-sectional view of a fifth form of the non-combustible roofing system of the present invention comprising a roof assembly wherein structural cementitious panel (SCP) panel is secured over insulation material in the non-combustible roofing system of the present invention.

FIG. 27 shows one of the SCP Floors used in the AISI TS-7 tests.

DETAILED DESCRIPTION OF THE INVENTION

The present invention relates to systems having SCP panels employed on metal frames. The frames may be any metal, e.g., steel or galvanized steel, framing systems suitable for supporting roofing.

Figure 1:
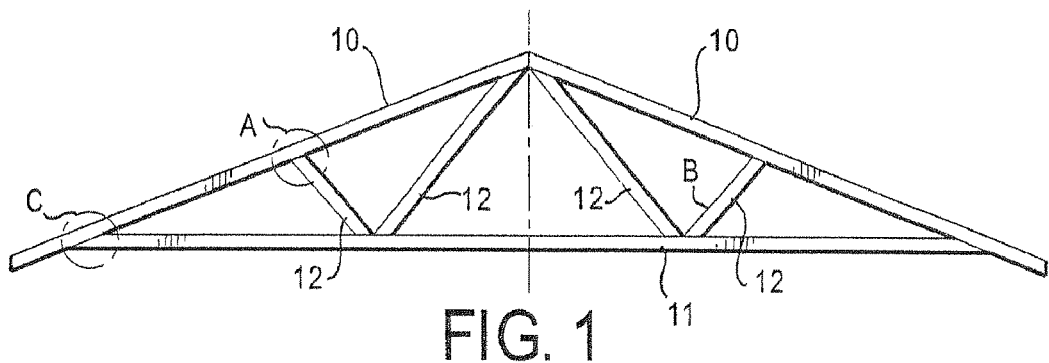
FIG. 1 shows a side view of a typical roof truss for employing with a structural cementitious panel (SCP) panel in a first embodiment of the non-combustible roofing system of the present invention.
Figure 2:
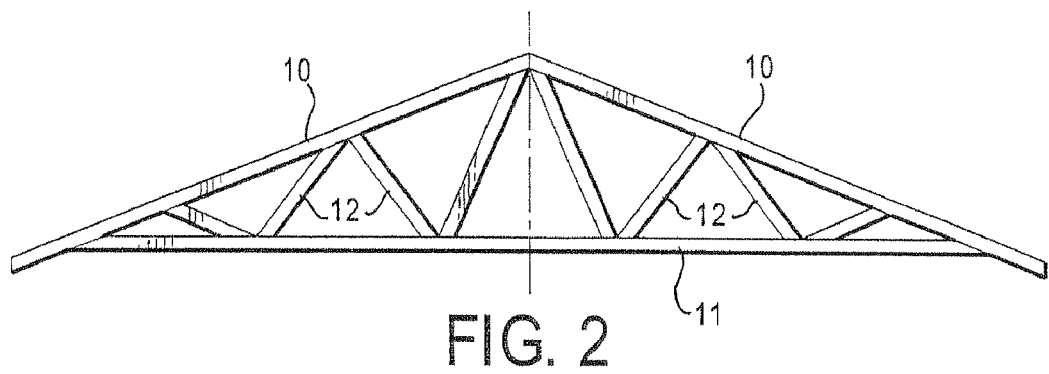
FIG. 2 shows a side view of a second form of typical roof truss for employing with a structural cementitious panel (SCP) panel in a second embodiment of the non-combustible roofing system of the present invention.

FIGS. 1 and 2 show in side elevation two forms of conventional metal roof trusses that may be employed with SCP panels according to first and second embodiments of the present invention. A conventional metal beam presently in use with roof trusses is constructed from 300 MPa mild steel strip material of 230 mm width and 0.9 mm thickness. The conventional beam for roof trusses such as shown in FIGS. 1 and 2 has an upper chord 10 constituted by a beam supported from a lower chord 11 by web members 12. When erected upon a building the lower chord 11 spans wall frames (not shown) and is fixed on the wall frames so that a load carried upon the upper chords 10, intended as roof batten fixing portions for the roof, are subjected to axial compressive force as well as bending moment where engaged by the web members 12. Portion A of FIG. 1 is where the upper end of the webs 12 rest within upper chords 10 of the truss. Portion B of FIG. 1 is where the lower end of the webs 12 rest within lower chords 11 of the truss. Portion C of FIG. 1 shows securing the lower chord 11 to the upper chord 10 and to the top plate (not shown) of a wall structure. The upper chord 10, lower chord 11 and webs 12 are typically roll formed from sheet metal. Chords 10, 11 and webs 12 may be secured by bolts (not shown).

FIG. 3 is a schematic side view of a single layer SCP panel 20 for employing with metal framing in the non-combustible roofing systems of the present invention.

Figure 3A:
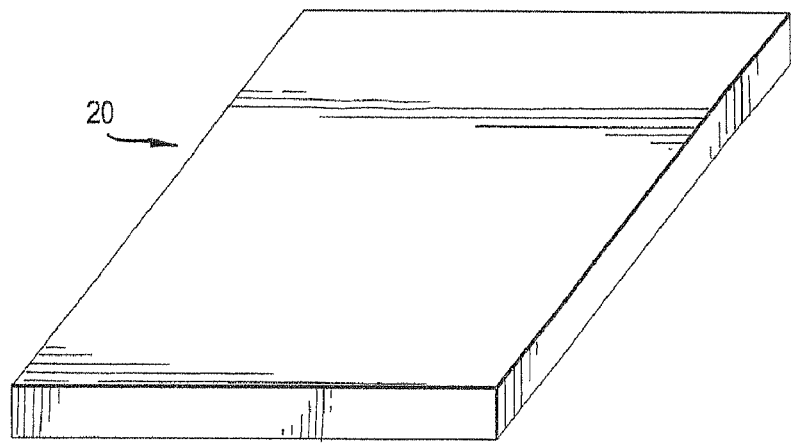
FIG. 3A is a schematic side view of a single layer SCP panel for employing with metal framing in the non-combustible roofing systems of the present invention.
Figure 3B:
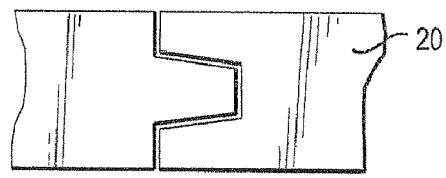
FIGS. 3B-3D illustrate a typical design and dimensions of tongue and groove employed in a ¾ inch (19.1 mm) thick SCP panel (with dimensions in inches).
Figure 3C:
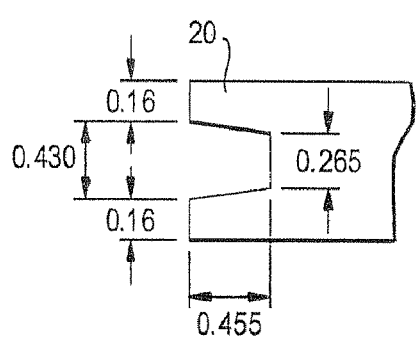
Figure 3D:
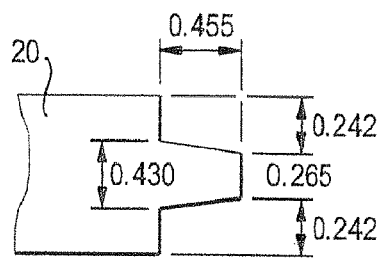
Figure 4:
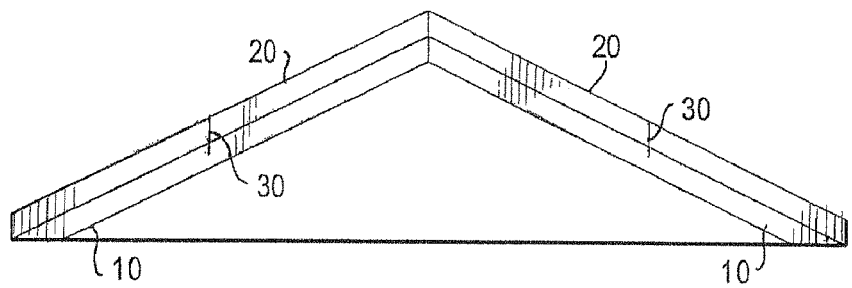
FIG. 4 is a side elevation of the SCP panel of FIG. 3A supported on metal framing of FIG. 1 in the non-combustible roofing system of the present invention.

FIG. 4 is a side elevational view of single-layer SCP panels 20 of FIG. 3 supported on metal framing, in particular upper chords 10, of FIG. 1 in the system of the present invention. For illustrative purposes fasteners 30 are schematically shown attaching SCP panels 20 to upper chords 10. In practice the roof may be mechanically or adhesively attached to the upper chords 10.

Figure 5:
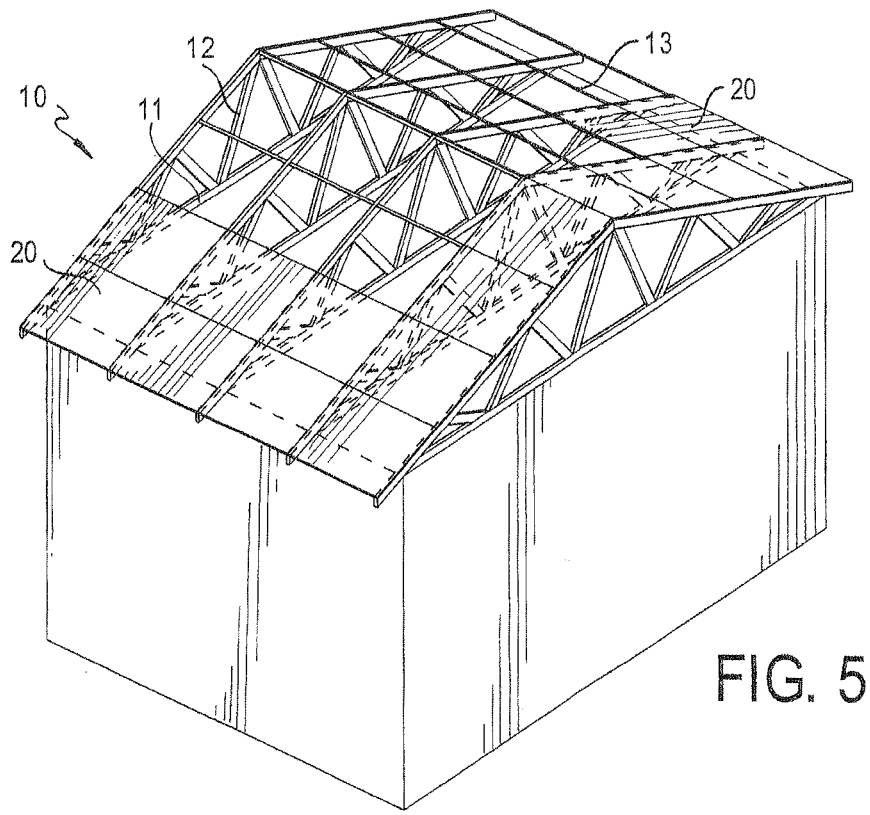
FIG. 5 shows an isometric view of SCP panels of FIG. 3A supported on metal framing of FIG. 2 in the non-combustible roofing system of the present invention.

FIG. 5 shows an isometric view of SCP panels 20 of FIG. 3 supported on and attached to metal framing of FIG. 2 in the non-combustible roofing system of the present invention. The metal framing has roof trusses having the upper chord 10 constituted by a beam supported from the lower chord 11 by web members 12. It also has purlins 13 attached to the roof trusses. FIG. 5 shows the SCP panels 20 parallel to the purlins 13. In an embodiment not shown, the SCP panels 20 of FIG. 5 could be applied such that they are rotated 90 degrees relative to the purlins 13.

Figure 6A:
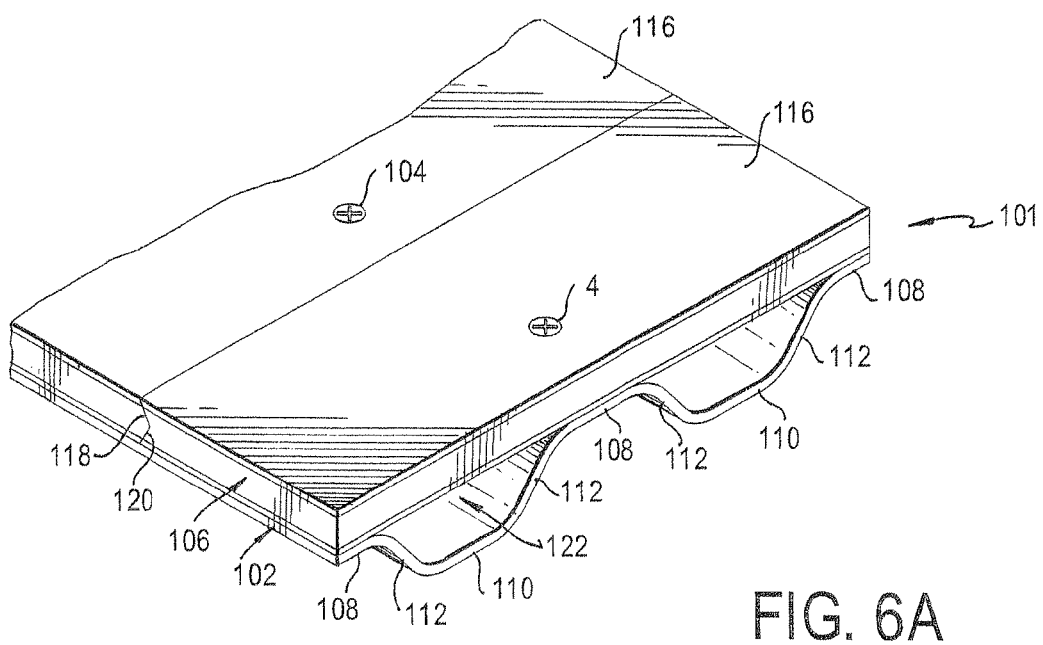
FIG. 6A is a perspective view of a third form of the non-combustible roofing system of the present invention comprising a roof assembly wherein a structural cementitious panel (SCP) panel is mechanically connected to a corrugated sheet.

FIG. 6A shows a third embodiment of the present invention wherein the numeral 101 generally designates a composite roof assembly comprising a corrugated sheet 102 supported from below by a purlin P (see FIG. 6B) and secured from above by mechanical fasteners 104 to SCP panel material 106.

Corrugated sheet 102 typically has flat portions 108 and 110 of substantially equal length joined by connector portions 112 providing straight, parallel, regular, and equally curved ridges and hollows. This configuration has a substantially equal distribution of surface area of the corrugated sheet above and below a neutral axis 114 (as seen in FIG. 6B).

FIG. 6A shows a single sheet 106 made of SCP panels 116 of the present invention.

Optionally the panels 116 have a tongue 118 and groove 120 formed on opposite edges thereof to provide for continuous interlocking of roofing substrate panels to create a barrier against pitch leakage, to minimize joint movement under moving and concentrated loads, and to provide a resistance to wind up-lift forces.

The formation of a built-up roof generally involves application of asphalt or other suitable adhesive material to the substrate for forming a waterproof covering to which may be applied a protective layer of natural gravel or suitable natural aggregate.

In the particular embodiment of the invention illustrated in FIG. 6A, SCP panels 116 have sufficient strength to create a structural bridge over the wide rib openings 122. As illustrated in FIG. 6A, spaced screws 104, 104a, and 104b, having screw heads 142, 142a, and 142b are oriented to form a series of generally triangular shaped horizontally disposed trusses (for example, truss $T_h$ shown as the horizontal line between screws 104a and 104b) and a series of vertically disposed trusses $T_v$ throughout the length and width of spans between spaced purlins P to increase the resistance to horizontal and vertical planar deflection of the roof. SCP panel 116 is described in more detail below.

The form of the device illustrated in FIG. 6B is similar to that of FIG. 6A except that a layer or sheet 130 of thermal insulation material is positioned over the SCP panels 116 and suitable roof covering is applied thereto. Sheet 130 of insulation material typically comprises noncombustible insulation material, for example, mineral fiber or fiberglass and the like.

Some of the more common roof covers include slate, composition or wood shingles, composition roofing paper, roofing granules and tile. The type of roof material selected depends to a large extent upon the expense that can be justified in order to secure required performance on the particular building. The particular roof covering 132 illustrated in the drawing comprises a layer of asphalt 134, applied to the surface of the substrate 106, over which is laid a suitable roofing membrane 136. The second layer 138 of hot asphalt or other suitable adhesive material is applied over membrane 136 and a layer 140 of gravel or other suitable surfacing material is applied thereto.

In the form of the invention illustrated in FIG. 6C the substrate 106 comprises a SCP panel 116 positioned over a sheet of insulation material 130. In the form of the invention of FIG. 6B or FIG. 6C the substrate is secured to upper ridge portions of the corrugated sheet 102 by threaded screws 104 having enlarged heads 142.

If desired, adhesive may be applied onsite or pre-applied and covered with removable strips to aside of the SCP panel for attaching the SCP panel to the flat portions 108 (FIG. 6B) of corrugated sheet in place of or in addition to screws or for attaching the SCP panel to other metal framing members, e.g., joists.

Figure 7:
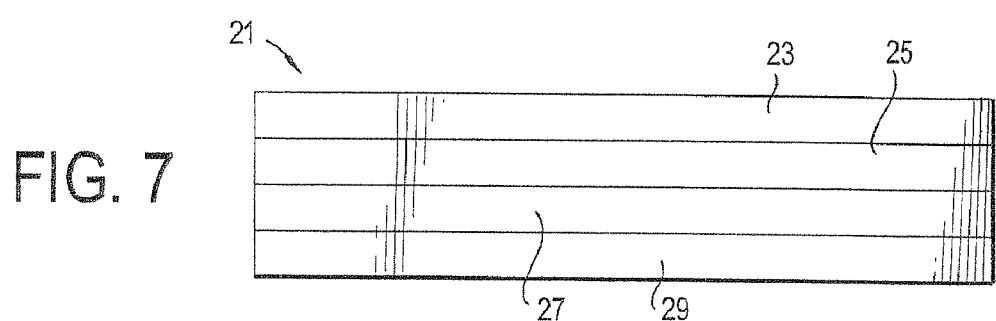
FIG. 7 shows a schematic side view of a multi-layer SCP panel for employing with metal framing in the non-combustible roofing system of the present invention.
Figure 6D:
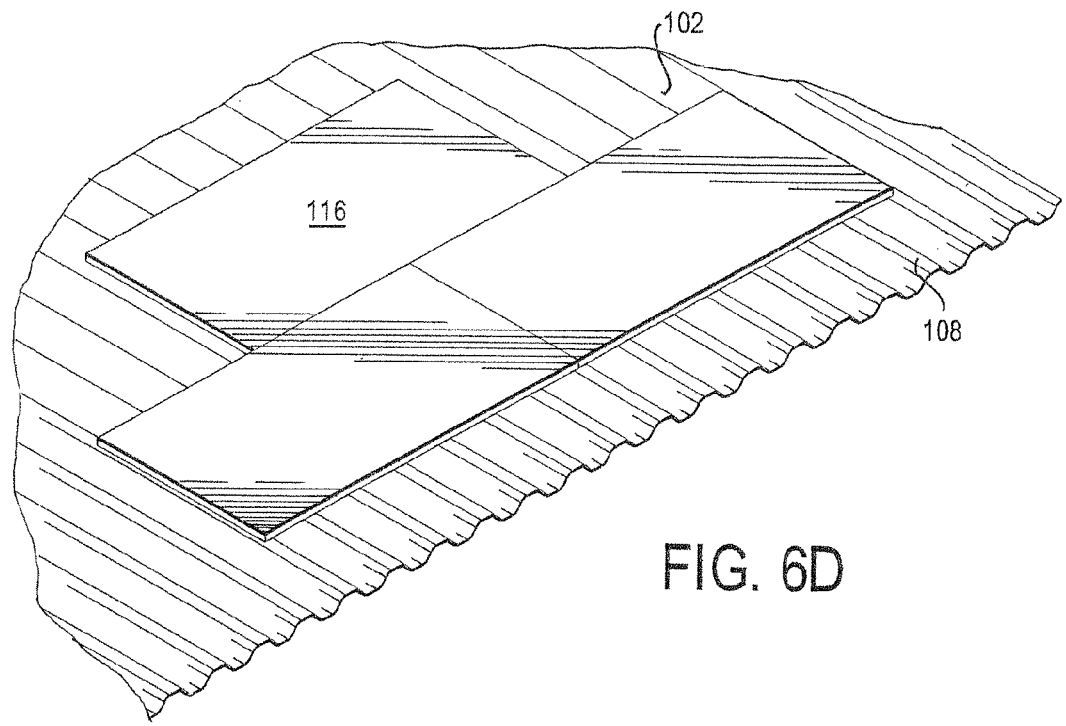
FIG. 6D shows a perspective view of SCP panels of FIG. 6A attached to the flat portions of corrugated sheet.
Figure 6E:
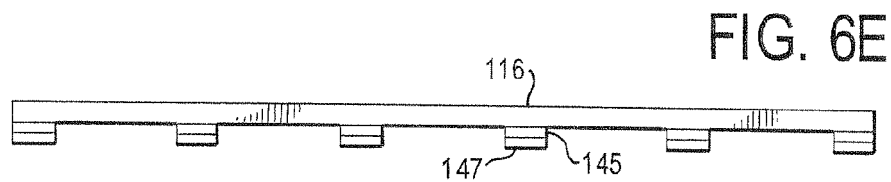
FIG. 6E is a side view of the SCP panel of FIG. 6D prior to use and shows that prior to use adhesive strips are covered with removable protective strips.
Figure 11:
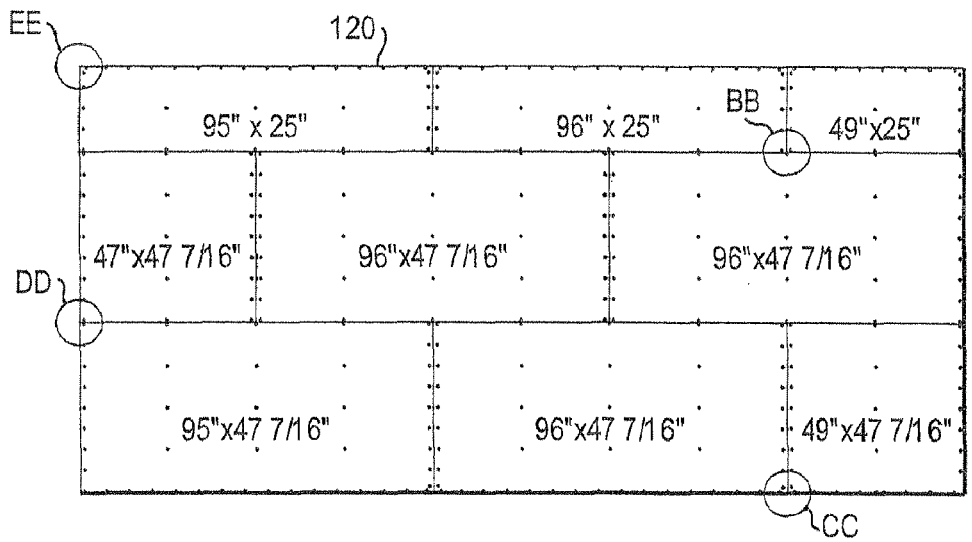
FIG. 11 shows a test SCP panel roof system configuration attached to the metal frame of FIG. 8.
Figure 12:
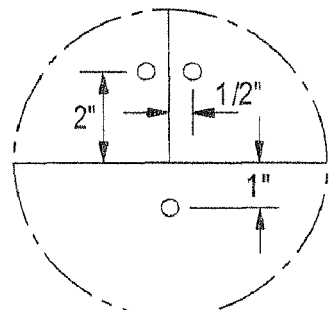
FIGS. 12, 13, 14 and 15 show enlarged views of respective portions of the roof of FIG. 11.
Figure 14:
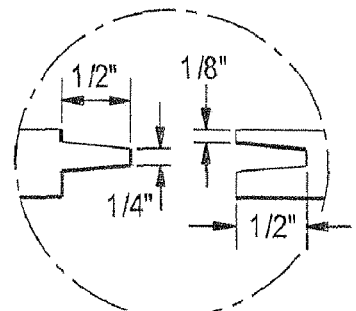
Figure 13:
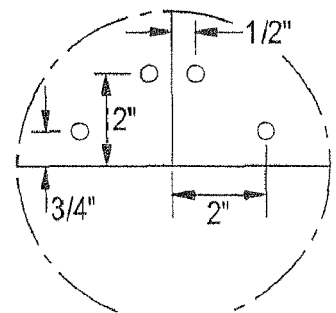
Figure 15:
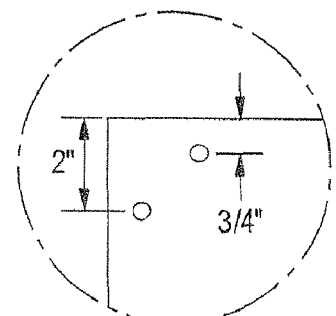

FIG. 6D shows a top view of an SCP panel 143 having pre-applied adhesive strips 145 for attaching the SCP panel to the flat portions 108 (FIG. 7B) of corrugated sheet in place of or in addition to screws. FIG. 11 shows a perspective view of a roof of the present invention comprising SCP panels 116 placed on the corrugated metal sheet 102, having upper flat portions 108 and fastened mechanically (screws, etc.) or with adhesive applied onsite or pre-applied offsite. FIG. 6E shows an embodiment of SCP panel 116 that can be employed in the roof system of FIG. 6D having adhesive strips 147 pre-applied to the SCP panel 116 at locations for engaging at least a number of the upper flat portions 108. Prior to use the adhesive strips 145 are covered by removable tape 146.

The wall SCP panels 116 may have a tongue and groove construction, which may be made by shaping the edges of the panel during casting or before use by cutting the tongue and groove with a router. For example, the tongue and groove of panel 116 may be tapered, as shown in FIGS. 3B, 3C and 3D (with dimensions in inched), the taper providing easy installation of the panels of the invention. The panels are typically 0.5 to 1 inch thick. Any opposed pair of edges of the panels may be provided with mating tongue and groove construction.

FIG. 6E is an end view of an SCP panel 116 provided with covered adhesive strips. FIG. 6E shows that prior to use the adhesive strips 145 are covered with removable protective strips 147. The adhesive strips 145 may also serve to dampen noise transfer.

As mentioned above, FIG. 3 is a schematic side view of a single layer SCP panel 20 for employing with metal framing in the system of the present invention. The principal starting materials used to make such SCP panels are inorganic binder, e.g., calcium sulfate alpha hemihydrate, hydraulic cement, and pozzolanic materials, lightweight filler, e.g., one or more of perlite, ceramic microspheres, or glass microspheres, as well as superplasticizer, e.g., poiynapthalene sulphonates and/or poly acrylates, water, and optional additives.

Calcium Sulfate Hemihydrate

Calcium sulfate hemihydrate, which may be used in panels of the invention, is made from gypsum ore, a naturally occurring mineral, (calcium sulfate dihydrate $CaSO_4.2H_2O$). Unless otherwise indicated, "gypsum" will refer to the dihydrate form of calcium sulfate. After being mined, the raw gypsum is thermally processed to form a settable calcium sulfate, which may be anhydrous, but more typically is the hemihydrate, $CaSO_4.\frac{1}{2}H_2O$. For the familiar end uses, the settable calcium sulfate reacts with water to solidify by forming the dihydrate (gypsum). The hemihydrate has two recognized morphologies, termed alpha hemihydrate and beta hemihydrate. These are selected for various applications based on their physical properties and cost. Both forms react with water to form the dihydrate of calcium sulfate. Upon hydration, alpha hemihydrate is characterized by giving rise to rectangular-sided crystals of gypsum, while beta hemihydrate is characterized by hydrating to produce needle-shaped crystals of gypsum, typically with large aspect ratio. In the present invention either or both of the alpha or beta forms may be used depending on the mechanical performance desired. The beta hemihydrate forms less dense microstructures and is preferred for low density products. The alpha hemihydrate forms more dense microstructures having higher strength and density than those formed by the beta hemihydrate. Thus, the alpha hemihydrate could be substituted for beta hemihydrate to increase strength and density or they could be combined to adjust the properties.

A typical embodiment for the inorganic binder used to make panels of the present invention comprises of hydraulic cement such as Portland cement, high alumina cement, pozzolan-blended Portland cement, or mixtures thereof.

Another typical embodiment for the inorganic binder used to make panels of the present invention comprises a blend containing calcium sulfate alpha hemihydrate, hydraulic cement, pozzolan, and lime.

Hydraulic Cement

ASTM defines "hydraulic cement" as follows: a cement that sets and hardens by chemical interaction with water and is capable of doing so under water. There are several types of hydraulic cements that are used in the construction and building industries. Examples of hydraulic cements include Portland cement, slag cements such as blast-furnace slag cement and super-sulfated cements, calcium sulfoaluminate cement, high-alumina cement, expansive cements, white cement, and rapid setting and hardening cements. While calcium sulfate hemihydrate does set and harden by chemical interaction with water, it is not included within the broad definition of hydraulic cements in the context of this invention. All of the aforementioned hydraulic cements can be used to make the panels of the invention.

The most popular and widely used family of closely related hydraulic cements is known as Portland cement. ASTM defines "Portland cement" as a hydraulic cement produced by pulverizing clinker consisting essentially of hydraulic calcium silicates, usually containing one or more of the forms of calcium sulfate as an interground addition. To manufacture Portland cement, an intimate mixture of limestone, argallicious rocks and clay is ignited in a kiln to produce the clinker, which is then further processed. As a result, the following four main phases of Portland cement are produced: tricalcium silicate ($3CaO.SiO_2$, also referred to as $C_3S$), dicalcium silicate ($2CaO.SiO_2$, called $C_2S$), tricalcium aluminate ($3CaO.Al_2O_3$ or $C_3A$), and tetracalcium aluminoferrite ($4CaO \cdot Al_2O_3 \cdot Fe_2O_3$ or $C_4AF$). Other compounds present in minor amounts in Portland cement include calcium sulfate and other double salts of alkaline sulfates, calcium oxide, and magnesium oxide. Of the various recognized classes of Portland cement, Type III Portland cement (ASTM classification) is preferred for making the panels of the invention, because of its fineness it has been found to provide greater strength. The other recognized classes of hydraulic cements including slag cements such as blast-furnace slag cement and super-sulfated cements, calcium sulfoaluminate cement, high-alumina cement, expansive cements, white cement, rapidly setting and hardening cements such as regulated set cement and VHE cement, and the other Portland cement types can also be successfully used to make the panels of the present invention. The slag cements and the calcium sulfoaluminate cement have low alkalinity and are also suitable to make the panels of the present invention.

Fibers

Glass fibers are commonly used as insulating material, but they have also been used as reinforcing materials with various matrices. The fibers themselves provide tensile strength to materials that may otherwise be subject to brittle failure. The fibers may break when loaded, but the usual mode of failure of composites containing glass fibers occurs from degradation and failure of the bond between the fibers and the continuous phase material. Thus, such bonds are important if the reinforcing fibers are to retain the ability to increase ductility and strengthen the composite over time. It has been found that glass fiber reinforced cements do lose strength as time passes, which has been attributed to attack on the glass by the lime which is produced when cement is cured. One possible way to overcome such attack is to cover the glass fibers with a protective layer, such as a polymer layer. In general, such protective layers may resist attack by lime, but it has been found that the strength is reduced in panels of the invention and, thus, protective layers are not preferred. A more expensive way to limit lime attack is to use special alkali-resistant glass fibers (AR glass fibers), such as Nippon Electric Glass (NEG) 350Y. Such fibers have been found to provide superior bonding strength to the matrix and are, thus, preferred for panels of the invention. The glass fibers are monofilaments that have a diameter from about 5 to 25 microns (micrometers) and typically about 10 to 15 microns (micrometers). The filaments generally are combined into 100 filament strands, which may be bundled into rovings containing about 50 strands. The strands or rovings will generally be chopped into suitable filaments and bundles of filaments, for example, about 0.25 to 3 inches (6.3 to 76 mm) long, typically 1 to 2 inches (25 to 50 mm).

It is also possible to include other non-combustible fibers in the panels of the invention, for example, steel fibers are also potential additives.

Pozzolanic Materials

As has been mentioned, most Portland and other hydraulic cements produce lime during hydration (curing). It is desirable to react the lime to reduce attack on glass fibers. It is also known that when calcium sulfate hemihydrate is present, it reacts with tricalcium aluminate in the cement to form ettringite, which can result in undesirable cracking of the cured product. This is often referred to in the art as "sulfate attack." Such reactions may be prevented by adding "pozzolanic" materials, which are defined in ASTM C618-97 as ". . . siliceous or siliceous and aluminous materials which in themselves possess little or no cementitious value, but will, in finely divided form and in the presence of moisture, chemically react with calcium hydroxide at ordinary temperatures to form compounds possessing cementitious properties." One often used pozzolanic material is silica fume, a finely divided amorphous silica which is the product of silicon metal and ferro-silicon alloy manufacture. Characteristically, it has a high silica content and a low alumina content. Various natural and man-made materials have been referred to as having pozzolanic properties, including pumice, perlite, diatomaceous earth, tuff, trass, metakaolin, microsilica, ground granulated blast furnace slag, and fly ash. While silica fume is a particularly convenient pozzolan for use in the panels of the invention, other pozzolanic materials may be used. In contrast to silica fume, metakaolin, ground granulated blast furnace slag, and pulverized fly ash have a much lower silica content and large amounts of alumina, but can be effective pozzolanic materials. When silica fume is used, it will constitute about 5 to 20 wt. %, preferably 10 to 15 wt. %, of the reactive powders (i.e., hydraulic cement, calcium sulfate alpha hemihydrate, silica fume, and lime). If other pozzolans are substituted, the amounts used will be chosen to provide chemical performance similar to silica fume.

Lightweight Fillers/Microspheres

The lightweight panels employed in systems of the present invention typically have a density of 65 to 90 pounds per cubic foot, preferably 65 to 85 pounds per cubic foot, more preferably 72 to 80 pounds per cubic foot. In contrast, typical Portland cement based panels without wood fiber will have densities in the 95 to 110 pcf range, while the Portland Cement based panels with wood fibers will be about the same as SCP (about 65 to 85 pcf).

To assist in achieving these low densities the panels are provided with lightweight filler particles. Such particles typically have an average diameter (average particle size) of about 10 to 500 microns (micrometers). More typically they have a mean particle diameter (mean particle size) from 50 to 250 microns (micrometers) and/or fall within a particle diameter (size) range of 10 to 500 microns. They also typically have a particle density (specific gravity) in the range from 0.02 to 1.00. Microspheres or other lightweight filler particles serve an important purpose in the panels of the invention, which would otherwise be heavier than is desirable for building panels. Used as lightweight fillers, the microspheres help to lower the average density of the product. When the microspheres are hollow, they are sometimes referred to as microballoons.

When the microspheres are hollow, they are sometimes referred to as microballoons.

The microspheres are either non-combustible themselves or, if combustible, added in sufficiently small amounts to not make the SCP panel combustible. Typical lightweight fillers for including in mixtures employed to make panels of the present invention are selected from the group consisting of ceramic microspheres, polymer microspheres, perlite, glass microspheres, and/or fly ash cenospheres.

Ceramic microspheres can be manufactured from a variety of materials and using different manufacturing processes. Although a variety of ceramic microspheres can be utilized as a filler component in the panels of the invention, the preferred ceramic microspheres of the invention are produced as a coal combustion by-product and are a component of the fly ash found at coal fired utilities, for example, EXTENDO-SPHERES-SG made by Kish Company Inc., Mentor, Ohio or FILLITE® Brand ceramic microspheres made by Trelleborg Finite Inc., Norcross, Ga. USA. The chemistry of the preferred ceramic microspheres of the invention is predominantly silica ($SiO_2$) in the range of about 50 to 75 wt. % and alumina ($Al_2O_3$) in the range of about 15 to 40 wt. %, with up to 35 wt. % of other materials. The preferred ceramic microspheres of the invention are hollow spherical particles with diameters in the range of 10 to 500 microns (micrometers), a shell thickness typically about 10% of the sphere diameter, and a particle density preferably about 0.50 to 0.80 g/mL. The crushing strength of the preferred ceramic microspheres of the invention is greater than 1500 psi (10.3 MPa) and is preferably greater than 2500 psi (17.2 MPa).

Preference for ceramic microspheres in the panels of the invention primarily stems from the fact that they are about three to ten times stronger than most synthetic glass microspheres. In addition, the preferred ceramic microspheres of invention are thermally stable and provide enhanced dimensional stability to the panel of invention. Ceramic microspheres find use in an array of other applications such as adhesives, sealants, caulks, roofing compounds, PVC flooring, paints, industrial coatings, and high temperature-resistant plastic composites. Although they are preferred, it should be understood that it is not essential that the microspheres be hollow and spherical, since it is the particle density and compressive strength which provide the panel of the invention with its low weight and important physical properties. Alternatively, porous irregular particles may be substituted, provided that the resulting panels meet the desired performance.

The polymer microspheres, if present, are typically hollow spheres with a shell made of polymeric materials such as polyacrylonitrile, polymethacrylonitrile, polyvinyl chloride or polyvinylidine chloride, or mixtures thereof. The shell may enclose a gas used to expand the polymeric shell during manufacture. The outer surface of the polymer microspheres may have some type of an inert coating such as calcium carbonate, titanium oxides, mica, silica, and talc. The polymer microspheres have a particle density preferably about 0.02 to 0.15 g/mL and have diameters in the range 10 to 350 microns (micrometers). The presence of polymer microspheres may facilitate simultaneous attainment of low panel density and enhanced cutability and nailability.

Other lightweight fillers, for example glass microspheres, perlite or hollow alumino-silicate cenospheres or microspheres derived from fly ash, are also suitable for including in mixtures in combination with or in place of ceramic microspheres employed to make panels of the present invention.

The glass microspheres typically are made of alkali resistant glass materials and may be hollow. Typical glass microspheres are available from GYPTEK INC., Suite 135, 16 Midlake Blvd SE, Calgary, AB, T2X 2X7, CANADA.

In a first embodiment of the SCP panel, only ceramic microspheres are used throughout the full thickness of the panel. The panel typically contains about 35 to 42 weight % of ceramic microspheres uniformly distributed throughout the thickness of the panel.

In a second embodiment of the SCP panel, a blend of lightweight ceramic and glass microspheres is used throughout the full thickness of the panel. The volume fraction of the glass microspheres in the panel of the second embodiment of the SCP panel will typically be in the range of 0 to 15% of the total volume of the dry ingredients, where the dry ingredients of the composition are the reactive powders (examples of reactive powders: hydraulic cement only; blend of hydraulic cement and pozzolan; or blend of hydraulic cement, calcium sulfate alpha hemihydrate, pozzolan, and lime), ceramic microspheres, polymer microspheres, and alkali-resistant glass fibers. A typical aqueous mixture has a ratio of water-to-reactive powders from greater than 0.311 to 0.711.

If desired the panel may have a single layer as shown in FIG. 3. However, the panel typically is made by a process which applies multiple layers which, depending upon how the layers are applied and cured as well as whether the layers have the same or different compositions, may or may not in the final panel product retain distinct layers. FIG. 6 shows a multi-layer structure of a panel 21 having layers 23, 25, 27 and 29. In the multi-layer structure the composition of the layers may be the same or different. The typical thickness of the layer(s) ranges between about ⅓₂ to 1.0 inches (about 0.75 to 25.4 mm). Where only one outer layer is used, it typically will be less than ⅜ of the total panel thickness.

Formulation of SCP Panels

The components used to make the shear resistant panels of the invention are hydraulic cement, calcium sulfate alpha hemihydrate, an active pozzolan such as silica fume, lime, ceramic microspheres, alkali-resistant glass fibers, superplasticizer (e.g., sodium salt of polynapthalene sulfonate), and water. Typically, both hydraulic cement and calcium sulfate alpha hemihydrate are present. Long term durability of the composite is compromised if calcium sulfate alpha hemihydrate is not present along with silica fume. Water/moisture durability is compromised when Portland cement is not present. Small amounts of accelerators and/or retarders may be added to the composition to control the setting characteristics of the green (i.e., uncured) material. Typical non-limiting additives include accelerators for hydraulic cement such as calcium chloride, accelerators for calcium sulfate alpha hemihydrate such as gypsum, retarders such as DTPA (diethylene triamine pentacetic acid), tartaric acid or an alkali salt of tartaric acid (e.g., potassium tartrate), shrinkage reducing agents such as glycols, and entrained air.

Panels of the invention will include a continuous phase in which alkali-resistant glass fibers and light weight filer, e.g., microspheres, are uniformly distributed. The continuous phase results from the curing of an aqueous mixture of the reactive powders, i.e., blend of hydraulic cement, calcium sulfate alpha hemihydrate, pozzolan, and lime), preferably including superplasticizer and/or other additives.

Typical weight proportions of embodiments of the reactive powders (inorganic binder), e.g., hydraulic cement, calcium sulfate alpha hemihydrate, pozzolan and lime, in the invention, based on dry weight of the reactive powders, are shown in TABLE 1. TABLE 1A lists typical ranges of reactive powders, lightweight filler, and glass fibers in compositions of the present invention.

TABLE 1

| | Weight Proportion (%) | |
|---|---|---|
| Reactive Powder | Broad | Typical |
| Hydraulic Cement | 20-55 | 25-40 |
| Calcium Sulfate Alpha Hemihydrate | 35-75 | 45-65 |
| Pozzolan | 5-25 | 10-15 |
| Lime | up to 3.5 or 0.2 to 3.5 | 0.75-1.25 |

TABLE 1A

| SCP Composition (dry basis) | Typical Weight Proportion (%) | Typical Weight Proportion (%) |
|---|---|---|
| Reactive Powder | 35-70 | 35-68 |
| Lightweight Filler | 20-50 | 23-49 |
| Glass Fibers | 5-20 | 5-17 |

Lime is not required in all formulations of the invention, but it has been found that adding lime provides superior panels and it usually will be added in amounts greater than about 0.2 wt. %. Thus, in most cases, the amount of lime in the reactive powders will be about 0.2 to 3.5 wt. %.

In the first embodiment of the SCP panel, the dry ingredients of the composition will be the reactive powders (i.e., blend of hydraulic cement, calcium sulfate alpha hemihydrate, pozzolan, and lime), ceramic microspheres and alkali-resistant glass fibers, and the wet ingredients of the composition will be water and superplasticizer. The dry ingredients and the wet ingredients are combined to produce the panel of the invention. The ceramic microspheres are uniformly distributed in the matrix throughout the full thickness of the panel. Of the total weight of dry ingredients, the panel of the invention is formed from about 49 to 56 wt. % reactive powders, 35 to 42 wt. % ceramic microspheres and 7 to 12 wt. % alkali-resistant glass fibers. In a broad range, the panel of the invention is formed from 35 to 58 wt. % reactive powders, 34 to 49 wt. % lightweight filler, e.g., ceramic microspheres, and 6 to 17 wt. % alkali-resistant glass fibers of the total dry ingredients. The amounts of water and superplasticizer added to the dry ingredients will be sufficient to provide the desired slurry fluidity needed to satisfy processing considerations for any particular manufacturing process. The typical addition rates for water range between 35 to 60% of the weight of reactive powders and those for superplasticizer range between 1 to 8% of the weight of reactive powders.

The glass fibers are monofilaments having a diameter of about 5 to 25 microns (micrometers), preferably about 10 to 15 microns (micrometers). The monofilaments typically are combined in 100 filament strands, which may be bundled into rovings of about 50 strands. The length of the glass fibers will typically be about 0.25 to 1 or 2 inches (6.3 to 25 or 50 mm) or about 1 to 2 inches (25 to 50 mm) and broadly about 0.25 to 3 inches (6.3 to 76 mm). The fibers have random orientation, providing isotropic mechanical behavior in the plane of the panel.

The second embodiment of the SCP panel contains a blend of ceramic and glass microspheres uniformly distributed throughout the full thickness of the panel. Accordingly, in the second embodiment of the SCP panel, the dry ingredients of the composition will be the reactive powders (hydraulic cement, calcium sulfate alpha hemihydrate, pozzolan, and lime), ceramic microspheres, glass microspheres, and alkali-resistant glass fibers, and the wet ingredients of the composition will be water and superplasticizer. The dry ingredients and the wet ingredients will be combined to produce the panel of the invention. The volume fraction of the glass microspheres in the panel will typically be in the range of 7 to 15% of the total volume of dry ingredients. Of the total weight of dry ingredients, the panel of the invention is formed from about 54 to 65 wt. % reactive powders, 25 to 35 wt. % ceramic microspheres, 0.5 to 0.8 wt. % glass microspheres, and 6 to 10 wt. % alkali-resistant glass fibers. In the broad range, the panel of the invention is formed from 42 to 68 wt. % reactive powders, 23 to 43 wt. % lightweight fillers, e.g., ceramic microspheres, 0.2 to 1.0 wt. % glass microspheres, and 5 to 15 wt. % alkali-resistant glass fibers, based on the total dry ingredients. The amounts of water and superplasticizer added to the dry ingredients will be adjusted to provide the desired slurry fluidity needed to satisfy the processing considerations for any particular manufacturing process. The typical addition rates for water range between 35 to 70% of the weight of reactive powders, but could be greater than 60% up to 70% (weight ratio of water to reactive powder of 0.6/1 to 0.7/1), preferably 65% to 75%, when it is desired to use the ratio of water-to-reactive powder to reduce panel density and improve cutability. The amount of superplasticizer will range between 1 to 8% of the weight of reactive powders. The glass fibers are monofilaments having a diameter of about 5 to 25 microns (micrometers), preferably about 10 to 15 microns (micrometers). They typically are bundled into strands and rovings as discussed above. The length of the glass fibers typically is about 1 to 2 inches (25 to 50 mm) and broadly about 0.25 to 3 inches (6.3 to 76 mm). The fibers will have random orientation providing isotropic mechanical behavior in the plane of the panel.

In the third embodiment of the SCP panel, a multi-layer structure in the panel is created where the outer layer(s) have improved nailability (fastening ability)/cutability. This is achieved by increasing the water-to-cement ratio in the outer layer(s), and/or changing the amount of filler, and/or adding an amount of polymer microspheres sufficiently small such that the panel remains noncombustible. The core of the panel will typically contain ceramic microspheres uniformly distributed throughout the layer thickness or alternatively, a blend of one or more of ceramic microspheres, glass microspheres and fly ash cenospheres.

The dry ingredients of the core layer of this embodiment of the SCP panel employed in the present invention will be the reactive powders (typically hydraulic cement, calcium sulfate alpha hemihydrate, pozzolan, and lime), lightweight filler particles (typically microspheres such as ceramic microspheres alone or one or more of ceramic microspheres, glass microspheres and fly ash cenospheres), and alkali-resistant glass fibers, and the wet ingredients of the core layer are water and superplasticizer. The dry ingredients and the wet ingredients will be combined to produce the core layer of the panel of the invention. Of the total weight of dry ingredients, the core of the panel of the invention preferably is formed from about 49 to 56 wt. % reactive powders, 35 to 42 wt. % hollow ceramic microspheres and 7 to 12 wt. % alkali-resistant glass fibers, or alternatively, about 54 to 65 wt. % reactive powders, 25 to 35 wt. % ceramic microspheres, 0.5 to 0.8 wt. % glass microspheres or fly ash cenospheres, and 6 to 10 wt. % alkali-resistant glass fibers. In the broad range, the core layer of the panel of this embodiment of the SCP panel is typically formed by about 35 to 58 wt. % reactive powders, 34 to 49 wt. % lightweight fillers, e.g., ceramic microspheres, and 6 to 17 wt. % alkali-resistant glass fibers, based on the total dry ingredients, or alternatively, about 42 to 68 wt. % of reactive powders, 23 to 43 wt. % ceramic microspheres, up to 1.0 wt. %, preferably 0.2 to 1.0 wt. %, other lightweight filler, e.g., glass microspheres or fly ash cenospheres, and 5 to 15 wt. % alkali-resistant glass fibers. The amounts of water and superplasticizer added to the dry ingredients will be adjusted to provide the desired slurry fluidity needed to satisfy the processing considerations for any particular manufacturing process. The typical addition rates for water will range between 35 to 70% of the weight of reactive powders but will be greater than 60% up to 70% when it is desired to use the ratio of water-to-reactive powders to reduce panel density and improve nailability and those for superplasticizer will range between 1 to 8% of the weight of reactive powders. When the ratio of water-to-reactive powder is adjusted, the slurry composition will be adjusted to provide the panel of the invention with the desired properties.

There is generally an absence of polymer microspheres and an absence of polymer fibers that would cause the SCP panel to become combustible.

The dry ingredients of the outer layer(s) of this embodiment of the SCP panel will be the reactive powders (typically hydraulic cement, calcium sulfate alpha hemihydrate, pozzolan, and lime), lightweight filler particles (typically microspheres such as ceramic microspheres alone or one or more of ceramic microspheres, glass microspheres and fly ash cenospheres), and alkali-resistant glass fibers, and the wet ingredients of the outer layer(s) will be water and superplasticizer. The dry ingredients and the wet ingredients are combined to produce the outer layers of the panel of the invention. In the outer layer(s) of the panel of this embodiment of the SCP panel, the amount of water is selected to furnish good fastening and cutting ability to the panel. Of the total weight of dry ingredients, the outer layer(s) of the panel of the invention preferably are formed from about 54 to 65 wt. % reactive powders, 25 to 35 wt. % ceramic microspheres, 0 to 0.8 wt. % glass microspheres, and 6 to 10 wt. % alkali-resistant glass fibers. In the broad range, the outer layers of the panel of the invention are formed from about 42 to 68 wt. % reactive powders, 23 to 43 wt. % ceramic microspheres, up to 1.0 wt. % glass microspheres (and/or fly ash cenospheres), and 5 to 15 wt. % alkali-resistant glass fibers, based on the total dry ingredients. The amounts of water and superplasticizer added to the dry ingredients are adjusted to provide the desired slurry fluidity needed to satisfy the processing considerations for any particular manufacturing process. The typical addition rates for water range between 35 to 70% of the weight of reactive powders and particularly greater than 60% up to 70% when the ratio of water-to-reactive powders is adjusted to reduce panel density and improve nailability, and typical addition rates for superplasticizer will range between 1 to 8% of the weight of reactive powders. The preferable thickness of the outer layer(s) ranges between 1/32 to 4/32 inches (0.8 to 3.2 mm) and the thickness of the outer layer when only one is used will be less than 3/8 of the total thickness of the panel.

In both the core and outer layer(s) of this embodiment of the SCP panel, the glass fibers are monofilaments having a diameter of about 5 to 25 microns (micrometers), preferably 10 to 15 microns (micrometers). The monofilaments typically are bundled into strands and rovings as discussed above. The length typically is about 1 to 2 inches (25 to 50 mm) and broadly about 0.25 to 3 inches (6.3 to 76 mm). The fiber orientation will be random, providing isotropic mechanical behavior in the plane of the panel.

The invention also includes a fourth embodiment of a multi-layer panel having a density of 65 to 90 pounds per cubic foot and capable of resisting shear loads when fastened to framing and comprising a core layer of a continuous phase resulting from the curing of an aqueous mixture, a continuous phase resulting from the curing of an aqueous mixture comprising, on a dry basis, 35 to 70 weight % reactive powder, 20 to 50 weight percent lightweight filler, and 5 to 20 weight % glass fibers, the continuous phase being reinforced with glass fibers and containing the lightweight filler particles, the lightweight filler particles having a particle specific gravity of from 0.02 to 1.00 and an average particle size of about 10 to 500 microns (micrometers); and at least one outer layer of respectively another continuous phase resulting from the curing of an aqueous mixture comprising, on a dry basis, 35 to 70 weight % reactive powder, 20 to 50 weight percent lightweight filler, and 5 to 20 weight % glass fibers, the continuous phase being reinforced with glass fibers and containing the lightweight filler particles, the lightweight filler particles having a particle specific gravity of from 0.02 to 1.00 and an average particle size of about 10 to 500 microns (micrometers) on each opposed side of the inner layer, wherein the at least one outer layer has a higher percentage of glass fibers than the inner layer.

Making A Panel Of The Invention

The reactive powders, e.g., blend of hydraulic cement, calcium sulfate alpha hemihydrate, pozzolan, and lime), and lightweight filler, e.g., microspheres, are blended in the dry state in a suitable mixer.

Then, water, a superplasticizer (e.g., the sodium salt of polynapthalene sulfonate), and the pozzolan (e.g., silica fume or metakaolin) are mixed in another mixer for 1 to 5 minutes. If desired, a retarder (e.g., potassium tartrate) is added at this stage to control the setting characteristics of the slurry. The dry ingredients are added to the mixer containing the wet ingredients and mixed for 2 to 10 minutes to form smooth homogeneous slurry.

The slurry is then combined with glass fibers, in any of several ways, with the objective of obtaining a uniform slurry mixture. The cementitious panels are then formed by pouring the slurry containing fibers into an appropriate mold of desired shape and size. If necessary, vibration is provided to the mold to obtain good compaction of material in the mold. The panel is given required surface finishing characteristics using an appropriate screed bar or trowel.

One of a number of methods to make multi-layer SCP panels is as follows. The reactive powders, e.g., blend of hydraulic cement, calcium sulfate alpha hemihydrate, pozzolan, and lime), and lightweight filler, e.g., microspheres, are blended in the dry state in a suitable mixer. Then, water, a superplasticizer (e.g., the sodium salt of polynapthalene sulfonate), and the pozzolan (e.g., silica fume or metakaolin) are mixed in another mixer for 1 to 5 minutes. If desired, a retarder (e.g., potassium tartrate) is added at this stage to control the setting characteristics of the slurry. The dry ingredients are added to the mixer containing the wet ingredients and mixed for 2 to 10 minutes to form a smooth homogeneous slurry.

The slurry may be combined with the glass fibers in several ways, with the objective of obtaining a uniform mixture. The glass fibers typically will be in the form of rovings that are chopped into short lengths. In a preferred embodiment, the slurry and the chopped glass fibers are concurrently sprayed into a panel mold. Preferably, spraying is done in a number of passes to produce thin layers, preferably up to about 0.25 inches (6.3 mm) thick, which are built up into a uniform panel having no particular pattern and with a thickness of 1/4 to 1 inch (6.3 to 25.4 mm). For example, in one application, a 3×5 ft (0.91×1.52 m) panel was made with six passes of the spray in the length and width directions. As each layer is deposited, a roller may be used to assure that the slurry and the glass fibers achieve intimate contact. The layers may be leveled with a screed bar or other suitable means after the rolling step. Typically, compressed air will be used to atomize the slurry. As it emerges from the spray nozzle, the slurry mixes with glass fibers that have been cut from a roving by a chopper mechanism mounted on the spray gun. The uniform mixture of slurry and glass fibers is deposited in the panel mold as described above.

If desired the outer surface layers of the panel may contain polymer spheres, or be otherwise constituted, in order that the fasteners used to attach the panel to framing can be driven easily. The preferable thickness of such layers will be about 1/32 inches to 4/32 inches (0.8 to 3.2 mm). The same procedure described above by which the core of the panel is made may be used to apply the outer layers of the panel.

Other methods of depositing a mixture of the slurry and glass fibers will occur to those familiar with the panel-making art. For example, rather than using a batch process to make each panel, a continuous sheet may be prepared in a similar manner, which after the material has sufficiently set, can be cut into panels of the desired size. The percentage of fibers relative to the volume of slurry typically constitutes approximately in the range of 0.5% to 3%, for example 1.5%. Typical panels have a thickness of about 1/4 to 1 1/2 inches (6.3 to 38.1 mm).

Another method of making panels of the present invention is by using the process steps disclosed in U.S. patent application Ser. No. 10/666,294 incorporated herein by reference. U.S. patent application Ser. No. 10/666,294, incorporated herein by reference, discloses after one of an initial deposition of loosely distributed, chopped fibers or a layer of slurry upon a moving web, fibers are deposited upon the slurry layer. An embedment device compacts the recently deposited fibers into the slurry, after which additional layers of slurry, then chopped fibers are added, followed by more embedment.

The process is repeated for each layer of the board, as desired. Upon completion, the board has a more evenly distributed fiber component, which results in relatively strong panels without the need for thick mats of reinforcing fibers, as taught in prior art production techniques for cementitious panels.

More specifically, U.S. patent application Ser. No. 10/666,294 discloses a multi-layer process for producing structural cementitious panels, including: (a.) providing a moving web; (b.) one of depositing a first layer of loose fibers and (c.) depositing a layer of settable slurry upon the web; (d.) depositing a second layer of loose fibers upon the slurry; (e.) embedding the second layer of fibers into the slurry; and (f.) repeating the slurry deposition of step (c.) through step (d.) until the desired number of layers of settable fiber-enhanced slurry in the panel is obtained.

Figure 21:
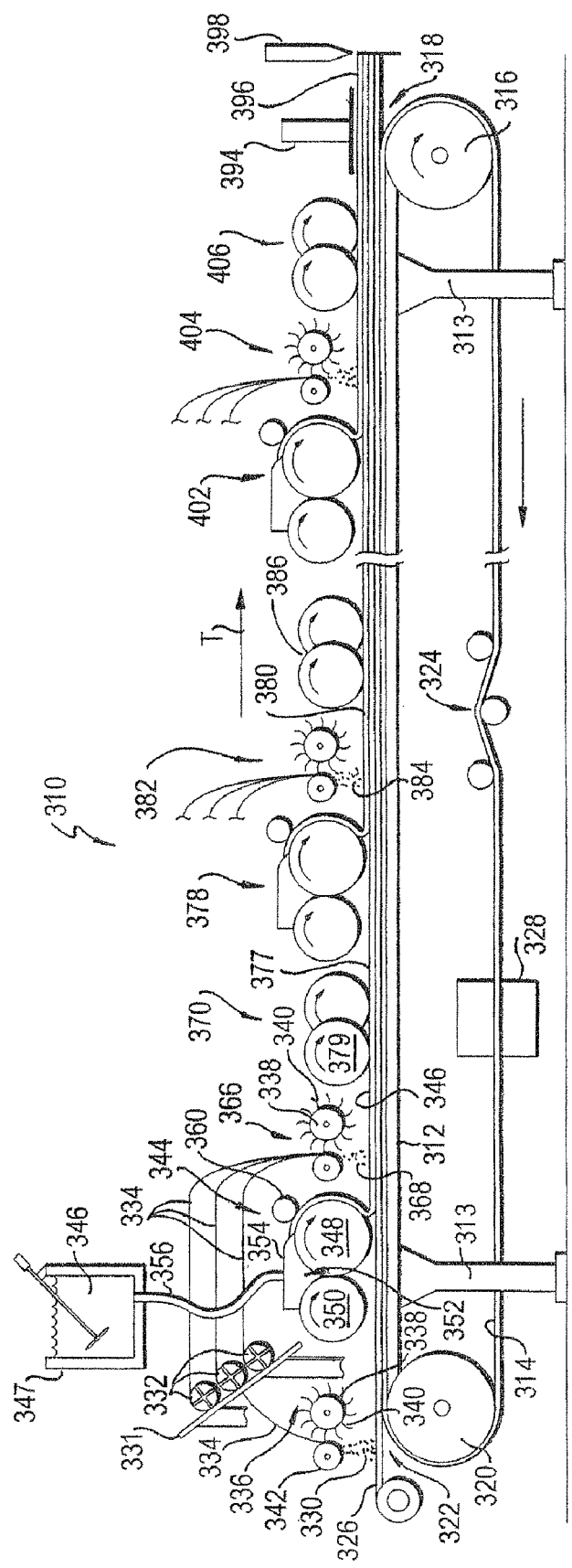
FIG. 21 is a diagrammatic elevational view of an apparatus suitable for performing a present process to make an SCP panel for use in the system of the present invention.

FIG. 21 is a diagrammatic elevational view of an apparatus which is suitable for performing the process of U.S. patent application Ser. No. 10/666,294. Referring now to FIG. 21, a structural panel production line is diagrammatically shown and is generally designated 310. The production line 310 includes a support frame or forming table 312 having a plurality of legs 313 or other supports. Included on the support frame 312 is a moving carrier 314, such as an endless rubber-like conveyor belt with a smooth, water-impervious surface, however porous surfaces are contemplated. As is well known in the art, the support frame 312 may be made of at least one table-like segment, which may include designated legs 313. The support frame 312 also includes a main drive roll 316 at a distal end 318 of the frame, and an idler roll 320 at a proximal end 322 of the frame. Also, at least one belt tracking and/or tensioning device 324 is preferably provided for maintaining a desired tension and positioning of the carrier 314 upon the rolls 316, 320.

Also, in the preferred embodiment, a web 326 of Kraft paper, release paper, and/or other webs of support material designed for supporting slurry prior to setting, as is well known in the art, may be provided and laid upon the carrier 314 to protect it and/or keep it clean. However, it is also contemplated that the panels produced by the present line 310 are formed directly upon the carrier 314. In the latter situation, at least one belt washing unit 328 is provided. The carrier 314 is moved along the support frame 312 by a combination of motors, pulleys, belts or chains which drive the main drive roll 316 as is known in the art. It is contemplated that the speed of the carrier 314 may vary to suit the application.

In the apparatus of FIG. 21, structural cementitious panel production is initiated by one of depositing a layer of loose, chopped fibers 330 or a layer of slurry upon the web 326. An advantage of depositing the fibers 330 before the first deposition of slurry is that fibers will be embedded near the outer surface of the resulting panel. A variety of fiber depositing and chopping devices are contemplated by the present line 310, however the preferred system employs at least one rack 331 holding several spools 332 of fiberglass cord, from each of which a cord 334 of fiber is fed to a chopping station or apparatus, also referred to as a chopper 336.

The chopper 336 includes a rotating bladed roll 338 from which project radially extending blades 340 extending transversely across the width of the carrier 314, and which is disposed in close, contacting, rotating relationship with an anvil roll 342. In the preferred embodiment, the bladed roll 338 and the anvil roll 342 are disposed in relatively close relationship such that the rotation of the bladed roll 338 also rotates the anvil roll 342, however the reverse is also contemplated. Also, the anvil roll 342 is preferably covered with a resilient support material against which the blades 340 chop the cords 334 into segments. The spacing of the blades 340 on the roll 338 determines the length of the chopped fibers. As is seen in FIG. 21, the chopper 336 is disposed above the carrier 314 near the proximal end 322 to maximize the productive use of the length of the production line 310. As the fiber cords 334 are chopped, the fibers 330 fall loosely upon the carrier web 326.

Next, a slurry feed station, or a slurry feeder 344 receives a supply of slurry 346 from a remote mixing location 347 such as a hopper, bin or the like. It is also contemplated that the process may begin with the initial deposition of slurry upon the carrier 314. The slurry is preferably comprised of varying amounts of Portland cement, gypsum, aggregate, water, accelerators, plasticizers, foaming agents, fillers and/or other ingredients, and described above and in the patents listed above which have been incorporated by reference for producing SCP panels. The relative amounts of these ingredients, including the elimination of some of the above or the addition of others, may vary to suit the use.

While various configurations of slurry feeders 344 are contemplated which evenly deposit a thin layer of slurry 346 upon the moving carrier 314, the preferred slurry feeder 344 includes a main metering roll 348 disposed transversely to the direction of travel of the carrier 314. A companion or back up roll 350 is disposed in close parallel, rotational relationship to the metering roll 348 to form a nip 352 there between. A pair of sidewalls 354, preferably of non-stick material such as Teflon® brand material or the like, prevents slurry 346 poured into the nip 352 from escaping out the sides of the feeder 344.

The feeder 344 deposits an even, relatively thin layer of the slurry 346 upon the moving carrier 314 or the carrier web 326. Suitable layer thicknesses range from about 0.05 inch to 0.20 inch. However, with four layers preferred in the preferred structural panel produced by the present process, and a suitable building panel being approximately 0.5 inch, an especially preferred slurry layer thickness is approximately 0.125 inch.

Figure 22:
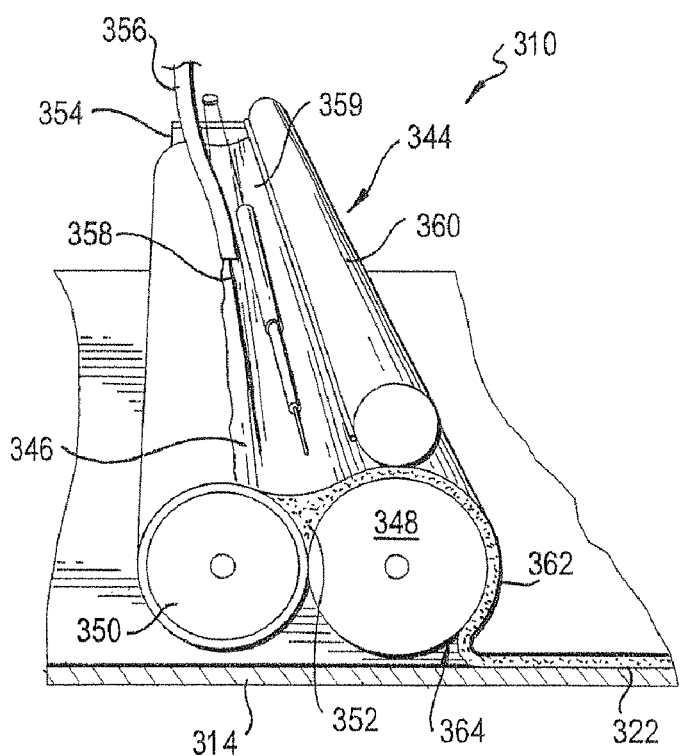
FIG. 22 is a perspective view of a slurry feed station of the type used in the process of FIG. 21.

Referring now to FIGS. 21 and 22, to achieve a slurry layer thickness as described above, several features are provided to the slurry feeder 344. First, to ensure a uniform disposition of the slurry 346 across the entire web 326, the slurry is delivered to the feeder 344 through a hose 356 located in a laterally reciprocating, cable driven, fluid powered dispenser 358 of the type well known in the art. Slurry flowing from the hose 356 is thus poured into the feeder 344 in a laterally reciprocating motion to fill a reservoir 359 defined by the rolls 348, 350 and the sidewalls 354. Rotation of the metering roll 348 thus draws a layer of the slurry 346 from the reservoir.

Next, a thickness monitoring or thickness control roll 360 is disposed slightly above and/or slightly downstream of a vertical centerline of the main metering roll 348 to regulate the thickness of the slurry 346 drawn from the feeder reservoir 357 upon an outer surface 362 of the main metering roll 348. Also, the thickness control roll 360 allows handling of slurries with different and constantly changing viscosities. The main metering roll 348 is driven in the same direction of travel "T" as the direction of movement of the carrier 314 and the carrier web 326, and the main metering roll 348, the backup roll 350 and the thickness monitoring roll 360 are all rotatably driven in the same direction, which minimizes the opportunities for premature setting of slurry on the respective moving outer surfaces. As the slurry 346 on the outer surface 362 moves toward the carrier web 326, a transverse stripping wire 364 located between the main metering roll 348 and the carrier web 326 ensures that the slurry 346 is completely deposited upon the carrier web and does not proceed back up toward the nip 352 and the feeder reservoir 359. The stripping wire 364 also helps keep the main metering roll 348 free of prematurely setting slurry and maintains a relatively uniform curtain of slurry.

A second chopper station or apparatus 366, preferably identical to the chopper 336, is disposed downstream of the feeder 344 to deposit a second layer of fibers 368 upon the slurry 346. In the preferred embodiment, the chopper apparatus 366 is fed cords 334 from the same rack 331 that feeds the chopper 336. However, it is contemplated that separate racks 331 could be supplied to each individual chopper, depending on the application.

Figure 23:
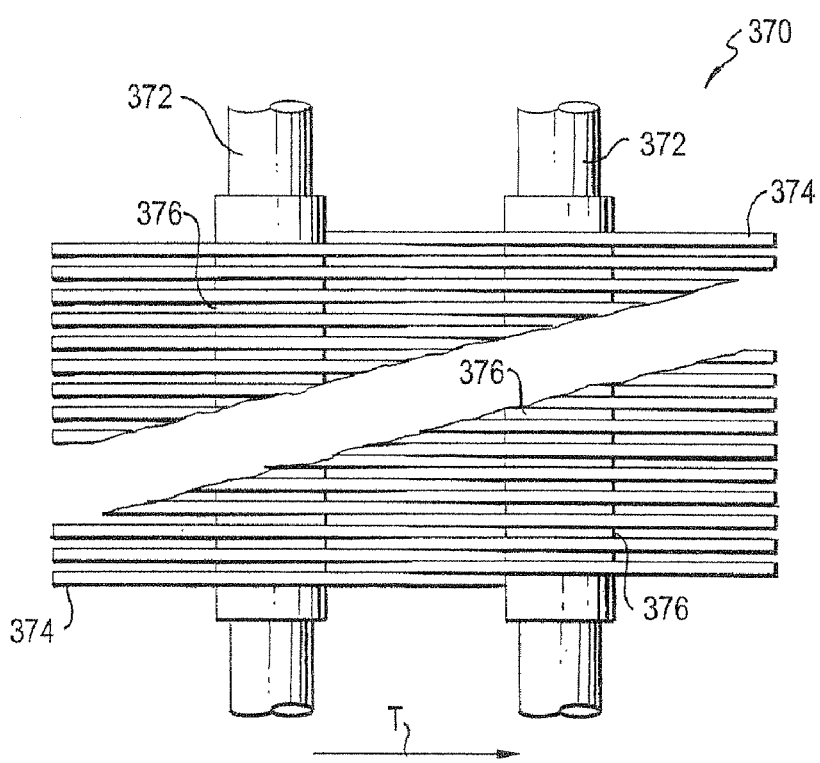
FIG. 23 is a fragmentary overhead plan view of an embedment device suitable for use with the present process.

Referring now to FIGS. 21 and 23, next, an embedment device, generally designated 370 is disposed in operational relationship to the slurry 346 and the moving carrier 314 of the production line 310 to embed the fibers 368 into the slurry 346. While a variety of embedment devices are contemplated, including, but not limited to vibrators, sheep's foot rollers and the like, in the preferred embodiment, the embedment device 370 includes at least a pair of generally parallel shafts 372 mounted transversely to the direction of travel "T" of the carrier web 326 on the frame 312. Each shaft 372 is provided with a plurality of relatively large diameter disks 374 which are axially separated from each other on the shaft by small diameter disks 376.

During SCP panel production, the shafts 372 and the disks 374, 376 rotate together about the longitudinal axis of the shaft. As is well known in the art, either one or both of the shafts 372 may be powered, and if only one is powered, the other may be driven by belts, chains, gear drives or other known power transmission technologies to maintain a corresponding direction and speed to the driving roll. The respective disks 374, 376 of the adjacent, preferably parallel shafts 372 are intermeshed with each other for creating a "kneading" or "massaging" action in the slurry, which embeds the fibers 368 previously deposited thereon. In addition, the close, intermeshed and rotating relationship of the disks 372, 374 prevents the buildup of slurry 346 on the disks, and in effect creates a "self-cleaning" action which significantly reduces production line downtime due to premature setting of clumps of slurry.

The intermeshed relationship of the disks 374, 376 on the shafts 372 includes a closely adjacent disposition of opposing peripheries of the small diameter spacer disks 376 and the relatively large diameter main disks 374, which also facilitates the self-cleaning action. As the disks 374, 376 rotate relative to each other in close proximity (but preferably in the same direction), it is difficult for particles of slurry to become caught in the apparatus and prematurely set. By providing two sets of disks 374 which are laterally offset relative to each other, the slurry 346 is subjected to multiple acts of disruption, creating a "kneading" action which further embeds the fibers 368 in the slurry 346.

Once the fibers 368 have been embedded, or in other words, as the moving carrier web 326 passes the embedment device 370, a first layer 377 of the SCP panel is complete. In the preferred embodiment, the height or thickness of the first layer 377 is in the approximate range of 0.05-0.20 inches. This range has been found to provide the desired strength and rigidity when combined with like layers in a SCP panel. However, other thicknesses are contemplated depending on the application.

To build a structural cementitious panel of desired thickness, additional layers are needed. To that end, a second slurry feeder 378, which is substantially identical to the feeder 344, is provided in operational relationship to the moving carrier 314, and is disposed for deposition of an additional layer 380 of the slurry 346 upon the existing layer 377.

Next, an additional chopper 382, substantially identical to the choppers 336 and 366, is provided in operational relationship to the frame 312 to deposit a third layer of fibers 384 provided from a rack (not shown) constructed and disposed relative to the frame 312 in similar fashion to the rack 331. The fibers 384 are deposited upon the slurry layer 380 and are embedded using a second embedment device 386. Similar in construction and arrangement to the embedment device 370, the second embedment device 386 is mounted slightly higher relative to the moving carrier web 314 so that the first layer 377 is not disturbed. In this manner, the second layer 380 of slurry and embedded fibers is created.

Referring now to FIG. 21, with each successive layer of settable slurry and fibers, an additional slurry feeder station 344, 378, 402 followed by a fiber chopper 336, 366, 382, 404 and an embedment device 370, 386, 406 is provided on the production line 310. In the preferred embodiment, four total layers (see for example, the panel 101 of FIG. 29) are provided to form the SCP panel. Upon the disposition of the four layers of fiber-embedded settable slurry as described above, a forming device 394 is preferably provided to the frame 312 to shape an upper surface 396 of the panel. Such forming devices 394 are known in the settable slurry/board production art, and typically are spring-loaded or vibrating plates which conform the height and shape of the multi-layered panel to suit the desired dimensional characteristics.

The panel which is made has multiple layers (see for example layers 23, 25, 27, 29 of panel 21 of FIG. 7) which upon setting form an integral, fiber-reinforced mass. Provided that the presence and placement of fibers in each layer are controlled by and maintained within certain desired parameters as is disclosed and described below, it will be virtually impossible to delaminate the panel.

At this point, the layers of slurry have begun to set, and the respective panels are separated from each other by a cutting device 398, which in the preferred embodiment is a water jet cutter. Other cutting devices, including moving blades, are considered suitable for this operation, provided that they can create suitably sharp edges in the present panel composition. The cutting device 398 is disposed relative to the line 310 and the frame 312 so that panels are produced having a desired length, which may be different from the representation shown in FIG. 21. Since the speed of the carrier web 314 is relatively slow, the cutting device 398 may be mounted to cut perpendicularly to the direction of travel of the web 314. With faster production speeds, such cutting devices are known to be mounted to the production line 310 on an angle to the direction of web travel. Upon cutting, the separated panels 321 are stacked for further handling, packaging, storage and/or shipment as is well known in the art.

In quantitative terms, the influence of the number of fiber and slurry layers, the volume fraction of fibers in the panel, and the thickness of each slurry layer, and fiber strand diameter on fiber embedment efficiency has been investigated. In the analysis, the following parameters were identified:

$v_T$=Total composite volume
$v_s$=Total panel slurry volume $v_f$=Total panel fiber volume
$v_{f,I}$=Total fiber volume/layer
$v_{T,I}$=Total composite volume/layer
$v_{s,I}$=Total slurry volume/layer
$N_I$=Total number of slurry layers; Total number of fiber layers
$V_f$=Total panel fiber volume fraction
$d_f$=Equivalent diameter of individual fiber strand
$l_f$=Length of individual fiber strand
t=Panel thickness
$t_I$=Total thickness of individual layer including slurry and fibers
$t_{s,I}$=Thickness of individual slurry layer
$t_{s,I}$=Total number of fibers in a fiber layer
$n_{f,I}$, $n_{f1,I}$, $n_{f2,I}$=Total projected surface area of fibers contained in a fiber layer
$S_{f,I}^P$, $s_{f1,I}^P$, $s_{f2,I}^P$=Projected fiber surface area fraction for a fiber layer.
Projected Fiber Surface Area Fraction, $S_{f,I}^P$ Assume a panel composed of equal number of slurry and fiber layers. Let the number of these layers be equal to $N_I$, and the fiber volume fraction in the panel be equal to $V_f$.

In summary, the projected fiber surface area fraction, $S_{f,I}^P$ of a layer of fiber network being deposited over a distinct slurry layer is given by the following mathematical relationship:

$$S_{f,I}^P = \frac{4V_f t}{\pi N_I d_f} = \frac{4V_f * t_{s,I}}{\pi d_f (1 - V_f)}$$

where, $V_f$ is the total panel fiber volume fraction, t is the total panel thickness, $d_f$ is the diameter of the fiber strand, $N_I$ is the total number of fiber layers and $t_{s,I}$ is the thickness of the distinct slurry layer being used.

Accordingly, to achieve good fiber embedment efficiency, the objective function becomes keeping the fiber surface area fraction below a certain critical value. It is noteworthy that by varying one or more variables appearing in the Equations 8 and 10, the projected fiber surface area fraction can be tailored to achieve good fiber embedment efficiency.

Different variables that affect the magnitude of projected fiber surface area fraction are identified and approaches have been suggested to tailor the magnitude of "projected fiber surface area fraction" to achieve good fiber embedment efficiency. These approaches involve varying one or more of the following variables to keep projected fiber surface area fraction below a critical threshold value: number of distinct fiber and slurry layers, thickness of distinct slurry layers and diameter of fiber strand.

Based on this fundamental work, the preferred magnitudes of the projected fiber surface area fraction, $S_{f,I}^P$ have been discovered to be as follows:

Preferred projected fiber surface area fraction, $S_{f,I}^P < 0.65$
Most preferred projected fiber surface area fraction, $S_{f,I}^P < 0.45$ For a design panel fiber volume fraction, $V_f$, achievement of the aforementioned preferred magnitudes of projected fiber surface area fraction can be made possible by tailoring one or more of the following variables—total number of distinct fiber layers, thickness of distinct slurry layers and fiber strand diameter. In particular, the desirable ranges for these variables that lead to the preferred magnitudes of projected fiber surface area fraction are as follows:

Thickness of Distinct Slurry Layers in Multiple Layer SCP panels, $t_{s,I}$

Preferred thickness of distinct slurry layers, $t_{s,I} \leq 0.20$ inches
More Preferred thickness of distinct slurry layers, $t_{s,I} \leq 0.12$ inches
Most preferred thickness of distinct slurry layers, $t_{s,I} \leq 0.08$ inches Number of Distinct Fiber Layers in Multiple Layer SCP panels, $N_I$
Preferred number of distinct fiber layers, $N_I \geq 4$
Most preferred number of distinct fiber layers, $N_I \geq 6$
Fiber Strand Diameter, $d_f$
Preferred fiber strand diameter, $d_f \geq 30$ tex
Most preferred fiber strand diameter, $d_f \geq 70$ tex In using the panels as structural subroofing or roofing underlayment, they preferably will be made with a tongue and groove construction, which may be made by shaping the edges of the panel during casting or before use by cutting the tongue and groove with a router. Preferably, the tongue and groove will be tapered, as shown in FIGS. 3 and 4A-C, the taper providing easy installation of the panels of the invention.

Properties

The SCP panel frame system of the present invention preferably has one or more of the properties listed in TABLES 2A-2D.

TABLE 2A

| Physical Characteristics | ASTM Test Method | Unit | Preferred Target Value | Typical Range | Notes |
|---|---|---|---|---|---|
| Non-Combustibility | E-136 | Weight Loss | $\leq 50\%$ | $\leq 50\%$ | From Sec. 8, E-136 |
| | | Temp Rise | $\leq 54°$ F. | $\leq 54°$ | From Sec. 8, E-136 |
| | | 30 seconds | No flaming | No flaming | From Sec. 8, E-136 |
| Water Durability Flex. Strength of Sheathing | | | | | |
| Dry | C-947 | psi | $\geq 1800$ | 1400-3500 | |
| Wet | C-947 | psi | $\geq 1650$ | 1300-3000 | |
| AMOE of Sheathing | | | | | |
| Dry | | ksi | $\geq 700$ | 600-1000 | |
| Wet | | ksi | $\geq 600$ | 550-950 | |

TABLE 2A-continued

| Physical Characteristics | ASTM Test Method | Unit | Preferred Target Value | Typical Range | Notes |
|---|---|---|---|---|---|
| Screw Withdrawal | | | | | (screw size; #8 wire 1-⅝ inch screw with 0.25 inch diameter head minimum) |
| ½" Panel-Dry | D-1761 | pounds | 352 | 250-450 | Equiv. to American Plywood Assoc. (APA) S-4 |
| ½" Panel-Wet | D-1761 | pounds | 293 | 200-400 | % of force for SCP relative to OSB 82%; % of force for SCP relative to Plywood 80% |
| ¾" Panel-Dry | D-1761 | pounds | 522 | 450-600 | Equiv. to American Plywood Assoc. (APA) S-4 |
| ¾" Panel-Wet | D-1761 | pounds | 478 | 450-550 | % of force for SCP relative to OSB 82%; % of force for SCP relative to Plywood 80% |

TABLE 2B

| Physical Characteristics | ASTM Test Method | Unit | Preferred Target Value | Typical Range | Notes |
|---|---|---|---|---|---|
| Lateral Screw Resistance | | | | | Screw size: #8 wire 1⅝ inch screw with 0.25 inch diameter head minimum |
| ½" Panel-Dry | D-1761 | pounds | 445 | 350-550 | Equiv. to APA S-4 |
| ½" Panel-Wet | D-1761 | pounds | 558 | 400-650 | % of force for SCP relative to OSB 73; % of force for SCP relative to Plywood 82% |
| ¾" Panel-Dry | D-1761 | pounds | 414 | 400-500 | Equiv. to APA S-4 |
| ¾" Panel-Wet | D-1761 | pounds | 481 | 400-500 | % of force for SCP relative to OSB 73; % of force for SCP relative to Plywood 82% |
| Static & Impact Test (¾ inch thick SCP) Ultimate | | | | | |
| Static | E-661 | pounds | 1286 | 1000-1500 | APA S-1; 16 inch o.c. Span Rating ≧550 lbs. |
| Following Impact | E-661 | pounds | 2206 | 1500-3000 | APA S-1; 16 inch o.c. Span Rating ≧400 lbs |
| Deflection under 200 lb. Load | | | | | |
| Static | E-661 | inches | 0.014 | 0.010-0.060 | APA S-1; 16 inch o.c. Span Rating ≦0.078" |
| Following Impact | E-661 | inches | 0.038 | 0.020-0.070 | APA S-1; 16 inch o.c. Span Rating ≦0.078" |
| Uniform Load | | | | | |
| ¾" Panel-Dry | | psf | 330 | 300-450 | 16 inch o.c. Span Rating ≧330 psf |
| Linear Expansion | | | | | |
| ½" to ¾" Panel | APA P-1 | % | ≦0.1 | ≦0.1 | APA P-1 requires ≦0.5% |

TABLE 2C

| Physical Characteristics | ASTM Test Method | Unit | Preferred Target Value | Typical Range | Notes |
|---|---|---|---|---|---|
| Water Absorption | | | | | |
| ½" Panel | APA PRP-108 | % | 11.8 | 7 to 15 | % water absorption of SCP relative to ½ inch thick OSB: 51.5%, % water absorption of SCP relative to ½ inch thick Plywood: 46.2% |
| ¾" Panel | APA PRP-108 | % | 10.8 | 7 to 15 | % water absorption of SCP relative to OSB: 51.3%, % water absorption of SCP relative to Plywood: 48.1% |
| Thickness Swell | | | | | |
| ½" Panel | APA PRP-108 | % | 2.3 | 1 to 5 | % water absorption of SCP relative to ½ inch thick OSB: 22.2%, % water absorption of SCP relative to ½ inch thick Plywood: 7.8% |
| ¾" Panel | APA PRP-108 | % | 2.4 | 1 to 5 | % water absorption of SCP relative to OSB: 22.2%, % water absorption of SCP relative to Plywood: 7.8% |
| Mold & Bacteria Resistance | | | | | |
| ½ to ¾" Panel | G-21 | | 1 | 0 to 1 | OSB & Plywood have food source |
| ½ to ¾" Panel | D-3273 | | 10 | 10 | OSB & Plywood have food source |
| Termite Resistance | | | | | |
| ½ to ¾" Panel | | | No food source | No food source | |

TABLE 2D

| Physical Characteristics | ASTM Test Method | Unit | Preferred Target Value | Typical Range | Notes |
|---|---|---|---|---|---|
| Horizontal Design Shear Capacity of the Floor Diaphragm | | | | | |
| ¾" Panel- 10' × 20' Roof | E-455 | pounds per linear foot | 487.2 | 300-1000 Typically 400-800 | Performance relates to panel properties, joist depth & spacing and fastener type and spacing |
| System Fire Resistance | | | | | |
| ⅝ to ¾" SCP Panel on one side of metal frame | E-119 | Time | 1 hr and 10 min. | 1 to 1.5 hr. | Nominal 4" deep stud, 24" O.C., batt insulation, 1 layer ⅝" FIRECODE Gypsum Board available from USG. |
| ¾" Panel SCP on one side of metal frame | E-119 | Time | 2 hr - 9 min. | 2 hr. | Nominal 10" deep joist, 24" O.C., batt insulation, 1 layer ⅝" FIRECODE Gypsum Board available from USG |

Horizontal Design Shear Capacity in Table 2D provides for a safety factor of 3.

A typical ¾ inch (19 mm) thick panel when tested according to ASTM 661 and APA S-1 test methods over a span of 16 inches (406.4 mm) on centers, has an ultimate load capacity greater than 550 lb (250 kg), under static loading, an ultimate load capacity greater than 400 lb (182 kg) under impact loading, and a deflection of less than 0.078 inches (1.98 mm) under both static and impact loading with a 200 lb (90.9 kg) load.

Typically, the flexural strength of a panel having a dry density of 65 lb/ft³ (1041 kg/m³) to 90 lb/ft³ (1442 kg/m³) or 65 lb/ft³ (1041 kg/m³) to 95 lb/ft³ (1522 kg/m³) after being soaked in water for 48 hours is at least 1000 psi (7 MPa), e.g. 1300 psi (9 MPa), preferably 1650 psi (11.4 MPa), more preferably at least 1700 psi (11.7 MPa) as measured by the ASTM C 947 test.

Typically the horizontal shear diaphragm load carrying capacity of the system will not be lessened by more than 25%, preferably not be lessened by more than 20%, when exposed to water in a test wherein a 2 inch head of water is maintained over ¾ inch thick SCP panels fastened on a 10 foot by 20 foot metal frame for a period of 24 hours.

Typically the system will not absorb more than 0.7 pounds per square foot of water when exposed to water in a test wherein a 2 inch head of water is maintained over ¾ inch thick SCP panels fastened on a 10 foot by 20 foot metal frame for a period of 24 hours.

Typically an embodiment of the present system having a 10 foot wide by 20 foot long by ¾ inch thick diaphragm of the SCP panels attached to a 10 foot by 20 foot metal frame will not swell more than 5% when exposed to a 2 inch head of water maintained over the SCP panels fastened on the metal frame for a period of 24 hours.

Typically, every component of the present system meets ASTM G-21 in which the system achieves approximately a 1 and meets ASTM D-3273 in which the system achieves approximately a 10. Also, typically the present system supports substantially zero bacteria growth when clean. Also, typically the present system is inedible to termites.

The system may be non-directional, in that the panels of the system may be placed with their long dimension parallel or perpendicular to the metal joists of the frame without losing strength or load carrying characteristics, wherein the ability of the system to support dead and live loads without failure is the same regardless of the orientation of the SCP panel on the metal framing.

The present invention has an unexpected advantage in cold weather performance. Conventional cementitious panels can be brittle in cold weather. Thus, installing such panels in cold weather would require careful handling by the construction workers during installation. However, in the present system the SCP panels can preferably withstand being installed on metal roofing elements when the ambient temperature is less than 32 degrees F. (0 degrees C.), or even less than 20 degrees F. (minus 7.5 degrees C.) without cracking. This is a very significant advantage because it facilitates building in harsh climates in winter thus increasing builder productivity. The present SCP panels can preferably withstand being subjected to normal rough treatment during installation at these cold temperatures. For instance, at these cold temperatures placing the SCP panel may include a step of dropping the panel on the metal roofing elements, e.g., trusses, such that at least one end of the panel falls in free fall at least 2 feet, typically at least 3 feet, for example, 3 to 4 feet without cracking. For example, this occurs when one end of the panel is placed on one or more metal roofing elements and then the opposing other end is released to drop in free fall on one or more metal roofing elements.

EXAMPLES

An experiment was conducted for fire endurance testing on comparative structural sheathing in the small-scale horizontal furnace (SSHF). Five samples, ½ inch (13 mm). Structural Cement Panel (SCP) of a composition of the present invention, ¾ in. (19 mm) VIROC panel, ½ in. (13 mm) NOVATECH panel (another embodiment of an SCP panel of the present invention), 15/32 in. (12 mm) plywood (grade A-C) and 31/64 in. (12 mm) Oriented Strand Board (OSB), were tested as part of 4 ft. by 4 ft. assemblies.

Each assembly was constructed of metal framing, 358, 20 gauge CR runners and ST studs spaced 24 in. on center. The test material was applied to the exposed surface and one layer of USG's SHEETROCK ⅝ in. (16 mm) FIRECODE Type SCX gypsum wallboard was applied to the unexposed surface for each of the five tests. The exposed surface material is applied perpendicular to the studs with a joint at the mid-span of the assembly. Thermocouples were placed in both cavities underside of the exposed panel and on the unexposed surface for temperature comparison of the assemblies. The furnace temperatures were controlled to the ASTM E119 Time/Temperature Curve. Temperature measurements were made of the finish rating and the unexposed surface for the duration of the test. Observations were made as to the estimated condition of the exposed surface during the test. Standard ASTM E119 temperature limits for the thermocouple readings were 250° F. (136° C.) above ambient for the average and 325° F. (183° C.) above ambient for the individual were used as control limits.

The purpose of the testing was to provide a relative comparison of the performance of product material in the fire test. The procedure does not provide a fire endurance rating for a system.

The formulation of the SCP panels used in the small-scale horizontal furnace test (Example 1 and Example 3) is as follows in TABLE 2E:

TABLE 2E

|  | Weight Proportion (%) |
| --- | --- |
| Reactive Powder Blend |  |
| Reactive Powder Blend |  |
| Portland Cement | 29 |
| Calcium Sulfate Alpha Hemihydrate | 58 |
| Silica Fume | 12 |
| Lime | 1 |
| SCP Cementitious Composition |  |
| Ingredient |  |
| Portland Cement | 12.3 |
| Calcium Sulfate Alpha Hemihydrate | 24.7 |
| Silica Fume | 5.1 |
| Lime | 0.4 |
| Ceramic Microspheres | 26.4 |
| Superplasticizer | 1.9 |
| Water | 21.9 |
| Alkali-Resistant Glass Fibers[1] | 7.2 |

[1]Weight proportion corresponds to 3.06% volume fraction of AR Glass Fibers in the composite
Length of glass fibers used in the small-scale horizontal furnace test - 40 mm.

The results from testing of the five samples can be found in TABLE 3. Both the average (A) and the individual (I) readings are in minutes when the temperature criteria limits were exceeded during each test. The SCP board has a composition of a panel of the present invention.

FIRE TEST DURATION: 70 MIN, 0 SEC.
TEST TERMINATED: No Board Fall Off

TABLE 3

Data Summary for Examples 1-5

| SSHF Example No. | Sample ID | Finish Rating (Minutes) | Unexposed Surface (Overlimit/ Minutes) | Exposed Surface Condition: End of Test |
|---|---|---|---|---|
| 1 | ½ in. (13 mm) SCP board | 09:24 (A) 10:05 (I) | 46:05 (A) 46:16 (I) | Intact Low Shrinkage |
| 2 | ¾ in. (19 mm) VIROC board | 19:16 (A) 21.52 (I) | 48:42 (A) 47:49 (I) | Intact Moderate Shrinkage |
| 3 | ½ in. (13 mm) NOVATECH board | 12:52 (A) 13 27 (I) | 46 42 (A) 47:13 (I) | Panel Delamination No Fall Off |
| 4 | 15/32 in. (12 mm) Plywood board (A-C Grade) | 6:40 (A) 7:10 (I) | 23:42 (A) 23:31 (I) | Board Fall Off |
| 5 | 31/64 in. (12 mm) OSB board | 6:50 (A) 8:12 (I) | 24.25 (A) 23:30 (I) | Board Fall Off |

Example 1

Sample Construction

Size 48 in. (122 cm) by 48-⅝ in. (124 cm)
Studs: 358 ST, 20 gauge Spacing: 24 in. (61 cm) on center
Runners: 358 CR, 20 gauge; Cavity: Void
Facing: (Fire Side) One layer ½ in. (13 mm) USG Structural Cement Panel (SCP)
(Unexposed Side) One layer ⅝ in. (16 mm) SHEETROCK FIRECODE9 (Type X) panel Table 4 lists the boards employed in this example as test materials. The boards were subjected to heating as presented in Table 5. Observations from this heating are presented in Table 6.

TABLE 4

Example 1 Test Materials

| | ½" (13 mm) SCP ½" × 48" × 96" (13 mm × 122 cm × 244 cm) | SHEETROCK ® Brand Wallboard ⅝" × 48" × 120" (16 mm × 122 cm × 305 cm) Type C |
|---|---|---|
| Lbs/1000 sq. ft | 2736 | 2290 |
| Average board thickness, in. (mm) | 0.528 (13.4) | 0.620 (15.7) |
| Average density, pcf (g/cc) | 62.128 (0.995) | 44.332 (0.710) |
| Average panel weight, lbs. (kgs.) | 22.46 (10.19) | 37.13 (16.84) |

TABLE 5

Example 1 TEMPERATURE INFORMATION

| | Average | Individual |
|---|---|---|
| Unexposed Surface Limiting Temperature Criteria Degrees 79° F. (29° C.) Ambient | 324° F. (182° C.) | 399° F. (229° C.) |
| Unexposed Surface Temperature Limits Reached | 46:05 | TC #4 at 46:16 |
| Finish Rating Limiting Temperature Criteria Degrees 79° F. (29° C.) Ambient | 323° F. (182° C.) | 398° F. (229° C.) |
| Finish Rating Temperature Limits Reached | 9:24 | TC #8 at 10:05 |

TABLE 6

Example 1 Observations

| Time (Min:Sec) | Furnace Pressure | Observations |
|---|---|---|
| 4:00 | +0.10 | The exposed board is very light tan in color. |
| 12:00 | +0.07 | Very light smoke and steam vapor emitting from unexposed surface. |
| 18:00 | +0.08 | Butt joint opening is at estimated 1/16 inch max. More smoke and steam vapor emitting from unexposed surface. |
| 22:00 | +0.08 | Very heavy smoke and steam vapor emitting from unexposed surface. Exposed board looks good and is in place. |
| 30:00 | +0.06 | Butt joint opening is at estimated ⅛ inch max. |

TABLE 6-continued

Example 1 Observations

| Time (Min:Sec) | Furnace Pressure | Observations |
|---|---|---|
| 33:00 | +0.08 | Board sag in between the studs is at estimated ⅛ inch to ¼ inch max. |
| 38:00 | +0.07 | Light smoke and steam vapor emitting from unexposed surface. |
| 41:00 | +0.10 | Board sag in between the studs is at estimated ⅛ to ¼ inch max. |
| 48:00 | +0.07 | Butt joint opining is at 3/16 to ¼ inch max. |
| 51:00 | +0.08 | Board sag in between the studs is at estimated ½ inch max. |

TABLE 6-continued

Example 1 Observations

| Time (Min:Sec) | Furnace Pressure | Observations |
|---|---|---|
| 53:00 | +0.09 | Can hear audible sound of paper burning on unexposed surface. |
| 63:00 | +0.08 | Board sag in between the studs is at estimated ½ to ⅝ inch max. |
| 70:00 | | Test terminated. No board fall off. |

Example 2

Sample Construction

Size 48 in. (122 cm) by 48-⅝ in. (124 cm)
Studs: 358 ST, 20 gauge Spacing: 24 in. (61 cm) on center
Runners: 358 CR, 20 gauge; Cavity: Void
Facing: (Fire Side) One layer ¾ in. VIROC Board
(Unexposed Side) One layer ⅝ in. (16 mm) SHEETROCK® FIRECODE® (Type X) panel available from USG Table 7 lists the boards employed in this example as test materials. The boards were subjected to heating as presented in Table 8. Observations from this heating are presented in Table 9.

TABLE 7

Example 2 Test Materials

| | VIROC Board ¾" × 48" × 48⅝" (13 mm × 122 cm × 124 cm) | SHEETROCK ® Brand Wallboard ⅝" × 48" × 120" (16 mm × 122 cm × 305 cm) Type X |
|---|---|---|
| Lbs/1000 sq. ft | — | 2290 |
| Average board thickness, inches (mm) | 0.760 (19) | 0.620 (15.7) |
| Average density, pcf (g/cc) | 83.00 (1.33) | 44.344 (0.710) |
| Average panel weight, lbs. (kgs.) | 22.46 (10.19) | 37.13 (16.84) |

TABLE 8

Example 2 Temperature Information

| | Average | Individual |
|---|---|---|
| Unexposed Surface Limiting Temperature Criteria Degrees 73° F. (26° C.) Ambient | 323° F. (182° C.) | 398° F. (229° C.) |
| Unexposed Surface Temperature Limits Reached | 48:42 | TC #4 at 47:49 |
| Finish Rating Limiting Temperature Criteria Degrees 79° F. (29° C.) Ambient | 325° F. (183° C.) | 400° F. (230° C.) |
| Finish Rating Temperature Limits Reached | 19:16 | TC #8 at 21:52 |

FIRE TEST DURATION: 60 MIN, 0 SEC.
TEST TERMINATED: No Board Fall Off

TABLE 9

Example 2 Observations

| Time (Min:Sec) | Furnace Pressure | Observations |
|---|---|---|
| 2:30 | +0.08 | The butt joint is smoking and is dark brown in color. Smoke emitting from unexposed surface. |
| 6:00 | +0.08 | Exposed board is charred and black in color. Butt joint opening is an estimated ⅛ inch max. Board crack by west perimeter by center stud. |

TABLE 9-continued

Example 2 Observations

| Time (Min:Sec) | Furnace Pressure | Observations |
|---|---|---|
| 9:00 | +0.08 | Exposed board is lightly flaming on the entire surface. Butt joint opening is at estimated 3/16 inch to 1/4 inch max. Board sag is at estimated 1/4 inch to 3/8 inch max. |
| 12:30 | +0.08 | Board sag is at estimated 1/2 inch to 3/4 inch max. Butt joint opening is at estimated 1/2 inch max. and is peeling away towards fire. Surface is still lightly flaming. |
| 18:00 | +0.08 | Board is still flaming on entire surface. Smoke and steam vapor is emitting from unexposed surface. |
| 19:30 | +0.08 | Butt joint opening is at estimated 1 inch max. and peeling away. Board sag is estimated 1 1/2 inch max. Exposed board is still flaming. |
| 24:00 | +0.08 | Butt joint opening is at estimated 1 1/2 to 2 inches max. The west board has a crack across the center by stud. Center board screws have pulled away from center stud. |
| 29:00 | +0.08 | Crack opening in the center of the west board is at estimated 1/2 inch max. Board sag is at estimated 2 1/2 to 3 inches max. The board is still flaming. Smoke and steam vapor are emitting from unexposed surface. |
| 34:00 | +0.07 | Board sag is at estimated 4 inches max. East board has a crack at the center by the stud. |
| 40:00 | +0.08 | West board is sagged towards fire an estimated 5 inches max. East board crack opening is an estimated 5/8 inches max. Board is still flaming. |
| 43:00 | +0.08 | Board sample is peeling away towards fire at estimated 5-6 inches max. The sample cavity is seen due to board peel away. |
| 50:00 | +0.0 | Board sag is at estimated 6 to 7 inches max. and still peeling towards fire. Butt joint opening is at estimated 3 inches max. East and west center board cracks are at estimated 1 1/2 inches max. |
| 60:00 | | Test terminated. No board fall off. |

Example 3

Sample Construction

Size 48 in. (122 cm) by 48-5/8 in. (124 cm)
Studs: 358 ST, 20 gauge Spacing: 24 in. (61 cm) on center
Runners: 358 CR, 20 gauge; Cavity: Void
Facing: (Fire Side) One layer 1/2 inch NovaTech Board (Unexposed Side) One layer 5/8 in. (16 mm) SHEETROCK FIRECODE (Type X) panel.

Table 10 lists the boards employed in this example as test materials. The boards were subjected to heating as presented in Table 11. Observations from this heating are presented in Table 12.

TABLE 11

Example 3 Temperature Information

| | Average | Individual |
|---|---|---|
| Unexposed Surface Limiting Temperature Criteria Degrees 74° F. (26° C.) Ambient | 324° F. (182° C.) | 399° F. (229° C.) |
| Unexposed Surface Temperature Limits Reached | 46:42 | TC #2 at 47:13 |
| Finish Rating | 326° F. (183° C.) | 401° F. (231° C.) |
| Limiting Temperature Criteria Degrees 76° F. (27° C.) Ambient | | |
| Finish Rating Temperature Limits Reached | 12:52 | TC #8 at 13:27 |

TABLE 10

Example 3 Test Materials

| | NovaTech Board 3/4" × 48" × 48 5/8" (13 mm × 122 cm × 124 cm) | SHEETROCK ® Brand Wallboard 5/8" × 48" × 120" (16 mm × 122 cm × 305 cm) Type X |
|---|---|---|
| Lbs/1000 sq. ft | 3163 | 2298 |
| Average board thickness, in. (mm) | 0.531 (13) | 0.620 (15.7) |
| Average density, pcf (g/cc) | 71.544 (1.15) | 44.517 (0.713) |
| Average panel weight, lbs. (kgs.) | 25.90 (11.75) | 37.25 (16.9) |

FIRE TEST DURATION: 70 MIN, 0 SEC.
TEST TERMINATED—Board Delamination, No Board Fall Off

TABLE 12

Example 3 Observations

| Time (Min:Sec) | Furnace Pressure | Observations |
|---|---|---|
| 2:30 | +0.07 | Exposed south half of west board popped apart and delaminated and has fallen off. Estimated ¼ inch of board thickness is still in place at the cold junction. Exposed glass fibers are seen on remaining board. |
| 8:00 | +0.07 | Light smoke and steam vapor emitting from unexposed surface. |
| 18:00 | +0.08 | More smoke and steam vapor emitting from unexposed surface. More board cracks by center stud screws |
| 24:00 | +0.07 | Heavy smoke and steam vapor emitting from unexposed surface. Butt joint is at estimated 3/16 to ¼ inch max. Northeast corner board is peeling away towards furnace and is estimated at ¼ inch max. Board thickness is falling off |
| 32:00 | +0.07 | Less smoke and steam vapor emitting from unexposed surface. |
| 35:00 | +0.07 | Butt joint opening is at estimated ⅜ inch max. |
| 37:00 | +0.08 | Estimated ¼ inch thick by 12 inch by 24 inch Board has fallen at corner of north east board |
| 45:30 | +0.08 | Very light smoke and steam vapor is emitting from unexposed surface. Exposed board sag is at estimated ½ to ⅝ inch max |
| 53:00 | +0.07 | Butt joint opening is at estimated ⅜ inch to ½ inch max. |
| 57:00 | +0.08 | Unexposed wall board is starting to get brown in color over butt joint location. Very little smoke and steam vapor emitting from unexposed surface |
| 61:00 | +0.07 | Board sag is at estimated 1 to 1½ inches max. |
| 63:00 | +0.10 | Hair cracks starting on southeast section of board |
| 65:00 | +0.09 | Butt joint opening is at estimated ½ inches max. |
| 67:00 | +0.10 | More exposed board peeling at northeast section. Total board delamination is an estimated 15% max |
| 70:00 | | Test terminated. Some board delamination. No board fall off. |

Example 4

Sample Construction

Size 48 in. (122 cm) by 48-⅝ in. (124 cm)
Studs: 358 ST, 20 gauge; Spacing: 24 in. (61 cm) on center
Runners: 358 CR, 20 gauge; Cavity: Void Facing: (Fire Side) One layer 15/32 inch (12 mm) Plywood (A/C) Board
(Unexposed Side) One layer ⅝ in. (16 mm) SHEETROCK® FIRECODE® (Type X) panel.

Table 13 lists the boards employed in this example as test materials. The boards were subjected to heating as presented in Table 14. Observations from this heating are presented in Table 15.

TABLE 13

Example 4 Test Materials

| | Plywood Board 15/32" × 48" × 48-⅝" (16 mm × 122 cm × 124 cm) | SHEETROCK ® Brand Wallboard ⅝" × 48" × 120" (16 mm × 122 cm × 305 cm) Type X |
|---|---|---|
| Lbs/1000 sq. ft | 1644 | 2283 |
| Average board thickness, in. (mm) | 0.499 (12.6 mm) | 0.619 (16) |
| Average density, pcf (g/cc) | 39.544 (0.633) | 44.242 (0.709) |
| Average panel weight, lbs. (kgs.) | 52.50 (28.8) | 37.00 (16.78) |

TABLE 14

Example 4 Temperature Information

|  | Average | Individual |
|---|---|---|
| Unexposed Surface Limiting Temperature Criteria Degrees 73° F. (26° C.) Ambient | 323° F. (182° C.) | 398° F. (229° C.) |
| Unexposed Surface Temperature Limits Reached | 23:42 | TC #3 at 23:31 |
| Finish Rating Limiting Temperature Criteria Degrees 76° F. (27° C.) Ambient | 325° F. (183° C.) | 400° F. (230° C.) |

TABLE 14-continued

Example 4 Temperature Information

|  | Average | Individual |
|---|---|---|
| Finish Rating Temperature Limits Reached | 6:40 | TC #1 at 7:10 |

FIRE TEST DURATION: 32 MIN, 0 SEC.
TEST TERMINATED—Board Fall Off

TABLE 15

Example 4 Observations

| Time (Min:Sec) | Furnace Pressure | Observations |
|---|---|---|
| 0:30 | +0.06 | Exposed boards are black in color, burnt charred surface. |
| 2:00 | +0.04 | Heavy smoke emitting from unexposed surface. |
| 4:00 | +0.08 | Exposed boards are flaming. Very heavy smoke emitting from unexposed surface. |
| 6:00 | +0.08 | Butt joint opening is at estimated ¼ in. max. |
| 8:00 | +0.08 | Very heavy flaming seen through furnace view ports. Sample can not be seen. |
| 9:00 | +0.07 | Exposed ½ inch plywood has fallen in furnace. Cavity is now exposed. |
| 14:00 | +0.08 | Still very heavy smoke and steam vapor emitting from unexposed surface. |
| 19:00 | +0.08 | The exposed wallboard has hairline haze cracking seen from exposed cavity. |
| 28:00 | +0.07 | Less smoke and steam vapor emitting from unexposed surface. The unexposed side wallboard is now brown in color. |
| 32:00 |  | Test terminated. Board has fallen off. |

Example 5

Sample Construction

Size 48 in. (122 cm) by 48-⅝ in. (124 cm)
Studs: 358 ST, 20 gauge; Spacing: 24 in. (61 cm) on center
Runners: 358 CR, 20 gauge; Cavity: Void
Facing: (Fire Side) One layer 31/64 inch Oriented Strand Board (OSB)
(Unexposed Side) One layer ⅝ in. (16 mm) SHEETROCK® FIRECODE® (Type X) panel.

Table 16 lists the boards employed in this example as test materials. The boards were subjected to heating as presented in Table 17. Observations from this heating are presented in Table 18.

TABLE 16

Example 5 Test Materials

|  | OSB Board 15/32" × 48" × 48-⅝" (12 mm × 122 cm × 124 cm) | SHEETROCK® Brand Wallboard ⅝" × 48" × 120" (16 mm × 122 cm × 305 cm) Type X |
|---|---|---|
| Lbs/1000 sq. ft | 1644 | 2283 |
| Average board thickness, in. (cm) | 0.499 (12.6 mm) | 0.619 (0.157) |
| Average density, pcf (g/cc) | 39.544 (0.633) | 44.242 (0.709) |
| Average panel weight, lbs. (kgs.) | 52.50 (28.8) | 37.00 (16.78) |

TABLE 17

Example 5 Temperature Information

|  | Average | Individual |
|---|---|---|
| Unexposed Surface Limiting Temperature Criteria Degrees 77° F. (28° C.) Ambient | 327° F. (184° C.) | 402° F. (231° C.) |
| Unexposed Surface Temperature Limits Reached | 24:25 | TC #3 at 23:30 |
| Finish Rating Limiting Temperature Criteria Degrees 80° F. (30° C.) Ambient | 330° F. (186° C.) | 405° F. (233° C.) |
| Finish Rating Temperature Limits Reached | 6:50 | TC #8 at 8:12 |

FIRE TEST DURATION: 32 MIN, 0 SEC.
TEST TERMINATED: Board Fall Off

TABLE 18

Example 5 Observations

| Time (Min:Sec) | Furnace Pressure | Observations |
|---|---|---|
| 1:00 | +0.02 | Exposed board is smoking and black in color |
| 1:30 | +0.08 | Smoke is heavy, emitting from unexposed surface |
| 3:00 | +0.07 | The entire board is flaming. Surface is hard. |
| 5:00 | +0.08 | Butt joint opening is at estimated ⅛ to ¼ inches max. |
| 6:00 | +0.08 | Very heavy smoke emitting from unexposed surface. |
| 8:00 | +0.15 | Board sag is at estimated 1 inch max. Still is flaming. |
| 9:30 | +0.08 | Exposed board has fallen out. Remaining perimeter boards still flaming. Exposed wallboard is seen from exposed cavity. |
| 15:00 | +0.07 | Still heavy smoke and steam emitting from unexposed surface. |
| 19:00 | +0.08 | Board crack running along the center stud on the unexposed surface. |
| 23:00 | +0.07 | Smoke and steam is starting to decrease at unexposed surface. |

TABLE 18-continued

Example 5 Observations

| Time (Min:Sec) | Furnace Pressure | Observations |
|---|---|---|
| 25:00 | +0.08 | Unexposed board crack running the stud length is at estimated ⅛ inches max. |
| 29:00 | +0.07 | Hairline haze cracking is seen on wallboard viewed from exposed cavity. |
| 31:00 | +0.07 | The unexposed surface wallboard is now dark brown in color. Little smoke and steam vapor emitting from unexposed surface. |
| 32:00 | | Test terminated. Board has fallen off. |

Example 6

The following tests are of floor diaphragms rather than roof diaphragms. It is submitted the data is useful to show a comparison of how the SCP panels perform on metal framing in a system orienting the SCP panels horizontally on a metal frame.

This example determines the horizontal diaphragm strength of a single floor diaphragm constructed as explained below using a Prototype ¾ inch thick SCP panel by ASTM E 455-98 Static Load Testing of Framed Floor or Roof Diaphragm Construction for Buildings, single beam method.

Test Specimen Materials
A. Floor Diaphragm Materials:

Prototype ¾" SCP—Structural Cement Panel of the present invention reinforced with fiberglass strands. A "V"-groove and tongue is located along the 8' dimension of the 4'×8' sheets. The formulation used in the SCP panel examples of this floor diaphragm test is listed in TABLE 18A.

TABLE 18A

| Ingredient | Weight Proportion (%) |
|---|---|
| Reactive Powder Blend | |
| Portland Cement | 29 |
| Calcium Sulfate Alpha Hemihydrate | 58 |
| Silica Fume | 12 |
| Lime | 1 |
| SCP Cementitious Composition | |
| Portland Cement | 12.2 |
| Calcium Sulfate Alpha Hemihydrate | 24.4 |
| Silica Fume | 5.1 |
| Lime | 0.4 |
| Ceramic Microspheres | 27.4 |
| Superplasticizer | 1.9 |
| Water | 24.2 |
| Alkali-Resistant Glass Fibers[1] | 4.4 |

[1]Weight proportion corresponds to 1.8% volume fraction of Alkali Resistant Glass Fibers in the composite.
Length of glass fibers used in the floor diaphragm test - 36 mm.

Fasteners—#8-18×⅝" lg. Bugle head Grabber Super Drive™ screws spaced 6" o.c. along the perimeter, and 12" o.c. in the field of the panels. All fasteners were placed a minimum of ¾" in from panel edges and ½" in from seams. At panel corners the fasteners were inset 2".

Adhesive—EnerFoam SF polyurethane foam adhesive manufactured by Flexible Products Company of Canada, Inc. was applied to all butt-joints, and tongue and groove joints. One (1) ⅜" bead was applied to the bottom of the groove before setting into place. A ⅜" gap was left at the butt-joint to allow one (1) ⅜" bead of adhesive to be applied in the gap, before sliding the joint together.

Figure 8:
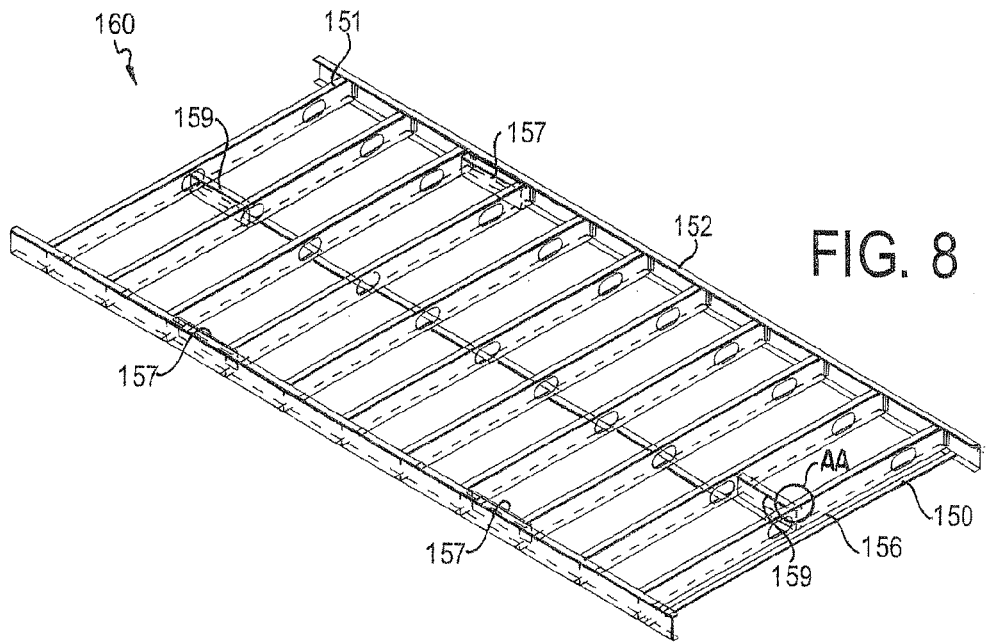
FIG. 8 shows assembled metal, e.g., steel, roof framing.

B. Floor Framing:

FIG. 8 shows assembled metal, e.g., steel, floor framing. This includes the following parts:

A. Transverse Joists 150—16 gauge×10 inches deep×10 foot long Trade Ready™ Joists manufactured by Dietrich Industries. The joists were stamped Dietrich TDW5 W 10IN×L 10 FT 28324013 16 GAUGE G60 50KSI.

B. Longitudinal RimTrack 152—16 gauge×10-3/16" deep× 16' long manufactured by Dietrich Industries with pre-bent joist attachment locations spaced at 24" o.c. The track was stamped Dietrich TD16 W 9¼IN×L 16FT 28323858 16 GAUGE 3RD FI.

C. 0.125" thick×2"×2" steel angles 154 (FIG. 10) are located on each of the transverse end joists 156 spaced starting at the bearing side and spanning up to 3 inches from the load side angel and fixed to the respective end transverse joists with #10-1" DRIVALL screws at 6" o.c.

D. Fasteners

10—16×¾" long hex-head, Drivall screws for attaching framing.

10—16×¾" long wafer head, self-drilling screws for attaching to framing 6" o.c. around the outermost edge and on both sides of the butt joints.

Test Specimen Construction

One (1) test sample was constructed to an overall dimension of 10'-0"×20-0". FIG. 8 shows a perspective view of the metal frame.

Figure 9:
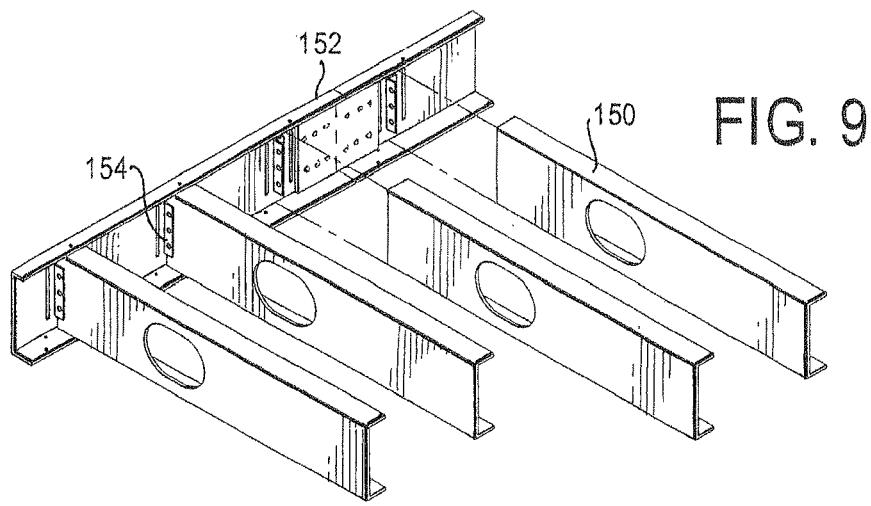
FIG. 9 shows attachment of the C-joist metal framing members to the header.

FIG. 9 shows an enlarged view of a portion of the frame of FIG. 8.

Figure 10:
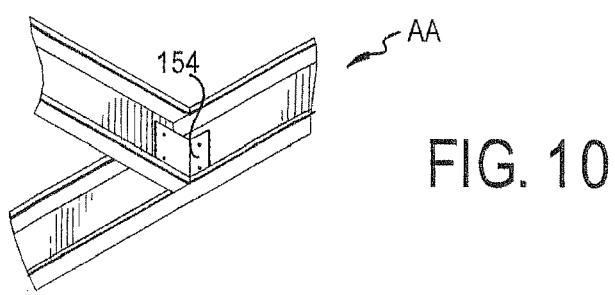
FIG. 10 shows an enlarged view of a portion of the frame of FIG. 8.

FIG. 10 shows an enlarged view of a portion AA of the frame of FIG. 8.

FIG. 11 shows a top view of the SCP panels 120 (with panel dimensions), but manufactured to have tongue and groove edges (not shown) similar to those of FIG. 4a, attached to the metal frame.

FIGS. 12, 13, 14 and 15 show enlarged views of respective portions BB, CC, DD and EE of the floor of FIG. 11.

A. The joists were attached to the rim track using three (3) hex head #10 16×¾" long Drivall screws into the side of the joist through the pre-bent tab and one (1) #10—16×¾" long wafer head self-drilling screws through the top of rim track into the joist, at each end. 0.078" thick×1½"×4" steel angles 151 which are 5" long were also fastened to the respective joist 1" o.c. with ¾ inch long DRIVALL screws and one ¾ inch long DRIVALL screw to the rim track.

B. 1½ inch×2⅝inch×21¾ inch KATZ blocking 158 with a 2 inch long×1¾ inch tab on each end was fastened to the bottom of the joists across the center line of the floor. The blocking 158 was attached using (1) #10—16×¾" long Drivall screw through the end of each Katz blocking member 158. In particular, the Katz blocking 158 is located between transverse joints 50 by being positioned staggered on either side of the midpoint and attached by one #10—16×¾ inch long Drivall screw per tab.

C. Additional horizontal blocking was added, in two locations, to the rim track 152 on the load side to strengthen the rim track 152 for point loading purposes. Namely, 24 inch blocking 157 for load support is provided along the longitudinal rim track between a number of transverse joists 150. 20 inch long blocking 159 is fixed between each transverse end joist and the respective penultimate transverse end joist generally along the longitudinal axis of the frame with four #10—16×¾ inch long DRIVALL screws on each end.

D. The frame was squared and then the prototype SCP panel was fastened to it as shown in FIG. 11. The prototype SCP was fastened at 6" o.c. around the perimeter inset 2" from the corners, and 12 inches o.c. in the field with #8—18×1⅝ inch long Bugle head Grabber Super Drive™ screws (winged self drilling screws 162). Care was taken to ensure that the fasteners were kept flush or slightly below the surface of the prototype SCP and also did not strip out in the steel framing. At the butt-joints and tongue and groove locations, a ⅜ inch bead of ENERFOAM SF polyurethane foam adhesive manufactured by Flexible Products Company of Canada, Inc. was applied in the joint.

E. ⅛"×2"×2" angle iron was then fastened to the end joists flush to the bottom of the joists to minimize crumpling of the joists at the bearings and to represent the top plate member. An additional 6 inches long angle was fastened at the bearing side of the end joists flush to the top of the joist also to minimize crumpling.

F. The test sample set for a minimum of 36 hours to allow the adhesive to cure.

Figure 16:
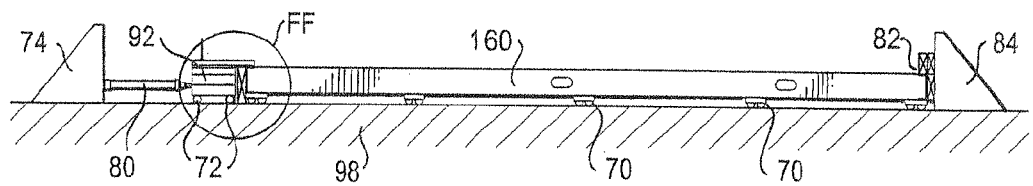
FIG. 16 shows the frame of FIG. 8 having the attached roof of FIG. 9 mounted on a flat roof diaphragm testing apparatus.
Figure 17:
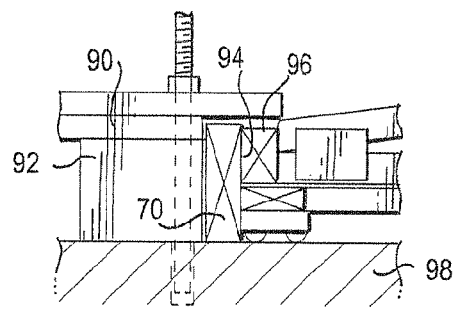
FIG. 17 shows an enlarged view of a portion of the apparatus of FIG. 16.

G. FIG. 16 shows the test sample, frame 160 of FIG. 8 having the attached floor 120 of FIG. 11, supported by appliance rollers at 2 foot-0 inches on center (o.c.) around perimeter of the sample on a concrete floor 98 (FIG. 17). FIG. 17 shows an enlarged view of portion FF of FIG. 16. A bearing support was placed at both ends of the test sample. Three (3) loading cylinders 80 were located on the opposite side of the test sample. The load was applied from the cylinders through steel-beams, to six (6) 18" bearing blocks to uniformly apply the load to the floor. Five (5) dial indicators were placed along the bearing side of the test sample to measure deflections. FIG. 17 shows hold down 92 provided with spacers 90. A gap 96 of about ⅛ inch, and an 18 inch load block 94. The hold down mounted in cement 98.

Test Equipment

A. Three (3) ENERPAC Model P-39 hydraulic hand pumps.

B. Three (3) ENERPAC Model RC-1010 hydraulic cylinders.

C. Five dial indicators: 2 inches movement-0.001 inch increments.

D. Three (3) Omega digital meters.

E. Three (3) Omega pressure transducers.

F. Three (3) 6 ft. I-beams.

G. Five (5) rigid bearings bolted to floor.

Procedure

A. The loads were generated using three (3) 1½ inch diameter×10 inches stroke hydraulic cylinders, one at each load point. The applied forces were measured with three (3) digital meters and pressure transducers. A permanent record of the applied forces was made on the attached data sheets.

B. The loads were generated by applying hydraulic pressure to create mechanical force until the required load was indicated on the digital meters.

C. The entire floor assembly was loaded in increments of 700 lbs. Each load was held for 1 minute before the deflection readings were taken. After the 14,000 lbs. deflection reading was taken, the assembly was then loaded at a rate of approximately 2800 pounds per minute, until a failure occurred.

Figure 19:
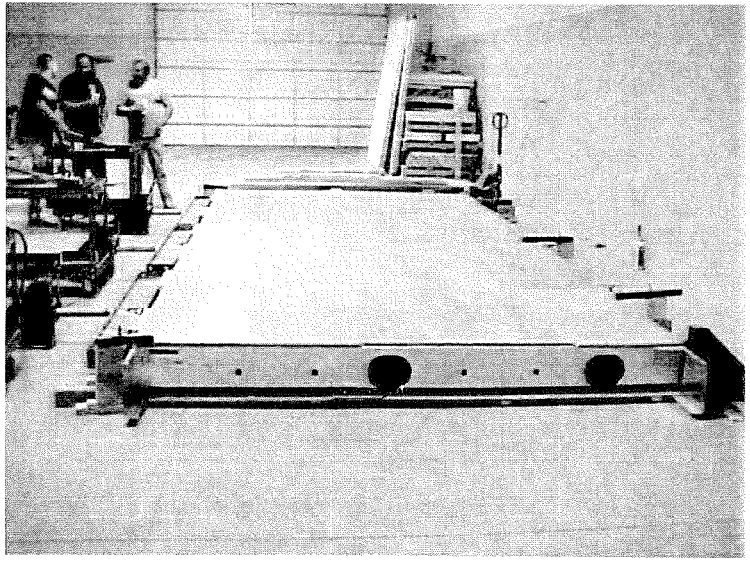
FIG. 19 shows a photograph of the SCP panel and metal frame floor mounted on the test apparatus of FIG. 16 at design load.

FIG. 19 shows a photograph of the SCP panel and metal frame floor mounted on the test apparatus of FIG. 16 at design load.

Figure 20:
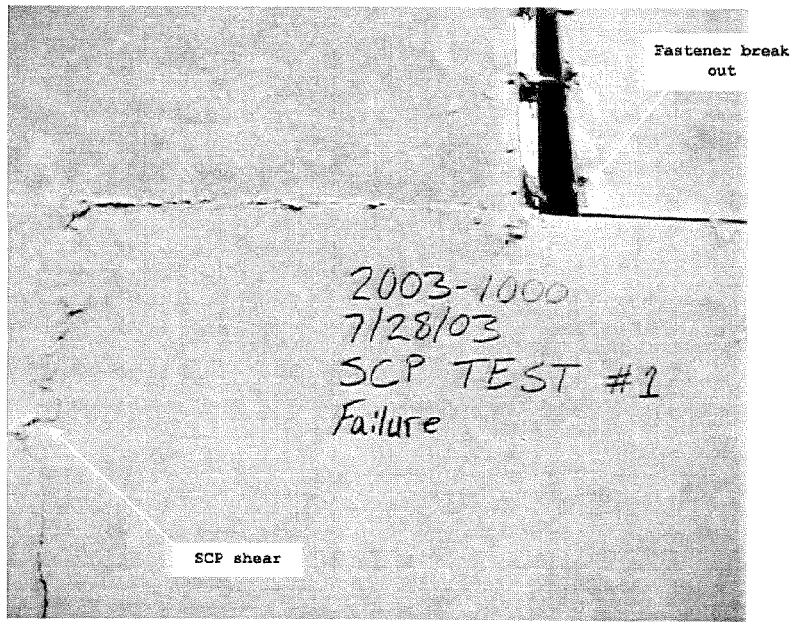
FIG. 20 shows a photograph of the SCP panel and metal frame floor mounted on the test apparatus of FIG. 16 at failure.

FIG. 20 shows a photograph of the SCP panel and metal frame floor mounted on the test apparatus of FIG. 16 at failure.

Test Results

TABLE 19 shows the results of a Floor Diaphragm Test of applying loads to the above-described entire floor assembly. The floor having a width of 120 inches.

Using a factor of safety of 3.0 the following values were obtained.

Ultimate Load=14,618.5 lbs./10.0 ft.=1,461.8 PLF (pounds per linear foot)

Design Shear=1461.8/3.0 safety factor=487.2 PLF

Design shear is calculated by dividing the ultimate load by a safety factor of 3.

Figure 18:
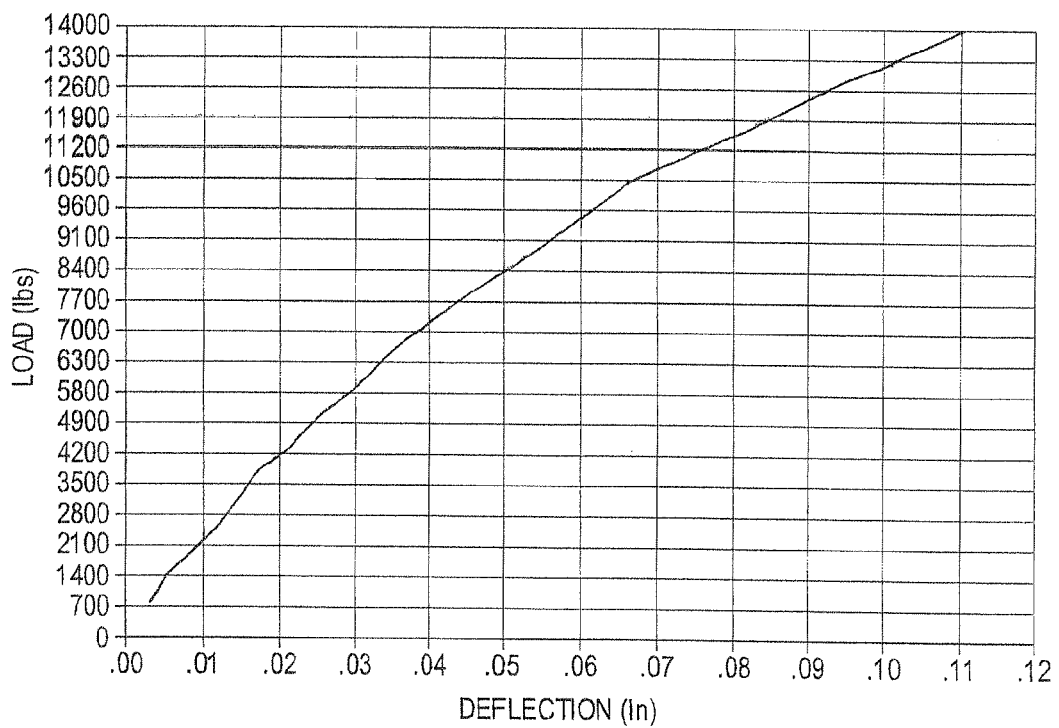
FIG. 18 shows experimental load versus deflection data from an example employing the floor diaphragm testing apparatus of FIG. 16.

Table 20 shows Resultant Deflection occurring due to the application of loads to the floor. FIG. 18 graphs the data of TABLE 20. TABLE 21 shows average bearing deflection from applying loads at bearing points to the test sample floor.

Based on the data obtained from this single test sample a design shear of 487.2 PLF (pounds per linear foot) can be achieved from the above-described single floor diaphragm sample constructed as follows:

TABLE 19

FLOOR DIAPHRAGM TEST

Floor Width: 120 inches;

Design Load: 420 P.L.F. (estimated)

| Loading Increments | FLOOR TEST LOADS | | | |
|---|---|---|---|---|
| | Total Ceiling Load (lbs.) | Load No. 1 (lbs.) | Load No. 2 (lbs.) | Load No. 3 (lbs.) |
| No Load | 0 | 0 | 0 | 0 |
| 1 | 700 | 233 | 233 | 233 |
| 2 | 1400 | 467 | 467 | 467 |
| 3 | 2100 | 700 | 700 | 700 |
| 4 | 2800 | 933 | 933 | 933 |
| 5 | 3500 | 1167 | 1167 | 1167 |
| 6 | 4200 | 1400 | 1400 | 1400 |
| 7 | 4900 | 1633 | 1633 | 1633 |
| 8 | 5600 | 1867 | 1867 | 1867 |
| 9 | 6300 | 2100 | 2100 | 2100 |
| 10 | 7000 | 2333 | 2333 | 2333 |
| 11 | 7700 | 2567 | 2567 | 2567 |
| Design Load | 8400 | 2800 | 2800 | 2800 |
| 13 | 9100 | 3033 | 3033 | 3033 |
| 14 | 9800 | 3267 | 3267 | 3267 |
| 15 | 10500 | 3500 | 3500 | 3500 |
| 16 | 11200 | 3733 | 3733 | 3733 |
| 17 | 11900 | 3967 | 3967 | 3967 |
| 18 | 14000 | 4667 | 4667 | 4667 |
| Ultimate Load | 29237 | 9717 | 9750 | 9770 |
| Design Load 487.3 P.L.F. | | | | |

TABLE 20

Temp. & Humidity During Construction: 71 deg. F./32%
Temp. & Humidity During Test: 73 deg. F./35%

FLOOR TEST LOADS

| Time Load/ Reading | Loading Increments | Load (lbs.) | Clear Span | | | | | | Resultant Deflection * |
|---|---|---|---|---|---|---|---|---|---|
| | | | Indicator #2 | | Indicator #3 | | Indicator #4 | | |
| | | | Reading | Deflection | Reading | Defl. | Reading | Defl. | |
| 9:30 | No Load | 0 | 0.100 | | 0.100 | | 0.100 | | |
| 9:31/9:32 | 1 | 700 | 0.168 | 0.068 | 0.155 | 0.055 | 0.133 | 0.033 | 0.003 |
| 9:33/9:34 | 2 | 1400 | 0.185 | 0.085 | 0.169 | 0.069 | 0.151 | 0.051 | 0.005 |
| 9:35/9:36 | 3 | 2100 | 0.203 | 0.103 | 0.185 | 0.085 | 0.163 | 0.063 | 0.009 |
| 9:37/9:38 | 4 | 2800 | 0.219 | 0.119 | 0.199 | 0.099 | 0.174 | 0.074 | 0.013 |
| 9:39/9:40 | 5 | 3500 | 0.231 | 0.131 | 0.210 | 0.110 | 0.184 | 0.084 | 0.016 |
| 9:41/9:42 | 6 | 4200 | 0.242 | 0.142 | 0.222 | 0.122 | 0.194 | 0.094 | 0.021 |
| 9:43/9:44 | 7 | 4900 | 0.253 | 0.153 | 0.233 | 0.133 | 0.204 | 0.104 | 0.025 |
| 9:45/9:46 | 8 | 5600 | 0.265 | 0.165 | 0.244 | 0.144 | 0.214 | 0.114 | 0.030 |
| 9:47/9:48 | 9 | 6300 | 0.276 | 0.176 | 0.255 | 0.155 | 0.224 | 0.124 | 0.034 |
| 9:49/9:50 | 10 | 7000 | 0.288 | 0.188 | 0.267 | 0.167 | 0.234 | 0.134 | 0.039 |
| 9:51/9:52 | 11 | 7700 | 0.300 | 0.200 | 0.279 | 0.179 | 0.244 | 0.144 | 0.045 |
| 9:53/9:54 | Design Load | 8400 | 0.311 | 0.211 | 0.290 | 0.190 | 0.255 | 0.155 | 0.050 |
| 9:55/9:56 | 13 | 9100 | 0.321 | 0.221 | 0.302 | 0.202 | 0.264 | 0.164 | 0.057 |
| 9:57/9:58 | 14 | 9800 | 0.334 | 0.234 | 0.314 | 0.214 | 0.275 | 0.175 | 0.062 |
| 9:59/10:00 | 15 | 10500 | 0.346 | 0.246 | 0.327 | 0.227 | 0.290 | 0.190 | 0.067 |
| 10:01/10:02 | 16 | 11200 | 0.359 | 0.259 | 0.343 | 0.243 | 0.306 | 0.206 | 0.076 |
| 10:03/10:04 | 17 | 11900 | 0.373 | 0.273 | 0.360 | 0.260 | 0.327 | 0.227 | 0.084 |
| 10:05/10:06 | 18 | 14000 | 0.412 | 0.312 | 0.413 | 0.313 | 0.387 | 0.287 | 0.111 |

Sample Description: Prototype ¾ inch SCP adhered to 16 gauge- 10 inches steel joists, using ENERFOAM SF polyurethane foam adhesive
Mode of Failure: End #2 - butt joint separation on the 4' sheet in the middle row, and at the 95-½" sheet on the load side as the tongue and groove joint slipped. Secondary Failure - Board shear approximately 6' in from the end on the bearing side (See FIG. 20).
* The resultant deflection is equal to the average deflection of the bearings minus the greatest point of deflection across the clear span.
FIG. 18 shows the data graphically.

TABLE 21

| Time Load/ Reading | Loading Increments | Load (lbs.) | Bearing Points | | | | Average Bearing Deflection |
|---|---|---|---|---|---|---|---|
| | | | Indicator #1 | | Indicator #5 | | |
| | | | Reading | Deflection | Reading | Defl. | |
| 9:30 | No Load | 0 | 0.000 | | 0.100 | | |
| 9:31/9:32 | 1 | 700 | 0.080 | 0.080 | 0.125 | 0.025 | 0.053 |
| 9:33/9:34 | 2 | 1400 | 0.096 | 0.096 | 0.132 | 0.032 | 0.064 |
| 9:35/9:36 | 3 | 2100 | 0.113 | 0.113 | 0.138 | 0.038 | 0.076 |
| 9:37/9:38 | 4 | 2800 | 0.127 | 0.127 | 0.145 | 0.045 | 0.086 |
| 9:39/9:40 | 5 | 3500 | 0.137 | 0.137 | 0.151 | 0.051 | 0.094 |
| 9:41/9:42 | 6 | 4200 | 0.145 | 0.145 | 0.158 | 0.058 | 0.102 |
| 9:43/9:44 | 7 | 4900 | 0.152 | 0.152 | 0.165 | 0.065 | 0.109 |
| 9:45/9:46 | 8 | 5600 | 0.158 | 0.158 | 0.171 | 0.071 | 0.115 |
| 9:47/9:48 | 9 | 6300 | 0.166 | 0.166 | 0.177 | 0.077 | 0.122 |
| 9:49/9:50 | 10 | 7000 | 0.174 | 0.174 | 0.183 | 0.083 | 0.129 |
| 9:51/9:52 | 11 | 7700 | 0.179 | 0.179 | 0.190 | 0.090 | 0.135 |
| 9:53/9:54 | Design Load | 8400 | 0.185 | 0.185 | 0.195 | 0.095 | 0.140 |
| 9:55/9:56 | 13 | 9100 | 0.191 | 0.191 | 0.200 | 0.100 | 0.146 |
| 9:57/9:58 | 14 | 9800 | 0.197 | 0.197 | 0.207 | 0.107 | 0.152 |
| 9:59/10:00 | 15 | 10500 | 0.203 | 0.203 | 0.217 | 0.117 | 0.160 |
| 10:01/10:02 | 16 | 11200 | 0.208 | 0.208 | 0.226 | 0.126 | 0.167 |
| 10:03/10:04 | 17 | 11900 | 0.214 | 0.214 | 0.238 | 0.138 | 0.176 |
| 10:05/10:06 | 18 | 14000 | 0.227 | 0.227 | 0.278 | 0.178 | 0.203 |

Example 7

This example determines the effect of water exposure on the horizontal diaphragm strength of an assembly using ¾" inch thick SCP panel by ASTM E455-98 Static Load Testing of Framed Floor or Roof Diaphragm Construction for Buildings, single beam method.

Test Specimen Materials

A. Floor Diaphragm Materials

¾ inch SCP panel reinforced with fiberglass strands. A "V"-groove and tongue are located along the 8' dimension of the 4 foot×8 foot sheets.

Fasteners employed included #8—×1⅝ inch long Bugle head GRABBER SUPER DRIVE screws, available for GRABBER Construction Products, spaced 6 inches on center along the perimeter, and 12 inches on center in the field of the panels. All fasteners were placed a minimum of ¾ inches in from the panel edges and ½ inches from the seams. At panel corners the fasteners were inset 2 inches. See FIG. 11 for fastener locations.

B. Floor Framing

Joists included CSJ 16 gauge×8 inches deep×10 foot rim track manufactured by Dietrich Industries.

Test Specimen Construction

Four (4) test samples were constructed to an overall dimension of 10'-0"×20'-0" as was the test sample described above in Example 6. FIG. 8 shows a perspective of the metal frame.

However, the frame was squared and then the prototype SCP panel was fastened to it as shown in FIG. 11. The prototype SCP was fastened at 6" o.c. around the perimeter and inset 2" from the corners, 12" o.c. in the field with #8—18× 1⅝" long Bugle head Grabber SuperDrive screws (winged self drilling screws 162). Care was taken to ensure that the fasteners were kept flush or slightly below the surface of the prototype SCP and also did not strip out in the steel framing. In contrast to the test sample of Example 6, at the butt-joints and tongue and groove locations, a ⅜ inch bead of ENER-FOAM SF polyurethane foam adhesive manufactured by Flexible Products Company of Canada, Inc. was not applied in the joint.

Test Equipment

A. Four (4) ENERPAC Model P-39 hydraulic hand pumps
B. Four (4) ENERPAC Model RC-1010 hydraulic cylinders
C. Five (5) dial indicators 2" movement-0.001 increments
D. Four (4) OMEGA digital meters
E. Four (4) OMEGA pressure transducers
F. Four (4) 6 ft I-Beams
G. Six (6) rigid bearings bolted to the floor Procedure A. Two of the test assemblies were tested in an "as received", or dry condition and two samples were tested after a 1" head of water was present for a minimum of 24 hours.

B. The loads were generated using four (4)1½" diameter hydraulic cylinders, one at each loading point. The applied forces were measured with four (4) calibrated digital meters and pressure transducers. A permanent record of the applied forces was made on the attached data sheets.

C. The loads were generated be applying hydraulic pressure to create mechanical force until the required load was indicated on the digital meters.

D. The entire floor assembly was loaded in increments of 700 lbs. Each load was held for 1 minute before the deflection readings were taken. After the 14000 lb deflection reading was taken, the assembly was then loaded at a rate of approximately 2800 pounds per minute, until a failure occurred.

Test Results

Figure 24:
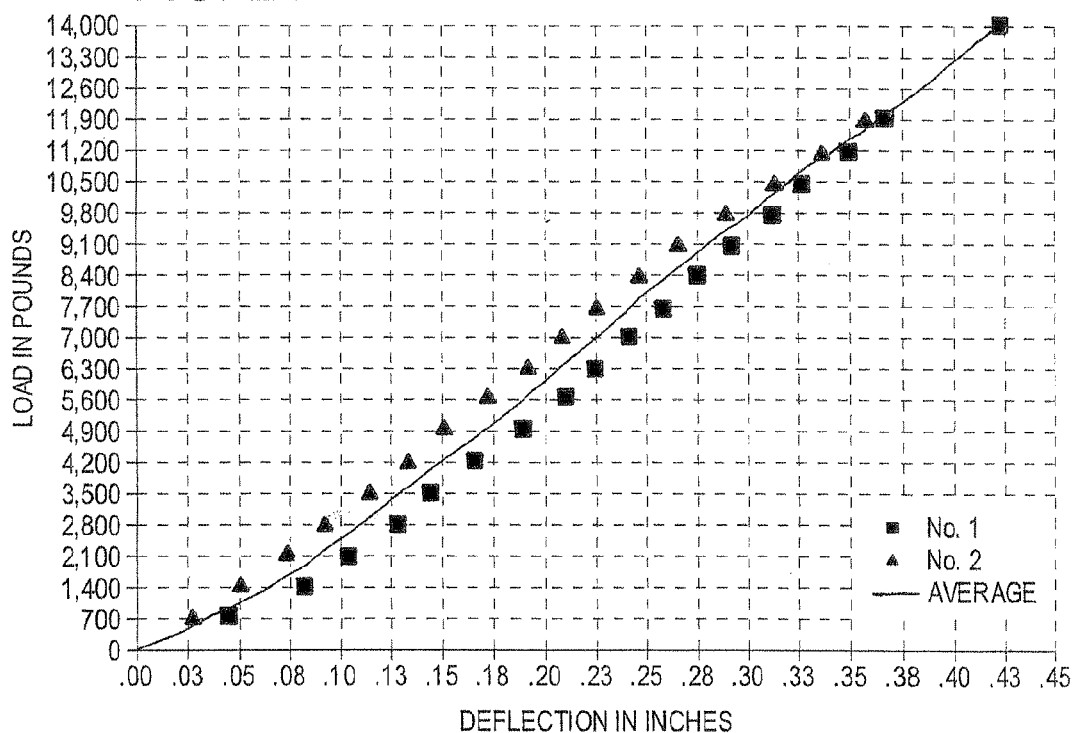
FIG. 24 shows a Floor Diaphragm test using a ¾ inch thick SCP panel in a dry test.
Figure 25:
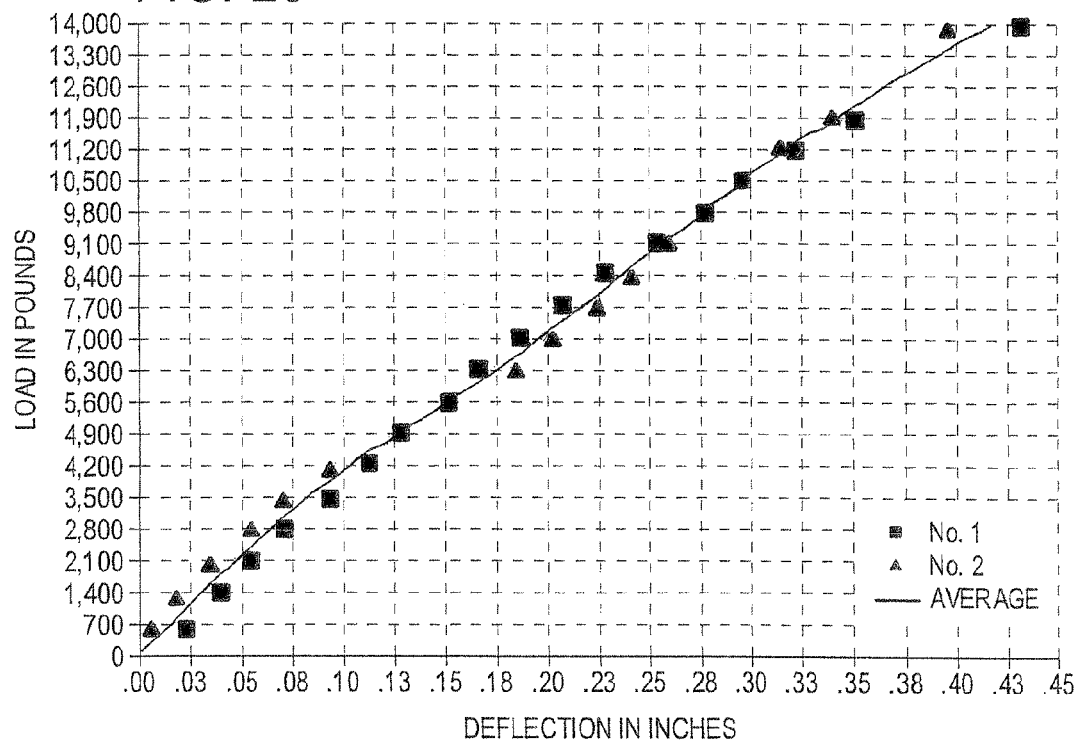
FIG. 25 shows a Floor Diaphragm test using a ¾ inch thick SCP panel in a wet test.

TABLES 22-38 and FIGS. 24 and 25 show the results of the floor diaphragm tests of applying loads to the above described entire floor assembly. The floor having a width of 120 inches. FIG. 24 shows the data of Dry Test 1 and Dry Test 2. FIG. 25 shows data from Wet Test 1 and Wet Test 2.

Using a factor of safety of 3.0, the following values were obtained.

Average ultimate load of dry samples=15,908.2 lb/10 ft=1,590.8 PLF

Design Shear of dry samples=1,590.8 PLF/3.0 safety factor=530.2 PLF

Average ultimate load of wet samples=14,544.5 lb/10 ft=1,454.4 PLF

Design Shear of wet samples=1,454.4 PLF/3.0 safety factor=484.8 PLF

These results indicate than approximately a 91% retention of diaphragm strength after continuous exposure to water for a 24 hour time period.

TABLE 22

Floor Diaphragm Test; Floor width 120 inches; Design Load 420 P.L.F. (Dry Test 1)

| Loading Increments | Total Ceiling Load (lbs.) | Floor Test Loads | | | |
|---|---|---|---|---|---|
| | | Load No. 1 (lbs.) | Load No. 2 (lbs.) | Load No. 3 (lbs.) | Load No. 4 (lbs.) |
| No Load | 0 | 0 | 0 | 0 | 0 |
| 1 | 700 | 175 | 175 | 175 | 175 |
| 2 | 1400 | 350 | 350 | 350 | 350 |
| 3 | 2100 | 525 | 525 | 525 | 525 |
| 4 | 2800 | 700 | 700 | 700 | 700 |
| 5 | 3500 | 875 | 875 | 875 | 875 |
| 6 | 4200 | 1050 | 1050 | 1050 | 1050 |
| 7 | 4900 | 1225 | 1225 | 1225 | 1225 |
| 8 | 5600 | 1400 | 1400 | 1400 | 1400 |
| 9 | 6300 | 1575 | 1575 | 1575 | 1575 |
| 10 | 7000 | 1750 | 1750 | 1750 | 1750 |
| 11 | 7700 | 1925 | 1925 | 1925 | 1925 |
| Design Load | 8400 | 2100 | 2100 | 2100 | 2100 |
| 13 | 9100 | 2275 | 2275 | 2275 | 2275 |
| 14 | 9800 | 2450 | 2450 | 2450 | 2450 |
| 15 | 10500 | 2625 | 2625 | 2625 | 2625 |
| 16 | 11200 | 2800 | 2800 | 2800 | 2800 |
| 17 | 11900 | 2975 | 2975 | 2975 | 2975 |
| 18 | 14000 | 3500 | 3500 | 3500 | 3500 |
| Ultimate Load | 28,665 | 7,039 | 7,317 | 7,262 | 7,047 |
| Design Load 477.8 P.L.F. | | | | | |

There are two design loads in this table. To set up the test and size the test equipment you initially hypothesize t first design load, here 420 P.L.F. The measured 477.8 P.L.F. is the actual Design Load determined from actual measurements and adding a safety factor.

TABLE 23

Floor Diaphragm Test (Dry Test 1) Clear Span

| Load Increment | Load (lbs.) | Indicator #2 | | Indicator #3 | | Indicator #4 | | RESULTANT DEFLECTION* |
|---|---|---|---|---|---|---|---|---|
| | | Reading | Deflection | Reading | Deflection | Reading | Deflection | |
| No Load | 0 | 0.154 | — | 0.084 | — | 0.094 | — | — |
| 1 | 700 | 0.187 | 0.033 | 0.128 | 0.044 | 0.148 | 0.054 | 0.044 |
| 2 | 1400 | 0.225 | 0.071 | 0.165 | 0.081 | 0.182 | 0.088 | 0.081 |
| 3 | 2100 | 0.244 | 0.090 | 0.187 | 0.103 | 0.202 | 0.108 | 0.103 |
| 4 | 2800 | 0.260 | 0.106 | 0.211 | 0.127 | 0.223 | 0.129 | 0.127 |
| 5 | 3500 | 0.275 | 0.121 | 0.228 | 0.144 | 0.242 | 0.148 | 0.144 |
| 6 | 4200 | 0.291 | 0.137 | 0.250 | 0.166 | 0.265 | 0.171 | 0.166 |

TABLE 23-continued

Floor Diaphragm Test (Dry Test 1)
Clear Span

| Load Increment | Load (lbs.) | Indicator #2 Reading | Deflection | Indicator #3 Reading | Deflection | Indicator #4 Reading | Deflection | RESULTANT DEFLECTION* |
|---|---|---|---|---|---|---|---|---|
| 7 | 4900 | 0.308 | 0.154 | 0.274 | 0.190 | 0.292 | 0.198 | 0.190 |
| 8 | 5600 | 0.325 | 0.171 | 0.295 | 0.211 | 0.316 | 0.222 | 0.211 |
| 9 | 6300 | 0.338 | 0.184 | 0.309 | 0.225 | 0.326 | 0.232 | 0.224 |
| 10 | 7000 | 0.354 | 0.200 | 0.327 | 0.243 | 0.341 | 0.247 | 0.241 |
| 11 | 7700 | 0.369 | 0.215 | 0.344 | 0.260 | 0.356 | 0.262 | 0.258 |
| Design Load | 8400 | 0.386 | 0.232 | 0.362 | 0.278 | 0.372 | 0.278 | 0.276 |
| 13 | 9100 | 0.402 | 0.248 | 0.380 | 0.296 | 0.385 | 0.291 | 0.293 |
| 14 | 9800 | 0.425 | 0.271 | 0.405 | 0.321 | 0.410 | 0.316 | 0.313 |
| 15 | 10500 | 0.454 | 0.300 | 0.442 | 0.358 | 0.449 | 0.355 | 0.325 |
| 16 | 11200 | 0.495 | 0.341 | 0.490 | 0.406 | 0.502 | 0.408 | 0.348 |
| 17 | 11900 | 0.512 | 0.358 | 0.521 | 0.437 | 0.535 | 0.441 | 0.367 |
| 18 | 14000 | 0.569 | 0.415 | 0.596 | 0.512 | 0.614 | 0.520 | 0.422 |

Temp. and Humidity During Construction: 65° F./31%
Temp. and Humidity During Test: 65° F./31%
Sample Description ¾ inch SCP panel fastened to 16 gauge - 10 inch steel joists
Mode of failure: Several of the butt-joints opened up in several locations causing cement board core failure at the fasteners along the edges of the cement board.
*The resultant deflection is equal to the average deflection of the bearings minus the greatest point of deflection across the clear span.

TABLE 24

Floor Diaphragm Test (Dry Test 1)

| Load Increment | Load (lbs.) | Bearing Points Indicator #1 Reading | Deflection | Indicator #5 Reading | Deflection | AVERAGE BEARING DEFLECTION |
|---|---|---|---|---|---|---|
| No Load | 0 lbs | 0.069 | — | 0.266 | — | — |
| 1 | 700 | 0.069 | 0.000 | 0.266 | 0.000 | 0.000 |
| 2 | 1400 | 0.069 | 0.000 | 0.266 | 0.000 | 0.000 |
| 3 | 2100 | 0.069 | 0.000 | 0.266 | 0.000 | 0.000 |
| 4 | 2800 | 0.069 | 0.000 | 0.266 | 0.000 | 0.000 |
| 5 | 3500 | 0.069 | 0.000 | 0.266 | 0.000 | 0.000 |
| 6 | 4200 | 0.069 | 0.000 | 0.266 | 0.000 | 0.000 |
| 7 | 4900 | 0.069 | 0.000 | 0.266 | 0.000 | 0.000 |
| 8 | 5600 | 0.069 | 0.000 | 0.266 | 0.000 | 0.000 |
| 9 | 6300 | 0.070 | 0.001 | 0.267 | 0.001 | 0.001 |
| 10 | 7000 | 0.072 | 0.003 | 0.267 | 0.001 | 0.002 |
| 11 | 7700 | 0.072 | 0.003 | 0.267 | 0.001 | 0.002 |
| Design Load | 8400 | 0.073 | 0.004 | 0.267 | 0.001 | 0.003 |
| 13 | 9100 | 0.075 | 0.006 | 0.267 | 0.001 | 0.004 |
| 14 | 9800 | 0.083 | 0.014 | 0.268 | 0.002 | 0.008 |
| 15 | 10500 | 0.094 | 0.025 | 0.307 | 0.041 | 0.033 |
| 16 | 11200 | 0.105 | 0.036 | 0.346 | 0.080 | 0.058 |
| 17 | 11900 | 0.107 | 0.038 | 0.369 | 0.103 | 0.071 |
| 18 | 14000 | 0.114 | 0.045 | 0.402 | 0.136 | 0.091 |

Bearing Indictors 2, 3 and 4 (labeled "Clear Span") of Table 23 are the instruments along the test specimen in the area between the support points at the two opposed ends of the frame.
Bearing Indicators 1 and 5 of Table 24 are at the support points of this test specimen.

TABLE 25

Floor Diaphragm Test; Floor width 120 inches; Design Load 420 P.L.F. (Dry Test 2)
Floor Test Loads

| Loading Increments | Total Ceiling Load (lbs.) | Load No. 1 (lbs.) | Load No. 2 (lbs.) | Load No. 3 (lbs.) | Load No. 4 (lbs.) |
|---|---|---|---|---|---|
| No Load | 0 | 0 | 0 | 0 | 0 |
| 1 | 700 | 175 | 175 | 175 | 175 |
| 2 | 1400 | 350 | 350 | 350 | 350 |
| 3 | 2100 | 525 | 525 | 525 | 525 |
| 4 | 2800 | 700 | 700 | 700 | 700 |
| 5 | 3500 | 875 | 875 | 875 | 875 |

TABLE 25-continued

Floor Diaphragm Test; Floor width 120 inches;
Design Load 420 P.L.F. (Dry Test 2)
Floor Test Loads

| Loading Increments | Total Ceiling Load (lbs.) | Load No. 1 (lbs.) | Load No. 2 (lbs.) | Load No. 3 (lbs.) | Load No. 4 (lbs.) |
|---|---|---|---|---|---|
| 6 | 4200 | 1050 | 1050 | 1050 | 1050 |
| 7 | 4900 | 1225 | 1225 | 1225 | 1225 |
| 8 | 5600 | 1400 | 1400 | 1400 | 1400 |
| 9 | 6300 | 1575 | 1575 | 1575 | 1575 |
| 10 | 7000 | 1750 | 1750 | 1750 | 1750 |
| 11 | 7700 | 1925 | 1925 | 1925 | 1925 |
| Design Load | 8400 | 2100 | 2100 | 2100 | 2100 |
| 13 | 9100 | 2275 | 2275 | 2275 | 2275 |
| 14 | 9800 | 2450 | 2450 | 2450 | 2450 |
| 15 | 10500 | 2625 | 2625 | 2625 | 2625 |
| 16 | 11200 | 2800 | 2800 | 2800 | 2800 |
| 17 | 11900 | 2975 | 2975 | 2975 | 2975 |
| 18 | 14000 | 3500 | 3500 | 3500 | 3500 |
| Ultimate Load Design Load 582.8 P.L.F. | 34,968 | 8,900 | 8,653 | 8,715 | 8,700 |

TABLE 26

Floor Diaphragm Test (Dry Test 2)

| Load Increment | Load (lbs.) | Clear Span | | | | | | RESULTANT DEFLECTION* |
|---|---|---|---|---|---|---|---|---|
| | | Indicator #2 | | Indicator #3 | | Indicator #4 | | |
| | | Reading | Deflection | Reading | Deflection | Reading | Deflection | |
| No Load | 0 lbs. | 0.290 | — | 0.127 | — | 0.231 | — | — |
| 1 | 700 lbs. | 0.322 | 0.032 | 0.156 | 0.029 | 0.250 | 0.019 | 0.028 |
| 2 | 1400 lbs. | 0.342 | 0.052 | 0.178 | 0.051 | 0.270 | 0.039 | 0.050 |
| 3 | 2100 lbs. | 0.365 | 0.075 | 0.202 | 0.075 | 0.292 | 0.061 | 0.073 |
| 4 | 2800 lbs. | 0.381 | 0.091 | 0.222 | 0.095 | 0.312 | 0.081 | 0.092 |
| 5 | 3500 lbs. | 0.398 | 0.108 | 0.244 | 0.117 | 0.334 | 0.103 | 0.113 |
| 6 | 4200 lbs. | 0.414 | 0.124 | 0.265 | 0.138 | 0.354 | 0.123 | 0.133 |
| 7 | 4900 lbs. | 0.429 | 0.139 | 0.285 | 0.158 | 0.375 | 0.144 | 0.152 |
| 8 | 5600 lbs. | 0.446 | 0.156 | 0.307 | 0.180 | 0.396 | 0.165 | 0.173 |
| 9 | 6300 lbs. | 0.463 | 0.173 | 0.328 | 0.201 | 0.415 | 0.184 | 0.192 |
| 10 | 7000 lbs. | 0.478 | 0.188 | 0.345 | 0.218 | 0.433 | 0.202 | 0.209 |
| 11 | 7700 lbs. | 0.493 | 0.203 | 0.363 | 0.236 | 0.450 | 0.219 | 0.225 |
| Design Load | 8400 lbs. | 0.510 | 0.220 | 0.486 | 0.259 | 0.471 | 0.240 | 0.247 |
| 13 | 9100 lbs. | 0.525 | 0.235 | 0.404 | 0.277 | 0.490 | 0.259 | 0.265 |
| 14 | 9800 lbs. | 0.543 | 0.253 | 0.429 | 0.302 | 0.513 | 0.282 | 0.289 |
| 15 | 10500 lbs. | 0.562 | 0.272 | 0.454 | 0.327 | 0.540 | 0.309 | 0.313 |
| 16 | 11200 lbs. | 0.581 | 0.291 | 0.478 | 0.351 | 0.564 | 0.333 | 0.337 |
| 17 | 11900 lbs. | 0.600 | 0.310 | 0.500 | 0.373 | 0.585 | 0.354 | 0.358 |
| 18 | 14000 lbs. | 0.655 | 0.365 | 0.565 | 0.438 | 0.640 | 0.409 | 0.421 |

Temp. and Humidity During Construction: 70° F./50%
Temp. and Humidity During Test: 70° F./48%
Sample Description: ¾ inch SCP panel fastened to 16 gauge - 8 inch steel joints
Mode of failure: Several of the butt-joints opened up in several locations causing cement board core failure at the fasteners along the edges of the cement board.
*The resultant deflection is equal to the average deflection of the bearings minus the greatest point of deflection across the clear span.

TABLE 27

Floor Diagram Test (Dry Test 2)

| Load Increment | Load (lbs.) | Bearing Points | | | | AVERAGE BEARING DEFLECTION |
|---|---|---|---|---|---|---|
| | | Indicator #1 | | Indicator #5 | | |
| | | Reading | Deflection | Reading | Deflection | |
| No Load | 0 | 0.124 | — | 0.201 | — | — |
| 1 | 700 | 0.125 | 0.001 | 0.202 | 0.001 | 0.001 |
| 2 | 1400 | 0.125 | 0.001 | 0.203 | 0.002 | 0.002 |
| 3 | 2100 | 0.127 | 0.003 | 0.203 | 0.002 | 0.003 |
| 4 | 2800 | 0.128 | 0.004 | 0.203 | 0.002 | 0.003 |
| 5 | 3500 | 0.129 | 0.005 | 0.204 | 0.003 | 0.004 |
| 6 | 4200 | 0.131 | 0.006 | 0.205 | 0.004 | 0.005 |
| 7 | 4900 | 0.132 | 0.007 | 0.206 | 0.005 | 0.006 |
| 8 | 5600 | 0.134 | 0.010 | 0.206 | 0.005 | 0.007 |
| 9 | 6300 | 0.136 | 0.012 | 0.207 | 0.006 | 0.009 |
| 10 | 7000 | 0.137 | 0.013 | 0.208 | 0.006 | 0.009 |
| 11 | 7700 | 0.139 | 0.015 | 0.208 | 0.007 | 0.011 |

TABLE 27-continued

Floor Diagram Test (Dry Test 2)

| Load Increment | Load (lbs.) | Bearing Points | | | | AVERAGE BEARING DEFLECTION |
|---|---|---|---|---|---|---|
| | | Indicator #1 | | Indicator #5 | | |
| | | Reading | Deflection | Reading | Deflection | |
| Design Load | 8400 | 0.141 | 0.017 | 0.208 | 0.007 | 0.012 |
| 13 | 9100 | 0.141 | 0.017 | 0.208 | 0.007 | 0.012 |
| 14 | 9800 | 0.143 | 0.019 | 0.208 | 0.007 | 0.013 |
| 15 | 10500 | 0.145 | 0.021 | 0.209 | 0.008 | 0.015 |
| 16 | 11200 | 0.145 | 0.021 | 0.209 | 0.008 | 0.015 |
| 17 | 11900 | 0.147 | 0.023 | 0.209 | 0.008 | 0.016 |
| 18 | 14000 | 0.150 | 0.026 | 0.209 | 0.008 | 0.017 |

Temp. and Humidity During Construction: 70° F./50%
Temp. and Humidity During Test: 70° F./48%
Sample Description: ¾ inch SCP panel fastened to 16 gauge - 8 inch steel joists
Mode of failure: Several of the butt-joints opened up in several locations causing cement board core failure at the fasteners along the edges of the cement board.
* The resultant deflection is equal to the average deflection of the bearings minus the greatest point of deflection across the clear span.

TABLE 28

Floor Diaphragm Test (Wet Test 1); Floor width 120 inches; Design Load 420 P.L.F.
Floor Test Loads

| Loading Increments | Total Ceiling Load (lbs.) | Load No. 1 (lbs.) | Load No. 2 (lbs.) | Load No. 3 (lbs.) | Load No. 4 (lbs.) |
|---|---|---|---|---|---|
| No Load | 0 | 0 | 0 | 0 | 0 |
| 1 | 700 | 175 | 175 | 175 | 175 |
| 2 | 1400 | 350 | 350 | 350 | 350 |
| 3 | 2100 | 525 | 525 | 525 | 525 |
| 4 | 2800 | 700 | 700 | 700 | 700 |
| 5 | 3500 | 875 | 875 | 875 | 875 |
| 6 | 4200 | 1050 | 1050 | 1050 | 1050 |
| 7 | 4900 | 1225 | 1225 | 1225 | 1225 |
| 8 | 5600 | 1400 | 1400 | 1400 | 1400 |
| 9 | 6300 | 1575 | 1575 | 1575 | 1575 |
| 10 | 7000 | 1750 | 1750 | 1750 | 1750 |
| 11 | 7700 | 1925 | 1925 | 1925 | 1925 |
| Design Load | 8400 | 2100 | 2100 | 2100 | 2100 |
| 13 | 9100 | 2275 | 2275 | 2275 | 2275 |
| 14 | 9800 | 2450 | 2450 | 2450 | 2450 |
| 15 | 10500 | 2625 | 2625 | 2625 | 2625 |
| 16 | 11200 | 2800 | 2800 | 2800 | 2800 |
| 17 | 11900 | 2975 | 2975 | 2975 | 2975 |
| 18 | 14000 | 3500 | 3500 | 3500 | 3500 |
| Ultimate Load | 27,893 | 7,097 | 6,878 | 6,850 | 7,068 |
| Design Load 464.9 P.L.F. | | | | | |

TABLE 29

Floor Diaphragm Comparison Test (Wet Test 1)

| Load Increment | Load (lbs.) | Clear Span | | | | | | RESULTANT DEFLECTION* |
|---|---|---|---|---|---|---|---|---|
| | | Indicator #2 | | Indicator #3 | | Indicator #4 | | |
| | | Reading | Deflection | Reading | Deflection | Reading | Deflection | |
| No Load | 0 | 0.211 | — | 0.185 | — | 0.268 | — | — |
| 1 | 700 | 0.239 | 0.028 | 0.208 | 0.023 | 0.287 | 0.019 | 0.023 |
| 2 | 1400 | 0.245 | 0.034 | 0.225 | 0.040 | 0.293 | 0.025 | 0.040 |
| 3 | 2100 | 0.267 | 0.056 | 0.239 | 0.054 | 0.316 | 0.048 | 0.053 |
| 4 | 2800 | 0.287 | 0.076 | 0.260 | 0.075 | 0.336 | 0.068 | 0.073 |
| 5 | 3500 | 0.304 | 0.093 | 0.280 | 0.095 | 0.354 | 0.086 | 0.093 |
| 6 | 4200 | 0.320 | 0.109 | 0.300 | 0.115 | 0.372 | 0.104 | 0.113 |
| 7 | 4900 | 0.335 | 0.124 | 0.318 | 0.133 | 0.388 | 0.120 | 0.131 |
| 8 | 5600 | 0.354 | 0.143 | 0.339 | 0.154 | 0.405 | 0.137 | 0.152 |
| 9 | 6300 | 0.369 | 0.158 | 0.356 | 0.171 | 0.421 | 0.153 | 0.168 |
| 10 | 7000 | 0.388 | 0.177 | 0.378 | 0.193 | 0.441 | 0.173 | 0.188 |
| 11 | 7700 | 0.405 | 0.194 | 0.398 | 0.213 | 0.458 | 0.190 | 0.207 |
| Design Load | 8400 | 0.430 | 0.219 | 0.426 | 0.241 | 0.481 | 0.213 | 0.230 |
| 13 | 9100 | 0.469 | 0.258 | 0.463 | 0.278 | 0.508 | 0.240 | 0.252 |
| 14 | 9800 | 0.500 | 0.289 | 0.497 | 0.312 | 0.536 | 0.268 | 0.275 |
| 15 | 10500 | 0.521 | 0.310 | 0.522 | 0.337 | 0.558 | 0.290 | 0.298 |
| 16 | 11200 | 0.545 | 0.334 | 0.549 | 0.364 | 0.582 | 0.314 | 0.323 |

TABLE 29-continued

Floor Diaphragm Comparison Test (Wet Test 1)

| Load Increment | Load (lbs.) | Clear Span | | | | | | RESULTANT DEFLECTION* |
|---|---|---|---|---|---|---|---|---|
| | | Indicator #2 | | Indicator #3 | | Indicator #4 | | |
| | | Reading | Deflection | Reading | Deflection | Reading | Deflection | |
| 17 | 11900 | 0.569 | 0.358 | 0.579 | 0.394 | 0.610 | 0.342 | 0.351 |
| 18 | 14000 | 0.635 | 0.424 | 0.668 | 0.483 | 0.692 | 0.424 | 0.431 |

Temp. and Humidity During Construction: 65° F./31%
Temp. and Humidity During Test: 65° F./31%
Sample Description ¾ inch SCP panel fastened to 16 gauge - 8 inch steel joints
Several of the butt-joints opened up in several locations causing cement board core failure at the fasteners along the edges of the cement board.
*The resultant deflection is equal to the average deflection of the bearings minus the greatest point of deflection across the clear span.

TABLE 30

Floor Diaphragm Test (Wet Test 1)

| Load Increment | Load (lbs.) | Bearing Points | | | | AVERAGE BEARING DEFLECTION |
|---|---|---|---|---|---|---|
| | | Indicator #1 | | Indicator #5 | | |
| | | Reading | Deflection | Reading | Deflection | |
| No Load | 0 | 0.199 | — | 0.341 | — | — |
| 1 | 700 | 0.199 | 0.000 | 0.342 | 0.001 | 0.001 |
| 2 | 1400 | 0.199 | 0.000 | 0.342 | 0.001 | 0.001 |
| 3 | 2100 | 0.199 | 0.000 | 0.343 | 0.002 | 0.001 |
| 4 | 2800 | 0.199 | 0.000 | 0.345 | 0.004 | 0.002 |
| 5 | 3500 | 0.199 | 0.000 | 0.345 | 0.004 | 0.002 |
| 6 | 4200 | 0.199 | 0.000 | 0.345 | 0.004 | 0.002 |
| 7 | 4900 | 0.199 | 0.000 | 0.346 | 0.005 | 0.002 |
| 8 | 5600 | 0.199 | 0.000 | 0.346 | 0.005 | 0.002 |
| 9 | 6300 | 0.200 | 0.001 | 0.347 | 0.006 | 0.003 |
| 10 | 7000 | 0.203 | 0.004 | 0.347 | 0.006 | 0.005 |
| 11 | 7700 | 0.204 | 0.005 | 0.348 | 0.007 | 0.006 |
| Design Load | 8400 | 0.214 | 0.015 | 0.348 | 0.007 | 0.011 |
| 13 | 9100 | 0.244 | 0.045 | 0.349 | 0.008 | 0.027 |
| 14 | 9800 | 0.265 | 0.066 | 0.349 | 0.008 | 0.037 |
| 15 | 10500 | 0.268 | 0.069 | 0.350 | 0.009 | 0.039 |
| 16 | 11200 | 0.272 | 0.073 | 0.351 | 0.010 | 0.042 |
| 17 | 11900 | 0.275 | 0.076 | 0.352 | 0.011 | 0.044 |
| 18 | 14000 | 0.289 | 0.090 | 0.355 | 0.014 | 0.052 |

Temp. and Humidity During Construction: 65° F./31%
Temp. and Humidity During Test: 65° F./31%
Sample Description ¾ inch SCP panel fastened to 16 gauge - 8 inch steel joints
Several of the butt-joints opened up in several locations causing cement board core failure at the fasteners along the edges of the cement board.
* The resultant deflection is equal to the average deflection of the bearings minus the greatest point of deflection across the clear span.

TABLE 31

Floor Diaphragm Test (Wet); Floor Width;
Design Load 420 P.L.F. (Wet Test 2)
Floor Test Loads

| Loading Increments | Total Ceiling Load (lbs.) | Load No. 1 (lbs.) | Load No. 2 (lbs.) | Load No. 3 (lbs.) | Load No. 4 (lbs.) |
|---|---|---|---|---|---|
| No Load | 0 | 0 | 0 | 0 | 0 |
| 1 | 700 | 175 | 175 | 175 | 175 |
| 2 | 1400 | 350 | 350 | 350 | 350 |
| 3 | 2100 | 525 | 525 | 525 | 525 |
| 4 | 2800 | 700 | 700 | 700 | 700 |
| 5 | 3500 | 875 | 875 | 875 | 875 |
| 6 | 4200 | 1050 | 1050 | 1050 | 1050 |
| 7 | 4900 | 1225 | 1225 | 1225 | 1225 |
| 8 | 5600 | 1400 | 1400 | 1400 | 1400 |
| 9 | 6300 | 1575 | 1575 | 1575 | 1575 |
| 10 | 7000 | 1750 | 1750 | 1750 | 1750 |
| 11 | 7700 | 1925 | 1925 | 1925 | 1925 |
| Design Load | 8400 | 2100 | 2100 | 2100 | 2100 |
| 13 | 9100 | 2275 | 2275 | 2275 | 2275 |
| 14 | 9800 | 2450 | 2450 | 2450 | 2450 |
| 15 | 10500 | 2625 | 2625 | 2625 | 2625 |

TABLE 31-continued

Floor Diaphragm Test (Wet); Floor Width; Design Load 420 P.L.F. (Wet Test 2)
Floor Test Loads

| Loading Increments | Total Ceiling Load (lbs.) | Load No. 1 (lbs.) | Load No. 2 (lbs.) | Load No. 3 (lbs.) | Load No. 4 (lbs.) |
|---|---|---|---|---|---|
| 16 | 11200 | 2800 | 2800 | 2800 | 2800 |
| 17 | 11900 | 2975 | 2975 | 2975 | 2975 |
| 18 | 14000 | 3500 | 3500 | 3500 | 3500 |
| Ultimate Load Design Load 504.8 P.L.F. | 30,285 | 7,327 | 7,707 | 7,740 | 7,511 |

TABLE 32

Floor Diaphragm Comparison Test (Wet Test 2)

| Load Increment | Load (lbs.) | Clear Span Indicator #2 Reading | Deflection | Indicator #3 Reading | Deflection | Indicator #4 Reading | Deflection | RESULTANT DEFLECTION* |
|---|---|---|---|---|---|---|---|---|
| No Load | 0 | 0.166 | — | 0.136 | — | 0.129 | — | — |
| 1 | 700 | 0.180 | 0.014 | 0.144 | 0.008 | 0.140 | 0.011 | 0.007 |
| 2 | 1400 | 0.193 | 0.027 | 0.156 | 0.020 | 0.150 | 0.021 | 0.019 |
| 3 | 2100 | 0.210 | 0.044 | 0.173 | 0.037 | 0.167 | 0.038 | 0.035 |
| 4 | 2800 | 0.228 | 0.062 | 0.192 | 0.056 | 0.181 | 0.052 | 0.054 |
| 5 | 3500 | 0.240 | 0.074 | 0.210 | 0.074 | 0.195 | 0.066 | 0.071 |
| 6 | 4200 | 0.268 | 0.102 | 0.233 | 0.197 | 0.213 | 0.084 | 0.094 |
| 7 | 4900 | 0.312 | 0.146 | 0.270 | 0.134 | 0.237 | 0.108 | 0.130 |
| 8 | 5600 | 0.337 | 0.171 | 0.293 | 0.157 | 0.255 | 0.126 | 0.152 |
| 9 | 6300 | 0.370 | 0.204 | 0.326 | 0.190 | 0.280 | 0.151 | 0.184 |
| 10 | 7000 | 0.387 | 0.221 | 0.345 | 0.209 | 0.295 | 0.166 | 0.201 |
| 11 | 7700 | 0.406 | 0.240 | 0.367 | 0.231 | 0.314 | 0.185 | 0.223 |
| Design Load | 8400 | 0.423 | 0.257 | 0.386 | 0.250 | 0.330 | 0.201 | 0.241 |
| 13 | 9100 | 0.440 | 0.274 | 0.406 | 0.270 | 0.351 | 0.222 | 0.260 |
| 14 | 9800 | 0.451 | 0.285 | 0.427 | 0.291 | 0.368 | 0.239 | 0.279 |
| 15 | 10500 | 0.471 | 0.309 | 0.448 | 0.312 | 0.387 | 0.258 | 0.298 |
| 16 | 11200 | 0.491 | 0.325 | 0.468 | 0.332 | 0.405 | 0.276 | 0.316 |
| 17 | 11900 | 0.512 | 0.346 | 0.494 | 0.358 | 0.429 | 0.300 | 0.341 |
| 18 | 14000 | 0.569 | 0.393 | 0.553 | 0.417 | 0.482 | 0.353 | 0.396 |

Temp. and Humidity During Construction: 70° F./50%
Temp. and Humidity During Test: 70° F./48%
Sample Description: ¾ inch SCP panel fastened to 16 gauge - 8 inch steel joists
Mode of failure: The butt-joints on the load side of the floor at end #1 opened up causing core failure to the cement board around the screws along the joint. The screws along the end joist at end #1 pulled through the cement board due to core
*The resultant deflection is equal to the average deflection of the bearings minus the greatest point of deflection across the clear span.

TABLE 33

Floor Diaphragm Test (Wet Test 2)

| Load Increment | Load (lbs.) | Bearing Points Indicator #1 Reading | Deflection | Indicator #5 Reading | Deflection | AVERAGE BEARING DEFLECTION |
|---|---|---|---|---|---|---|
| No Load | 0 lbs | 0.075 | — | 0.110 | — | — |
| 1 | 700 lbs. | 0.077 | 0.002 | 0.110 | 0.000 | 0.001 |
| 2 | 1400 | 0.078 | 0.003 | 0.110 | 0.000 | 0.002 |
| 3 | 2100 | 0.078 | 0.003 | 0.111 | 0.001 | 0.002 |
| 4 | 2800 | 0.078 | 0.003 | 0.111 | 0.001 | 0.002 |
| 5 | 3500 | 0.079 | 0.004 | 0.112 | 0.002 | 0.003 |
| 6 | 4200 | 0.079 | 0.004 | 0.112 | 0.002 | 0.003 |
| 7 | 4900 | 0.080 | 0.005 | 0.113 | 0.003 | 0.004 |
| 8 | 5600 | 0.083 | 0.008 | 0.113 | 0.003 | 0.006 |
| 9 | 6300 | 0.084 | 0.009 | 0.114 | 0.004 | 0.007 |
| 10 | 7000 | 0.086 | 0.011 | 0.115 | 0.005 | 0.008 |
| 11 | 7700 | 0.087 | 0.012 | 0.115 | 0.005 | 0.009 |
| Design Load | 8400 | 0.089 | 0.014 | 0.115 | 0.005 | 0.010 |
| 13 | 9100 | 0.090 | 0.015 | 0.116 | 0.006 | 0.011 |
| 14 | 9800 | 0.092 | 0.017 | 0.118 | 0.008 | 0.013 |
| 15 | 10500 | 0.095 | 0.020 | 0.119 | 0.009 | 0.015 |

TABLE 33-continued

Floor Diaphragm Test (Wet Test 2)

| Load Increment | Load (lbs.) | Bearing Points | | | | AVERAGE BEARING DEFLECTION |
|---|---|---|---|---|---|---|
| | | Indicator #1 | | Indicator #5 | | |
| | | Reading | Deflection | Reading | Deflection | |
| 16 | 11200 | 0.097 | 0.022 | 0.120 | 0.010 | 0.016 |
| 17 | 11900 | 0.099 | 0.024 | 0.120 | 0.010 | 0.017 |
| 18 | 14000 | 0.105 | 0.030 | 0.123 | 0.013 | 0.022 |

Bearing Indictors 2, 3 and 4 (labeled "Clear Span") of Table 32 are the instruments along the test specimen in the area between the support points at the two opposed ends of the frame.
Bearing Indicators 1 and 5 of Table 33 are at the support points of this test specimen.

TABLE 34

Water Absorption Results - ¾ inch thick SCP panel

| Specimen | Weight Before Soak | Weight After Soak | Weight Gain | Weight Gain Percentage |
|---|---|---|---|---|
| A | 2069.0 g | 2082.3 g | 13.3 g | 0.6% |
| B | 2109.1 g | 2112.6 g | 3.5 g | 0.2% |
| C | 2145.0 g | 2149.9 g | 4.9 g | 0.2% |
| Average Water Absorption | | | | 0.3% |

This data is for moisture content tests done on specimens A, B and C which are 12 inch × 12 inch specimens of the SCP panel of the composition tested in the above "Wet" and "Dry" tests.
In the moisture content tests the specimens are soaked 24 hours under a two inch head of water.

TABLE 35

Moisture Content ¾ inch thick SCP panel

| Specimen | Weight After Drying (g) | Before Soak Test | | | After Soak Test | | |
|---|---|---|---|---|---|---|---|
| | | Weight of samples before soak (g) | Weight Loss (g) | Weight Loss Percentage | Weight of samples after soak (g) | Weight Loss (g) | Weight Loss Percentage |
| A | 1801.9 | 2069.0 | 267.1 | 12.9% | 2082.3 | 280.4 | 13.5% |
| B | 1875.5 | 2109.1 | 230.6 | 10.9% | 2112.6 | 234.1 | 11.1% |
| C | 1904.5 | 2145.0 | 240.5 | 11.2% | 2149.9 | 245.4 | 11.4% |
| Average Moisture Content | | | | 11.7% | | | 12.0% |

TABLE 36

Board Expansion ¾ inch thick SCP panel (dimensions in inches)

| Specimen | Width 1 | Width 2 | Thick 1 | Thick 2 | Thick 3 | Thick 4 |
|---|---|---|---|---|---|---|
| A - Before Soak | 12.146 | 11.907 | 0.717 | 0.715 | 0.697 | 0.704 |
| A - After Soak | 12.146 | 11.907 | 0.717 | 0.715 | 0.697 | 0.704 |
| Difference | 0.000 | 0.000 | 0.000 | 0.000 | 0.000 | 0.000 |
| B - Before Soak | 12.072 | 11.940 | 0.710 | 0.740 | 0.732 | 0.715 |
| B - After Soak | 12.072 | 11.940 | 0.710 | 0.740 | 0.732 | 0.715 |
| Difference | 0.000 | 0.000 | 0.000 | 0.000 | 0.000 | 0.000 |
| C - Before Soak | 12.065 | 11.970 | 0.755 | 0.740 | 0.730 | 0.750 |
| C - After Soak | 12.065 | 11.970 | 0.755 | 0.740 | 0.730 | 0.750 |
| Difference | 0.000 | 0.000 | 0.000 | 0.000 | 0.000 | 0.000 |

Example 8

To determine the shear strength and shear stiffness of a floor diaphragm assembly using steel framing and SCP sheathing a test according to the AISI TS-7-02 Cantilever Test Method for Cold-Formed Steel Diaphragms was performed on ten (10) specimens.

Figure 26:
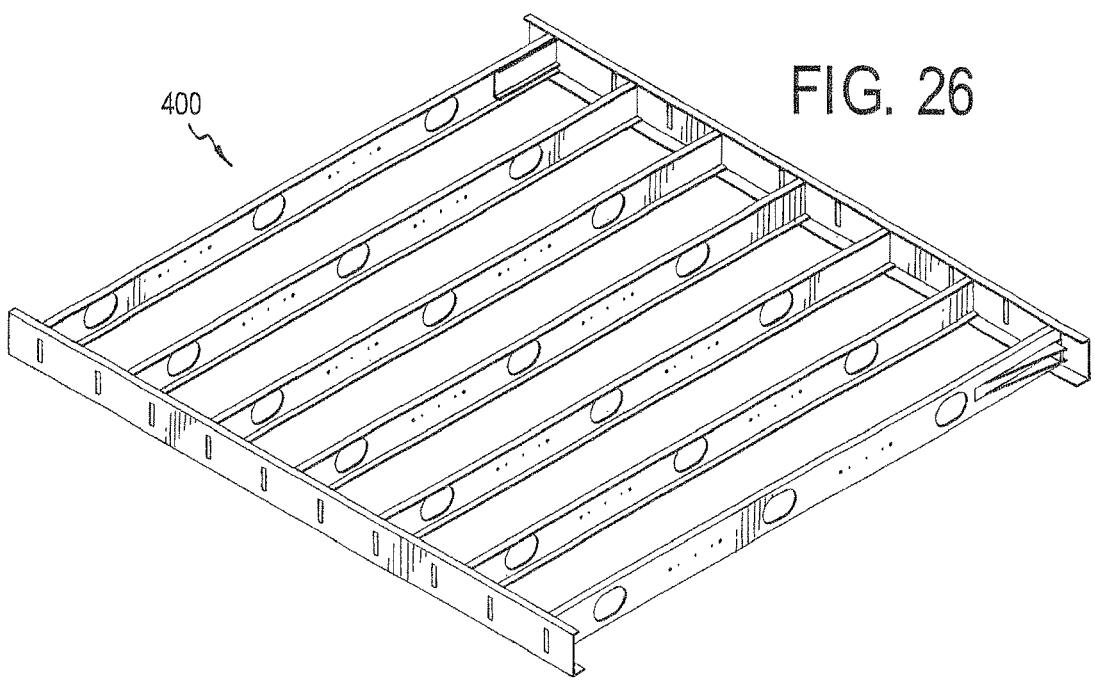
FIG. 26 shows a floor framing used in the AISI TS-7 tests.

FIG. 26 shows a floor framing 400 used in the AISI TS-7 tests.

Floor Diaphragm Materials

Prototype ¾" SCP—Structural Cement Panel reinforced with fiberglass strands. A "V"-groove and tongue is located along the 8' dimension of the 4'×8' sheets.

¾" Plywood—$^{23}/_{32}$" GP Plus, Tongue and Groove (Quick Fit). APA Rated Sturd-1-Floor™, Exposure 1, PS1-95 Underlayment, Sanded Face, PRP-108 and manufactured by Georgia Pacific Corporation.

Fasteners—#8—18×1⅝" 1 g., winged driller Bugle head Grabber Super Drive™ (Lox drive) screws, Item No. CHS8158JBW spaced 4", 6" and 12" o.c. along the perimeter, and 12" o.c. in the field of the panels. All fasteners were placed a minimum of ¾" in from panel edges and ½" in from seams. At panel corners the fasteners were inset 2".

Adhesive—PL Polyurethane Premium Construction Adhesive, manufactured by OSI Sealants. A ¼" bead was applied to all framing members with a double bead applied at panel butt-joints. A minimum of 24 hours of cure time was provided prior to any loading.

Floor Framing

Joists—16 ga.×10" deep×10' long Trade Ready™ Joists manufactured by Dietrich Industries. The joists were stamped Dietrich TDJ5 W 9-¼IN×L 11 FT 10½IN 14453223 16 GAUGE G60 50KSI. The average tested yield strength was 51.0 ksi.

Rim Track—16 ga.×10³⁄₁₆"deep×16' long with pre-bent joist attachment locations spaced at 24" o.c. The track was stamped Dietrich D16 W 9-¼IN×L 16FT 14453203 16 GAUGE G60. The average tested yield strength was 62.7 ksi.

Fasteners—#10-16×¾" long hex-head, Drivall screws.

Test Specimen Construction

Ten (10) test samples were constructed to an overall dimension of 11'-11"×12'-0". The rim track had the prebent tabs at 16" o.c. so, clip angles were welded at the 24" o.c. spacing.

The joists were attached to the track using three (3) hex-head #10-16×¾" lg. Drivall screws into the side of the joist through the pre-bent tab. A Simpson Strong-Tie Holdown Part No. S/HD15 was fastened to the Tension side of the floor using 48-#10×¾" lg. hex-head self-drilling screws. A 6-⅛"×16" lg., 12 ga stud was attached to the compression joist using (14)-#10×¾" long hex-head self-drilling screws. This was added as a stiffener to avoid crushing the end joist prior to diaphragm failure. The frame was squared and then the prototype SCP or plywood was fastened to it. The floor sheathing was fastened at 4", 6" or 12" o.c. around the perimeter inset 2" from the corners, and 12" o.c. in the field with #8-18×1⅝" lg. Bugle head Grabber Super Drive™ screws. Care was taken to ensure that the fasteners were kept flush or slightly below the surface of the floor sheathing and also did not strip out in the steel framing. See attached drawings no. B6-B11 for details. The test samples using adhesive were allowed to set for a minimum of 24 hours to provide the recommended adhesive to cure.

FIG. 27 shows one of the SCP Floors 420 used in the AISI TS-7 tests with adhesive placement. The boards 442 were SCP panels having 0.670 inch-0.705 inch thickness. View EE shows offset panels at a joint. View FF shows "V"-shaped ½ inch tongue and groove joint. View GG shows a corner. View HH shows where three SCP panels meet. View II shows a corner.

Test Set-Up

Figure 28:
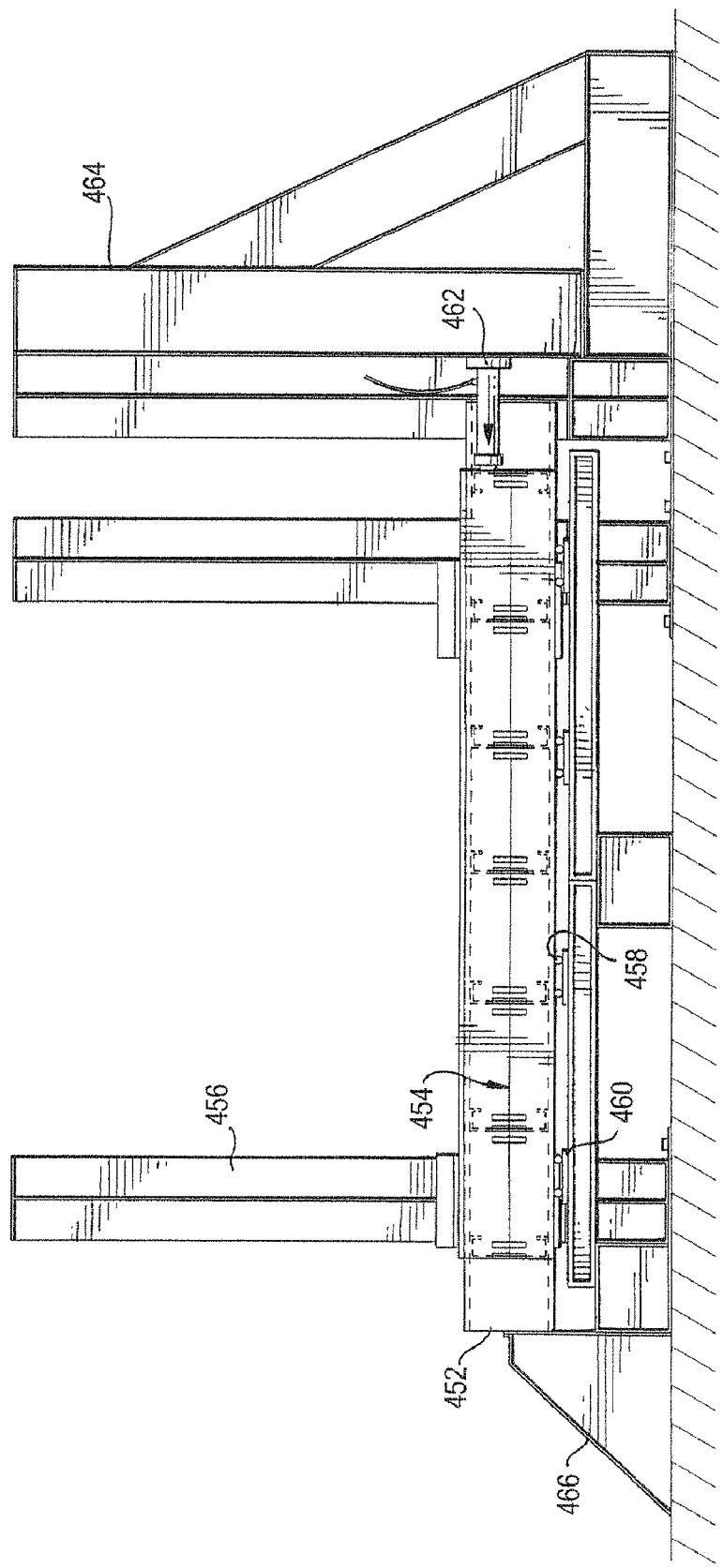
FIG. 28 shows the testing apparatus used in the AISI TS-7 tests.

FIG. 28 shows the testing apparatus 450 used in the AISI TS-7 tests. Test apparatus 450 has two 8 inch×72 inch long loading beams 454. A test specimen 452 is placed on 1 inch rollers 458 a steel plate 460 is provided under the rollers 458. A rigid bearing 466 and test fixture 456 and I-beam fixture are also provided. A hydraulic cylinder 462 applies pressure to the test specimen 452.

The test sample was positioned in the test fixture with one of the rim tracks set flush to the top of a 10"-30 lb./ft. C-channel. The rim track was then attached to the C-channel using a #12-24, T5 hex head screws spaced 12" o.c. Two (2) 8"×72" long I-beams were then attached to the other rim track, flush to the top, using #10×¾" long hex-head self-drilling screws. The fasteners were set 6" o.c. alternating sides of the I-beam flange. The I-beams were also bolted together. A hydraulic cylinder was positioned on a reaction beam in-line with the I-beams.

1" diameter threaded rod was placed thru the Simpson Holdown and connected to the rigid steel fixture. No specific torque was applied to the coupling nuts on the threaded rod. The rim track on the load side was positioned on double sets of rollers spaced approximately 48" apart. A hold down was placed over the sheathing on the compression side to prevent uplift. Two (2) 1" diameter rollers were Placed between the hold down tube and a steel plate on the floor sheathing.

Four (4) Linear transducers were placed on floor diaphragms assembly in the following locations:
1—In-line with the Tension Joist,
2—In-line with the fixed rim track,
3—In-line with the loaded rim track on a clip angle, and
4—In-line with the Compression Joist.

The Linear transducers and hydraulic pressure transducer were connected to a data acquisition system.

Test Equipment: Four (4) Linear transducers were placed on floor diaphragms assembly in the following locations:

One (1) ENERPAC Model P-39 hydraulic hand pumps.
Three (3) ENERPAC Model RC-1010 hydraulic cylinders.
Four (4) Linear transducers.
Five (5) rigid bearings bolted to floor.
One (1) C10×30 rigid channel bolted to three (3) of the bearings.
One (1) OMEGA digital meter.
One (1) OMEGA pressure transducer.
Two (2) 6 ft. I-beams.

Procedure

The loads were generated using a hydraulic cylinder, at the load point. The applied forces were measured with data acquisition equipment, and a pressure transducer. A permanent record of the applied forces was made on the attached data sheets. The loads were generated by applying hydraulic pressure to create mechanical force until the required load was indicated on the digital meter. The entire floor assembly was loaded in at a constant rate until no further gain in load could be attained.

Test Results

TABLE 37 summarizes the test results.

TABLE 37

Summary of Tests Nos. 1-10 Specimen: ¾" Prototype SCP (T&G) fastened to 16 ga. Steel Joists, set 24" o. c., with #8 × 1⅝" screws with various spacing around the perimeter and 12" o.c. in the field.

| Test No. | Fastener Perimeter | Spacing Field | Adhesive to Framing | Sn Shear Strength (plf) | G' Shear Stiffness (plf) |
|---|---|---|---|---|---|
| 1 | 4" | 12" | No | 623.9 | 241,328 |
| 2 | | | | 637.9 | 178,433 |
| 3 | | | | 783.3 | 147,670 |
| 4 | 6" | 12" | No | 699.0 | 202,407 |
| 5 | | | | 544.8 | 121,526 |
| 6 | | | | 711.4 | 107,653 |
| 10 Plywood | | | | 527.9 | 78,880 |
| 7 | 4" | 12" | Yes | 1886.0 | 581,716 |
| 8 | 6" | | | 1612.5 | 803,716 |
| 9 | 12" | | | 1327.0 | 432,444 |

The rows defined in the failure descriptions are #1-#3 with #1 the load side and Spacing Field. See FIGS. 27-30 for details.

Figure 29:
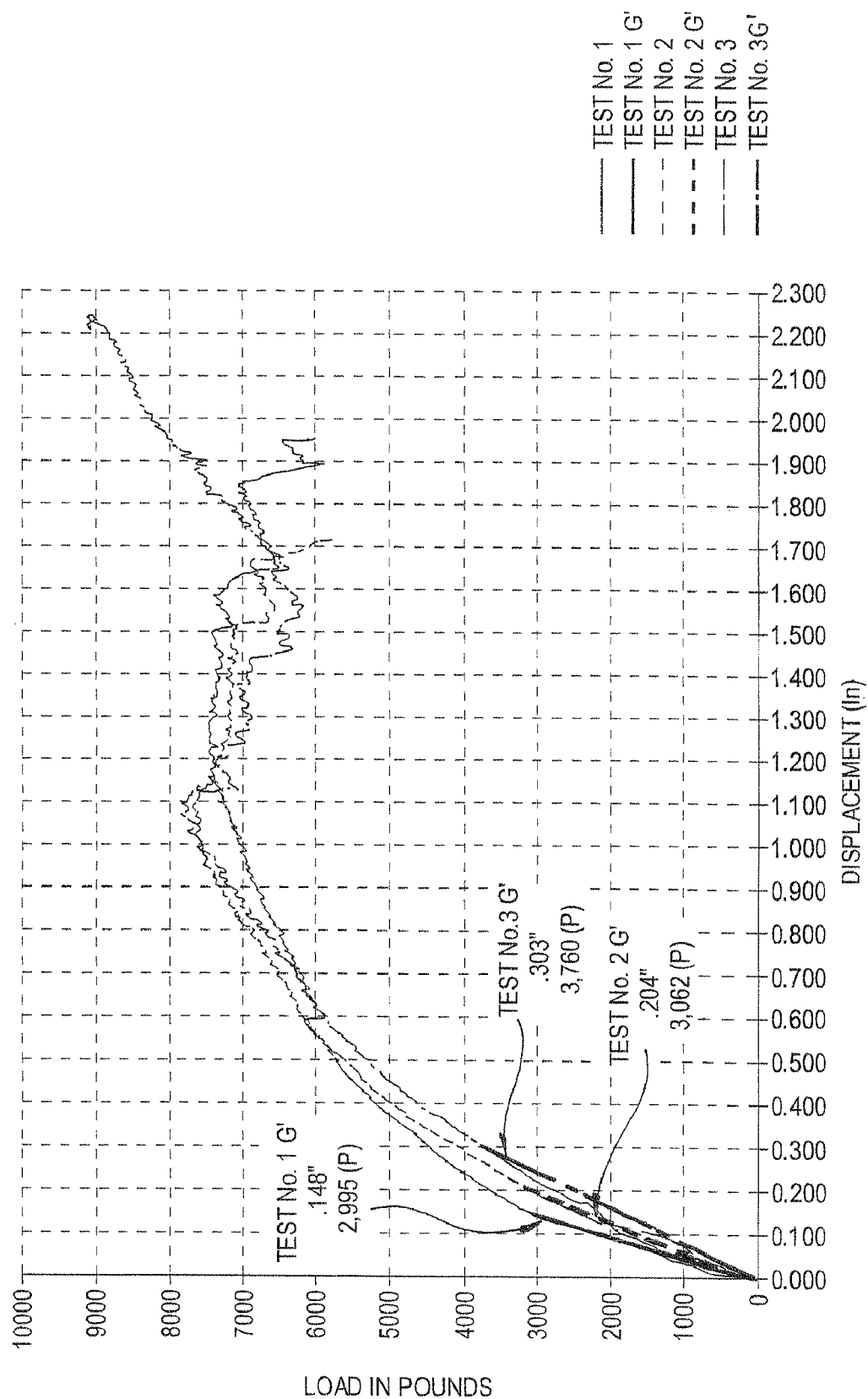
FIG. 29 shows data from AISI TS-7 Cantilever Floor Diaphragm test using ¾ inch SCP panel with a 4 inch-12 inch fastening schedule.
Figure 30:
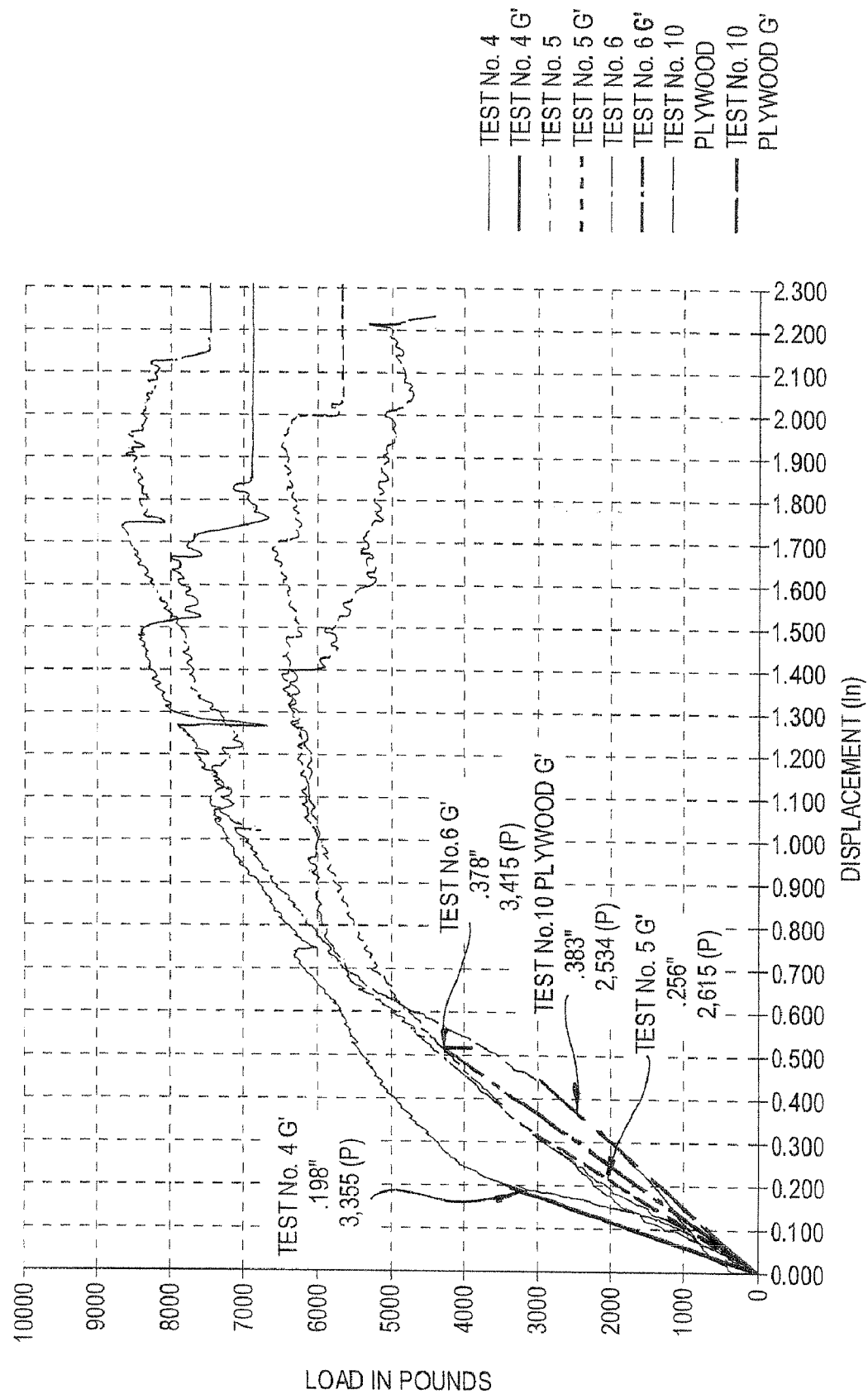
FIG. 30 shows data from AISI TS-7 Cantilever Floor Diaphragm test using ¾ inch SCP panel compared to ¾ inch plywood with a 6 inch-12 inch fastening schedule.
Figure 31:
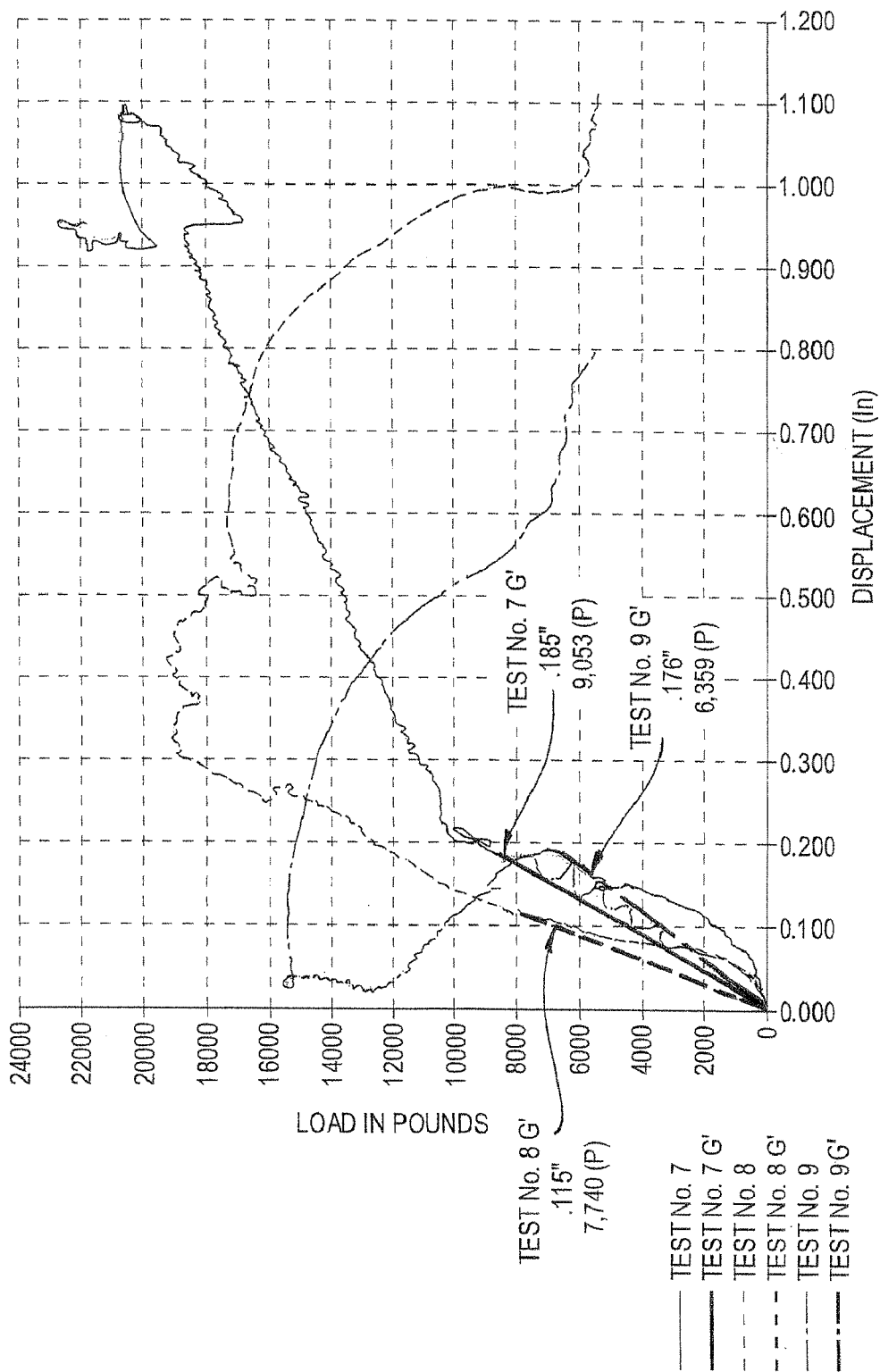
FIG. 31 shows data from AISI TS-7 Cantilever Floor Diaphragm test using ¾ inch SCP panel with adhesive.

FIGS. 29-31 show Load in Pounds v. Displacement data used to generate the values in TABLE 43. In particular, FIG. 29 shows data from AISI TS-7 Cantilever Floor Diaphragm test using ¾ inch SCP panel with a 4 inch-12 inch fastening schedule. FIG. 30 shows data from AISI TS-7 Cantilever Floor Diaphragm test using ¾ inch SCP panel compared to ¾ inch plywood with a 6 inch-12 inch fastening schedule. FIG. 31 shows data from AISI TS-7 Cantilever Floor Diaphragm test using ¾ inch SCP panel with adhesive.

TABLES 38-47 show in table form the data of FIGS. 29, 30 and 31 for Test LP 804-3-0.001 inch increments.

TABLE 38

Test No. 1: Specimen: ¾" SCP (T&G) fastened to 16 ga. Steel Joists, set 24" o.c., with #8 × 1⅝" screws spaced 4" o.c. around the perimeter and 12" o.c. in the field.

| Load in Pounds | Deflection in Inches-Indicator Number | | | | Net Shear |
|---|---|---|---|---|---|
| (lbf) | 1 | 2 | 3 | 4 | Deflection |
| 0 | 0.000 | 0.000 | 0.000 | 0.000 | 0.000 |
| 214 | 0.001 | −0.001 | 0.015 | 0.012 | 0.003 |
| 500 | 0.001 | −0.003 | 0.041 | 0.032 | 0.012 |
| 723 | 0.002 | −0.004 | 0.061 | 0.043 | 0.019 |
| 982 | 0.004 | −0.006 | 0.089 | 0.046 | 0.045 |
| 1205 | 0.005 | −0.006 | 0.109 | 0.049 | 0.061 |

TABLE 38-continued

Test No. 1: Specimen: ¾" SCP (T&G) fastened to 16 ga. Steel Joists, set 24" o.c., with #8 × 1⅝" screws spaced 4" o.c. around the perimeter and 12" o.c. in the field.

| Load in Pounds | Deflection in Inches-Indicator Number | | | | Net Shear |
|---|---|---|---|---|---|
| (lbf) | 1 | 2 | 3 | 4 | Deflection |
| 1481 | 0.007 | −0.007 | 0.132 | 0.052 | 0.080 |
| 1704 | 0.008 | −0.007 | 0.147 | 0.055 | 0.091 |
| 1945 | 0.009 | −0.006 | 0.159 | 0.057 | 0.099 |
| 2204 | 0.011 | −0.004 | 0.180 | 0.061 | 0.113 |
| 2489 | 0.012 | −0.003 | 0.194 | 0.063 | 0.122 |
| 2739 | 0.013 | 0.000 | 0.211 | 0.066 | 0.131 |
| 2980 | 0.015 | 0.004 | 0.237 | 0.070 | 0.148 |
| 3230 | 0.017 | 0.008 | 0.259 | 0.074 | 0.160 |
| 3498 | 0.018 | 0.013 | 0.295 | 0.079 | 0.185 |
| 3739 | 0.020 | 0.016 | 0.328 | 0.083 | 0.210 |
| 3997 | 0.022 | 0.020 | 0.365 | 0.087 | 0.237 |
| 4229 | 0.023 | 0.023 | 0.407 | 0.093 | 0.269 |
| 4488 | 0.025 | 0.025 | 0.445 | 0.096 | 0.299 |
| 4729 | 0.027 | 0.029 | 0.493 | 0.100 | 0.338 |
| 4961 | 0.028 | 0.033 | 0.531 | 0.104 | 0.367 |
| 5247 | 0.030 | 0.044 | 0.600 | 0.109 | 0.418 |
| 5461 | 0.031 | 0.050 | 0.645 | 0.112 | 0.452 |
| 5746 | 0.033 | 0.054 | 0.710 | 0.115 | 0.509 |
| 5987 | 0.035 | 0.059 | 0.768 | 0.119 | 0.556 |
| 2,995 (P) | 0.015 | 0.004 | 0.237 | 0.070 | 0.148 |

Test Conditions: 70° F.; 41% Relative Humidity
Diaphragm Width 143 inches; Diaphragm Length 144 inches; Load Time (min:sec): 7:46
Ultimate Load (Pn) = 7,486 lbs.; P = 0.4(Pn) = 2,995 lbs.
Shear Strength (Sn) = 623.9; Shear Stiffness (G') = 241,328 plf
Failure: SCP failure on row #2 on the compression side around the screws. Both T&G edges shifted due to screw shear and rotation into the SCP (typically limited to the fasteners at or within 12" of the T&G). SCP corner break on row #1 on the tension side at the T&G location. Corner Break on all, but two, of row number 2 panels. Row #3 corner break at compression side T and G location.

TABLE 39

Test No. 2: Specimen: ¾" SCP (T&G) fastened to 16 ga. Steel Joists, set 24" o.c., with #8 × 1⅝" screws spaced 4" o.c. around the perimeter and 12" o.c. in the field.

| Load in Pounds | Deflection in Inches-Indicator Number | | | | Net Shear |
|---|---|---|---|---|---|
| (lbf) | 1 | 2 | 3 | 4 | Deflection |
| 0 | .000 | .000 | .000 | .000 | 0.000 |
| 232 | .002 | .003 | .051 | .047 | −0.001 |
| 500 | .003 | .009 | .134 | .114 | 0.009 |
| 732 | .005 | .012 | .171 | .129 | 0.027 |
| 991 | .006 | .015 | .187 | .132 | 0.036 |
| 1196 | .007 | .019 | .212 | .136 | 0.051 |
| 1472 | .008 | .025 | .253 | .138 | 0.083 |
| 1722 | .009 | .032 | .284 | .142 | 0.103 |
| 1981 | .010 | .039 | .312 | .145 | 0.119 |
| 2222 | .012 | .046 | .342 | .150 | 0.136 |
| 2480 | .013 | .053 | .370 | .153 | 0.152 |
| 2739 | .015 | .061 | .410 | .157 | 0.179 |
| 2989 | .016 | .067 | .446 | .161 | 0.203 |
| 3167 | .016 | .073 | .469 | .163 | 0.217 |
| 3471 | .018 | .080 | .506 | .167 | 0.242 |
| 3702 | .019 | .084 | .530 | .170 | 0.258 |
| 3988 | .021 | .090 | .572 | .175 | 0.289 |
| 4238 | .022 | .094 | .604 | .177 | 0.312 |
| 4479 | .023 | .099 | .639 | .179 | 0.340 |
| 4684 | .024 | .103 | .668 | .182 | 0.361 |
| 4987 | .026 | .109 | .725 | .184 | 0.407 |
| 5219 | .027 | .113 | .761 | .188 | 0.435 |
| 5478 | .028 | .118 | .812 | .191 | 0.476 |
| 5745 | .029 | .122 | .870 | .197 | 0.523 |

TABLE 39-continued

Test No. 2: Specimen: ¾" SCP (T&G) fastened to 16 ga. Steel Joists, set 24" o.c., with #8 × 1⅝" screws spaced 4" o.c. around the perimeter and 12" o.c. in the field.

| Load in Pounds | Deflection in Inches-Indicator Number | | | | Net Shear |
|---|---|---|---|---|---|
| (lbf) | 1 | 2 | 3 | 4 | Deflection |
| 5950 | .031 | .127 | .928 | .201 | 0.570 |
| 3,062 (P) | .016 | .069 | .450 | .162 | 0.204 |

Test Conditions: 67° F.; 45% Relative Humidity
Diaphragm Width 143 inches; Diaphragm Length 144 inches; Load Time (min:sec):
Ultimate Load (Pn) = 7,655 lbs.; P = 0.4(Pn) = 3,062 lbs.
Shear Strength (Sn) = 637.9; Shear Stiffness (G') = 178,433 plf
Failure: SCP failure on row #2 on the compression side around the screws. Both T&G edges shifted due to screw shear and rotation into the SCP (typically limited to the fasteners at or within 12" of the T&G). SCP corner break on row #1 on the tension side at the T&G location. Corner Break on row #2 and Row #3 at the compression side T&G location.

TABLE 40

Test No. 3: Specimen: ¾" SCP (T&G) fastened to 16 ga. Steel Joists, set 24" o.c., with #8 × 1⅝" screws spaced 4" o.c. around the perimeter and 12" o.c. in the field.

| Load in Pounds | Deflection in Inches-Indicator Number | | | | Net Shear |
|---|---|---|---|---|---|
| (lbf) | 1 | 2 | 3 | 4 | Deflection |
| 0 | .000 | .000 | .000 | .000 | .000 |
| 232 | .001 | .007 | .069 | .059 | .002 |
| 499 | .003 | .012 | .115 | .090 | .010 |
| 749 | .005 | .018 | .152 | .096 | .033 |
| 972 | .005 | .023 | .174 | .100 | .047 |
| 1240 | .007 | .030 | .210 | .104 | .070 |
| 1489 | .009 | .038 | .238 | .106 | .086 |
| 1703 | .010 | .044 | .270 | .108 | .109 |
| 1980 | .011 | .052 | .302 | .109 | .131 |
| 2194 | .012 | .058 | .331 | .111 | .151 |
| 2471 | .013 | .064 | .365 | .112 | .177 |
| 2729 | .014 | .068 | .391 | .113 | .196 |
| 2979 | .016 | .074 | .425 | .114 | .223 |
| 3247 | .017 | .080 | .464 | .116 | .252 |
| 3416 | .019 | .083 | .486 | .117 | .268 |
| 3737 | .020 | .089 | .531 | .119 | .303 |
| 3960 | .021 | .092 | .562 | .121 | .330 |
| 4228 | .024 | .096 | .601 | .123 | .359 |
| 4442 | .025 | .100 | .628 | .127 | .378 |
| 4728 | .026 | .106 | .675 | .130 | .415 |
| 4968 | .027 | .108 | .711 | .131 | .446 |
| 5236 | .029 | .111 | .773 | .137 | .497 |
| 5495 | .030 | .115 | .821 | .139 | .538 |
| 5655 | .031 | .118 | .856 | .140 | .568 |
| 5932 | .033 | .119 | .902 | .143 | .608 |
| 3,760 (P) | .020 | .089 | .531 | .119 | .303 |

Test Conditions: 67° F.; 45% Relative Humidity
Diaphragm Width 143 inches; Diaphragm Length 144 inches; Load Time
Ultimate Load (Pn) = 9,399 lbs.; P = 0.4(Pn) = 3,760 lbs.
Shear Strength (Sn) = 783.9; Shear Stiffness (G') = 147,670 plf
Failure: SCP failure on row #2 on the compression side around the screws. Both T&G edges shifted due to screw shear and rotation into the SCP (typically limited to the fasteners at or within 12" of the T&G). SCP corner break on row #1 on the tension side at the T&G location. Butt-Joint separation on row #2 with SCP failure around the fasteners.

TABLE 41

Test No. 4: Specimen: ¾" SCP (T&G) fastened to 16 ga. Steel Joists, set 24" o.c., with #8 × 1⅝" screws spaced 6" o.c. around the perimeter and 12" o.c. in the field.

| Load in Pounds (lbf) | Deflection in Inches-Indicator Number | | | | Net Shear Deflection |
|---|---|---|---|---|---|
| | 1 | 2 | 3 | 4 | |
| 0 | .000 | .000 | .000 | .000 | .000 |
| 232 | .000 | .003 | .038 | .016 | .019 |
| 473 | .001 | .006 | .075 | .023 | .046 |
| 714 | .002 | .008 | .111 | .028 | .073 |
| 982 | .004 | .011 | .146 | .032 | .098 |
| 1231 | .005 | .015 | .174 | .036 | .118 |
| 1499 | .007 | .018 | .196 | .041 | .131 |
| 1749 | .008 | .022 | .217 | .045 | .144 |
| 1981 | .009 | .025 | .234 | .050 | .151 |
| 2249 | .012 | .032 | .261 | .057 | .162 |
| 2481 | .012 | .035 | .277 | .059 | .171 |
| 2668 | .013 | .040 | .294 | .064 | .177 |
| 2998 | .015 | .047 | .313 | .066 | .184 |
| 3230 | .016 | .051 | .328 | .070 | .191 |
| 3498 | .017 | .056 | .348 | .070 | .205 |
| 3730 | .019 | .061 | .377 | .073 | .224 |
| 3980 | .020 | .067 | .411 | .076 | .248 |
| 4229 | .022 | .072 | .444 | .079 | .272 |
| 4488 | .023 | .079 | .498 | .083 | .314 |
| 4747 | .023 | .083 | .553 | .085 | .364 |
| 4997 | .025 | .088 | .617 | .088 | .417 |
| 5238 | .026 | .092 | .672 | .090 | .465 |
| 5470 | .028 | .095 | .751 | .093 | .536 |
| 5720 | .029 | .100 | .858 | .097 | .633 |
| 5987 | .030 | .104 | .900 | .098 | .669 |
| 3,355 (P) | .017 | .053 | .337 | .070 | .198 |

Test Conditions: 70° F.; 41% Relative Humidity
Diaphragm Width 143 inches; Diaphragm Length 144 inches; Load Time (min:sec):
Ultimate Load (Pn) = 8,387 lbs.; P = 0.4(Pn) = 3,355 lbs.
Shear Strength (Sn) = 699.0; Shear Stiffness (G') = 202,407 plf
Failure: All butt-joints separated with SCP failure around the fasteners. Fastener shear and rotation into the SCP along both T&G edges (typically limited to the fasteners at or within 12" of the T&G). SCP failure around fasteners on Row #2 at the compression side. SCP corner breaks along both T&G edges.

TABLE 42

Test No. 5: Specimen: ¾" SCP (T&G) fastened to 16 ga. Steel Joists, set 24" o.c., with #8 × 1⅝" screws spaced 6" o.c. around the perimeter and 12" o.c. in the field.

| Load in Pounds (lbf) | Deflection in Inches-Indicator Number | | | | Net Shear Deflection |
|---|---|---|---|---|---|
| | 1 | 2 | 3 | 4 | |
| 0 | .000 | .000 | .000 | .000 | .000 |
| 249 | .001 | .001 | .016 | .001 | .013 |
| 490 | .001 | .001 | .039 | .005 | .032 |
| 748 | .002 | .000 | .067 | .011 | .054 |
| 980 | .004 | .000 | .093 | .016 | .073 |
| 1239 | .006 | .000 | .127 | .023 | .098 |
| 1471 | .008 | .000 | .148 | .028 | .113 |
| 1721 | .009 | .000 | .173 | .032 | .134 |
| 1997 | .011 | −.001 | .212 | .036 | .167 |
| 2184 | .012 | −.001 | .250 | .042 | .199 |
| 2416 | .012 | −.001 | .278 | .044 | .225 |
| 2746 | .014 | −.001 | .336 | .047 | .276 |
| 2961 | .015 | −.002 | .378 | .049 | .316 |
| 3237 | .015 | −.002 | .420 | .052 | .354 |
| 3487 | .017 | −.002 | .463 | .056 | .391 |
| 3746 | .019 | −.003 | .508 | .060 | .433 |
| 3978 | .021 | −.004 | .553 | .063 | .474 |
| 4209 | .022 | −.004 | .587 | .065 | .505 |
| 4477 | .022 | −.004 | .640 | .070 | .553 |
| 4718 | .025 | −.005 | .681 | .072 | .590 |
| 4977 | .026 | .001 | .767 | .078 | .622 |
| 5209 | .027 | .007 | .850 | .081 | .736 |
| 5494 | .029 | .012 | .928 | .084 | .804 |
| 2,615 (P) | .013 | −.001 | .314 | .045 | .256 |

Test Conditions: 70° F.; 38% Relative Humidity
Diaphragm Width 143 inches; Diaphragm Length 144 inches; Load Time (min:sec): 5:28
Ultimate Load (Pn) = 6,538 lbs.; P = 0.4(Pn) = 2,615 lbs.
Shear Strength (Sn) = 544.8 plf; Shear Stiffness (G') = 121,526 plf
Failure: Row #3 butt-joint separation with SCP failure around the fasteners. Fastener shear and rotation into the SCP along Row #1-2 T&G edge (typically limited to the fasteners at or within 12" of the T&G). SCP failure around fasteners on Row #2 at the compression side. SCP corner breaks along both T&G edges.

TABLE 43

Test No. 6 Specimen: ¾" SCP (T&G) fastened to 16 ga. Steel Joists, set 24" o.c., with #8 × 1⅝" screws spaced 6" o.c. around the perimeter and 12" o.c. in the field.

| Load in Pounds (lbf) | Deflection in Inches-Indicator Number | | | | Net Shear Deflection |
|---|---|---|---|---|---|
| | 1 | 2 | 3 | 4 | |
| 0 | .000 | .000 | .000 | .000 | .000 |
| 223 | .001 | .003 | .023 | .011 | .008 |
| 482 | .003 | .011 | .066 | .011 | .042 |
| 749 | .003 | .020 | .099 | .011 | .066 |
| 999 | .004 | .027 | .135 | .011 | .094 |
| 1240 | .005 | .037 | .180 | .011 | .128 |
| 1499 | .007 | .045 | .220 | .011 | .157 |
| 1749 | .009 | .053 | .263 | .011 | .190 |
| 1972 | .010 | .062 | .298 | .011 | .216 |
| 2239 | .012 | .072 | .339 | .011 | .244 |
| 2480 | .013 | .079 | .375 | .011 | .272 |
| 2748 | .014 | .087 | .411 | .011 | .299 |
| 2988 | .017 | .096 | .453 | .011 | .330 |
| 3203 | .018 | .103 | .489 | .011 | .357 |
| 3479 | .019 | .111 | .532 | .011 | .391 |
| 3702 | .021 | .117 | .563 | .011 | .414 |
| 3997 | .022 | .125 | .608 | .011 | .451 |
| 4237 | .023 | .131 | .650 | .011 | .486 |
| 4469 | .025 | .135 | .685 | .011 | .514 |
| 4701 | .026 | .142 | .724 | .011 | .546 |
| 4951 | .027 | .148 | .778 | .011 | .593 |
| 5236 | .029 | .154 | .837 | .011 | .643 |
| 5477 | .030 | .158 | .885 | .011 | .687 |
| 5700 | .032 | .164 | .941 | .011 | .735 |
| 5941 | .033 | .167 | .985 | .011 | .775 |
| 3,415 (P) | .019 | .108 | .515 | .011 | .378 |

Test Conditions: 70° F.; 38% Relative Humidity
Diaphragm Width 143 inches; Diaphragm Length 144 inches; Load Time (min:sec): 6:02
Ultimate Load (Pn) = 8,537 lbs.; P = 0.4(Pn) = 3,415 lbs.
Shear Strength (Sn) = 711.4 plf; Shear Stiffness (G') = 107,653 plf
Failure: Row #2&3 butt-joint separation with SCP failure around the fasteners. Fastener shear and rotation into the SCP along Row #2-3 T&G edge 8' in from compression and the remaining 4' shifted along Row #1-2 T&G edge (typically limited to the fasteners at or within 12" of the T&G). SCP failure around fasteners on Row #2&3 at the compression side. SCP corner breaks along both T&G edges.

TABLE 44

Test No. 7: Specimen: ¾" SCP (T&G) fastened to 16 ga. Steel Joists, set 24" o.c., with #8 × 1⅝" screws spaced 4" o.c. around the perimeter and 12" o.c. in the field.

| Load in Pounds (lbf) | Deflection in Inches-Indicator Number | | | | Net Shear Deflection |
|---|---|---|---|---|---|
| | 1 | 2 | 3 | 4 | |
| 0 | .000 | .000 | .000 | .000 | .000 |
| 446 | .000 | .004 | .028 | .010 | .014 |
| 981 | −.001 | .008 | .049 | .016 | .026 |
| 1472 | −.002 | .014 | .068 | .019 | .037 |
| 1980 | −.004 | .019 | .086 | .022 | .049 |
| 2480 | −.002 | .025 | .103 | .024 | .057 |
| 2962 | −.001 | .028 | .119 | .027 | .065 |
| 3497 | .001 | .032 | .169 | .030 | .106 |
| 3987 | .004 | .040 | .178 | .035 | .100 |
| 4478 | .005 | .046 | .196 | .040 | .105 |
| 4978 | .008 | .052 | .226 | .046 | .119 |
| 5459 | .011 | .060 | .259 | .052 | .137 |
| 5995 | .013 | .066 | .276 | .056 | .141 |
| 6414 | .015 | .071 | .314 | .063 | .165 |
| 6985 | .018 | .077 | .322 | .070 | .158 |
| 7466 | .021 | .083 | .342 | .076 | .163 |
| 7957 | .025 | .088 | .383 | .085 | .187 |
| 8483 | .027 | .094 | .403 | .093 | .190 |
| 8956 | .040 | .109 | .506 | .172 | .186 |
| 9483 | .044 | .113 | .544 | .185 | .204 |
| 9920 | .053 | .158 | .597 | .185 | .203 |
| 10401 | .057 | .160 | .623 | .185 | .224 |
| 10919 | .063 | .164 | .702 | .185 | .293 |
| 11400 | .068 | .169 | .734 | .185 | .314 |
| 11909 | .073 | .172 | .774 | .185 | .346 |
| 9,053 (P) | .040 | .109 | .507 | .174 | .185 |

Test Conditions: 69° F.; 44% Relative Humidity
Diaphragm Width 143 inches; Diaphragm Length 144 inches; Load Time (min:sec): 10:14
Ultimate Load (Pn) = 22,631 lbs.; P = 0.4(Pn) = 9,053 lbs.
Shear Strength (Sn) = 1,886.0 plf; Shear Stiffness (G') = 581,716 plf
Failure: Adhesion failure to SCP along bearing side of the floor (Row #3) near the tension side. Fastener pull-through along the same edge. The tension joist was severely deformed around the Simpson Strong-Tie connection.

TABLE 45

Test No. 8: Specimen: ¾" SCP (T&G) fastened to 16 ga. Steel Joists, set 24" o.c., with #8 × 1⅝" screws spaced 6" o.c. around the perimeter and 12" o.c. in the field.

| Load in Pounds (lbf) | Deflection in Inches-Indicator Number | | | | Net Shear Deflection |
|---|---|---|---|---|---|
| | 1 | 2 | 3 | 4 | |
| 0 | .000 | .000 | .000 | .000 | .000 |
| 421 | .010 | .013 | .074 | .008 | .043 |
| 992 | .016 | .025 | .118 | .020 | .057 |
| 1483 | .024 | .040 | .156 | .024 | .068 |
| 1964 | .029 | .054 | .179 | .023 | .073 |
| 2446 | .033 | .064 | .192 | .021 | .074 |
| 2892 | .038 | .074 | .205 | .020 | .073 |
| 3463 | .042 | .085 | .220 | .019 | .074 |
| 3963 | .046 | .092 | .232 | .019 | .075 |
| 4444 | .050 | .101 | .251 | .019 | .080 |
| 4962 | .056 | .111 | .269 | .020 | .083 |
| 5452 | .061 | .121 | .286 | .020 | .085 |
| 5916 | .067 | .130 | .310 | .021 | .093 |
| 6478 | .072 | .141 | .333 | .021 | .099 |
| 6978 | .076 | .149 | .350 | .021 | .104 |
| 7477 | .081 | .157 | .371 | .021 | .113 |
| 7879 | .085 | .164 | .386 | .021 | .116 |
| 8485 | .091 | .173 | .411 | .021 | .126 |
| 8985 | .095 | .181 | .429 | .021 | .133 |
| 9413 | .100 | .191 | .447 | .021 | .135 |
| 9913 | .106 | .201 | .472 | .021 | .146 |
| 10394 | .111 | .210 | .496 | .021 | .155 |
| 10903 | .115 | .218 | .519 | .021 | .166 |
| 11438 | .119 | .227 | .544 | .021 | .178 |
| 11946 | .126 | .242 | .578 | .021 | .191 |
| 7,740 (P) | .084 | .161 | .380 | .021 | .115 |

Test Conditions: 73° F.; 45% Relative Humidity
Diaphragm Width 143 inches; Diaphragm Length 144 inches; Load Time (min:sec): 5:45
Ultimate Load (Pn) = 19,351 lbs.; P = 0.4(Pn) = 7,740 lbs.
Shear Strength (Sn) = 1,612.5 plf; Shear Stiffness (G') = 803,716 plf
Failure: Adhesion failure to SCP along bearing side of the floor (Row #3) near the tension side. Fastener pull-through and SCP failure around the fasteners along the same edge. The tension joist was severely deformed around the Simpson Strong-Tie connection.

TABLE 46

Test No. 9: Specimen: ¾" SCP (T&G) fastened to 16 ga. Steel Joists, set 24" o.c., with #8 × 1⅝" screws spaced 12" o.c. around the perimeter and 12" o.c. in the field.

| Load in Pounds (lbf) | Deflection in Inches-Indicator Number | | | | Net Shear Deflection |
|---|---|---|---|---|---|
| | 1 | 2 | 3 | 4 | |
| 0 | .000 | .000 | .000 | .000 | .000 |
| 170 | .002 | .002 | .035 | −.002 | .033 |
| 455 | .007 | .006 | .068 | −.008 | .063 |
| 750 | .013 | .009 | .084 | −.011 | .074 |
| 901 | .017 | .015 | .097 | −.013 | .078 |
| 1214 | .024 | .022 | .116 | −.017 | .086 |
| 1499 | .035 | .032 | .145 | −.021 | .099 |
| 1722 | .041 | .038 | .166 | −.023 | .109 |
| 1972 | .051 | .050 | .191 | −.024 | .115 |
| 2159 | .056 | .056 | .209 | −.023 | .119 |
| 2471 | .065 | .065 | .231 | −.020 | .121 |
| 2685 | .071 | .071 | .248 | −.018 | .123 |
| 2953 | .077 | .081 | .267 | −.014 | .124 |
| 3212 | .081 | .087 | .286 | −.010 | .129 |
| 3497 | .084 | .093 | .298 | −.008 | .130 |
| 3729 | .088 | .099 | .317 | −.003 | .134 |
| 3934 | .090 | .105 | .330 | .000 | .135 |
| 4113 | .091 | .109 | .337 | .002 | .136 |
| 4416 | .095 | .117 | .361 | .009 | .142 |
| 4719 | .098 | .124 | .380 | .014 | .145 |
| 4925 | .100 | .129 | .393 | .018 | .147 |
| 5246 | .103 | .136 | .409 | .024 | .147 |
| 5495 | .106 | .145 | .425 | .031 | .145 |
| 5736 | .110 | .150 | .460 | .036 | .165 |
| 5995 | .113 | .156 | .477 | .041 | .169 |
| 6,369 (P) | .116 | .161 | .496 | .045 | .176 |

Test Conditions: 73° F.; 45% Relative Humidity
Diaphragm Width 143 inches; Diaphragm Length 144 inches; Load Time (min:sec): 4:19
Ultimate Load (Pn) = 15,924 lbs.; P = 0.4(Pn) = 6,369 lbs.
Shear Strength (Sn) = 1,327.0 plf; Shear Stiffness (G') = 432,444 plf
Failure: Adhesion failure to SCP along bearing side of the floor (Row #3). Fastener pull-through and shear along the same edge. The tension joist was severely deformed around the Simpson Strong-Tie connection. The fastener shear near the compression side of the floor.

TABLE 47

Test No. 10 Specimen: ¾" Plywood (T&G) fastened to 16 ga. Steel Joists, set 24" o.c., with #8 × 1⅝" screws spaced 6" o.c. around the perimeter and 12" o.c. in the field.

| Load in Pounds (lbf) | Deflection in Inches-Indicator Number | | | | Net Shear Deflection |
|---|---|---|---|---|---|
| | 1 | 2 | 3 | 4 | |
| 0 | .000 | .000 | .000 | .000 | .000 |
| 223 | .008 | −.003 | .058 | .061 | −.008 |

TABLE 47-continued

Test No. 10 Specimen: ¾" Plywood (T&G) fastened to 16 ga. Steel Joists, set 24" o.c., with #8 × 1⅝" screws spaced 6" o.c. around the perimeter and 12" o.c. in the field.

| Load in Pounds (lbf) | Deflection in Inches-Indicator Number | | | | Net Shear Deflection |
|---|---|---|---|---|---|
| | 1 | 2 | 3 | 4 | |
| 491 | .010 | .003 | .109 | .081 | .016 |
| 723 | .011 | .007 | .152 | .083 | .051 |
| 973 | .012 | .013 | .219 | .087 | .107 |
| 1222 | .013 | .017 | .276 | .089 | .158 |
| 1481 | .015 | .023 | .335 | .092 | .206 |
| 1722 | .016 | .027 | .392 | .095 | .255 |
| 1990 | .018 | .034 | .455 | .098 | .307 |
| 2231 | .020 | .039 | .498 | .100 | .340 |
| 2489 | .021 | .046 | .552 | .104 | .383 |
| 2713 | .023 | .052 | .593 | .106 | .413 |
| 2971 | .025 | .058 | .634 | .110 | .442 |
| 3203 | .026 | .063 | .669 | .112 | .470 |
| 3498 | .027 | .069 | .709 | .115 | .498 |
| 3748 | .028 | .074 | .737 | .117 | .519 |
| 3971 | .030 | .079 | .769 | .120 | .542 |
| 4238 | .031 | .086 | .810 | .124 | .569 |
| 4444 | .033 | .091 | .836 | .127 | .586 |
| 4658 | .033 | .095 | .860 | .130 | .602 |
| 4988 | .035 | .102 | .903 | .134 | .633 |
| 5220 | .035 | .107 | .933 | .137 | .655 |
| 5479 | .038 | .112 | .971 | .139 | .683 |
| 5711 | .038 | .116 | 1.018 | .143 | .722 |
| 5960 | .039 | .121 | 1.156 | .146 | .850 |
| 2,534 (P) | .021 | .046 | .552 | .104 | .383 |

Test Conditions: 68° F.; 43% Relative Humidity
Diaphragm Width 143 inches; Diaphragm Length 144 inches; Load Time (min:sec): 6:43
Ultimate Load (Pn) = 6,335 lbs.; P = 0.4(Pn) = 2,534 lbs.
Shear Strength (Sn) = 527.9 plf; Shear Stiffness (G') = 78,880 plf
Failure: Fastener shear and rotation into the Plywood along Row #1-2 T&G edge, on row #2 side 6 feet in from compression and the remaining 6 feet shifted on Row #1 T&G edge (typically limited to the fasteners at or within 12" of the T&G). Plywood failure around fasteners on Row #2 at the compression side.

While particular embodiments of the system employing a horizontal or sloped diaphragm of fiber-reinforced structural cement panels on a metal frame has been shown and described, it will be appreciated by those skilled in the art that changes and modifications may be made thereto without departing from the invention in its broader aspects and as set forth in the following claims.

What is claimed is:

1. A method for providing a building structure with a roofing system by making the roofing system as a roof of the building structure, said roofing system comprising:
    a sloped or flat shear diaphragm supported on light gauge cold rolled metal framing of the building structure,
    the shear diaphragm comprising a reinforced, lightweight, dimensionally stable cementitious panel and the framing comprising metal roofing elements;
    the cementitious panel having a density of 65 to 90 pounds per cubic foot and capable of resisting shear loads when fastened to the framing and comprising a continuous phase resulting from the curing of an aqueous mixture comprising, on a dry basis,
    49 to 68 weight % blend of reactive powders,
    23 to 36.1 weight % uniformly distributed lightweight filler particles, and
    5 to 20 weight % alkali-resistant glass fibers, and
    optional superplasticizer,
    the continuous phase being uniformly reinforced with the alkali-resistant glass fibers, and
    the lightweight filler particles comprising uniformly distributed ceramic microspheres, the lightweight filler particles having a particle specific gravity of from 0.02 to 1.00 and an average particle size of about 10 to 500 microns (micrometers),
    wherein the blend of reactive powders comprises:
        45 to 75 wt. % calcium sulfate alpha hemihydrate,
        20 to 40 wt. % Portland cement,
        0.2 to 3.5 wt. % lime, and
        5 to 25 wt. % of an active pozzolan comprising silica fume; and
    said making of the roofing system comprising:
    placing the cementitious panel on said metal roofing elements and
    attaching the cementitious panel to the metal roofing elements,
    wherein the system has a horizontal design shear capacity of the roof shear diaphragm of 300 to 1000 pounds per linear foot;
    wherein the cementitious panels are attached to the metal roofing elements with metal screws with winged drillers, the winged drillers are located above the point and below the first threads of the screw and protruding laterally from a shaft of the screw.

2. The method of claim 1, further including attaching a layer of Type X fire rated gypsum wallboard to a side of the frame opposed to said shear diaphragm to form a second diaphragm,
    wherein Type X fire rated gypsum wallboard is only on the one side of the frame opposed to the shear diaphragm, the cementitious panel being above the metal framing and the Type X wallboard being below the framing.

3. The method of claim 1, wherein water is added to form the aqueous mixture in a range of between 35 to 70% by weight of reactive powder.

4. A non-combustible roofing system for construction comprising:
    a sloped or flat shear diaphragm supported on light gauge cold rolled metal framing, the shear diaphragm comprising a reinforced, lightweight, dimensionally stable cementitious panel and the framing comprising metal roofing elements;
    the cementitious panel having a density of 65 to 90 pounds per cubic foot and capable of resisting shear loads when fastened to framing and comprising a continuous phase resulting from the curing of an aqueous mixture comprising, on a dry basis,
    49 to 68 weight % blend of reactive powders,
    23 to 36.1 weight % uniformly distributed lightweight filler particles, and
    5 to 20 weight % alkali-resistant glass fibers, and
    optional superplasticizer,
    the continuous phase being uniformly reinforced with the alkali-resistant glass fibers, and
    the lightweight filler particles comprising uniformly distributed ceramic microspheres, the lightweight filler particles having a particle specific gravity of from 0.02 to 1.00 and an average particle size of about 10 to 500 microns (micrometers),
    wherein the blend of reactive powders comprises:
        45 to 75 wt. % calcium sulfate alpha hemihydrate,
        20 to 40 wt. % Portland cement,
        0.2 to 3.5 wt. % lime, and
        5 to 25 wt. % of an active pozzolan comprising silica fume;
    wherein the cementitious panel is attached to the metal roofing elements by screws to provide a shear load bearing roofing system, wherein the system has a horizontal design shear capacity of the roof shear diaphragm of 300 to 1000 pounds per linear foot, wherein the cementitious panel has a thickness of about ½ to 1½ inches, wherein the screws are metal screws with winged drillers, the winged drillers located above the point and below the first threads of the screw and protruding laterally from a shaft of the screw.

5. The system of claim 4, further comprising a layer of Type X fire rated gypsum wallboard attached to a side of the frame opposed to said shear diaphragm to form a second diaphragm, and wherein the Type X fire rated gypsum wallboard is only on the one side of the frame opposed to the shear diaphragm.

6. The system of claim 4, wherein the ceramic microspheres have a mean particle size from 50 to 250 microns and/or fall within a particle size range of 10 to 500 microns, the ceramic microspheres having a particle density of 0.50 to 0.80 g/mL.

7. The system of claim 4, wherein the aqueous mixture consists of, on a dry basis:
  58 to 68 wt. % reactive powders,
  6 to 17 wt. % glass fibers, and
  23 to 34 wt. % lightweight filler particles, and
  optional superplasticizer,
  wherein said lightweight filler particles consist of ceramic microspheres and up to 1.0 wt. % filler particles selected from the group consisting of glass microspheres, fly ash cenospheres or perlite, and
  wherein the reactive powders consist of, each on a dry basis,
    65 to 75 wt. % calcium sulfate alpha hemihydrate,
    20 to 25 wt. % Portland cement,
    0.75 to 1.25 wt. % lime, and
    10 to 15 wt. % of silica fume active pozzolan.

8. The system of claim 7, wherein the aqueous mixture contains, on a dry basis, 7 to 12 wt. % of the glass fibers, and wherein the shear diaphragm is supported on light gauge cold rolled metal framing comprising metal joists.

9. The system of claim 7,
  wherein the ceramic microspheres have at least one feature selected from the group consisting of a mean particle size from 50 to 250 microns and falling within a particle size range of 10 to 500 microns,
  wherein the panels are ½ inch (12.5 mm) thick, and the system having the ½ inch (12.5 mm) thick panels fastened to said light gauge cold rolled metal frame when tested according to ASTM D-1761-88, effective 1988 (reapproved 2000), has a dry lateral screw resistance of 350 to 550 pounds,
  wherein the glass fibers are monofilaments having a diameter of about 5 to 25 microns (micrometers) and a length of about 0.25 to 3 inches (6.3 to 76 mm),
  wherein the flexural strength of a said panel having a dry density of 65 lb/ft³ to 95 lb/ft³ (1041 to 1522 kg/m³) after being soaked in water for 48 hours is at least 1650 psi (11.4 MPa) as measured by the ASTM C 947-03 test, effective 2003,
  wherein the system has a horizontal design shear capacity of the floor diaphragm of 400 to 1000 pounds per linear foot.

10. The system of claim 4, wherein the filler also comprises uniformly distributed glass microspheres and/or fly ash cenospheres having an average diameter of about 10 to 350 microns (micrometers).

11. The system of claim 4, wherein the aqueous composition consists of, on a dry basis:
  54 to 58 wt. % of the reactive powders,
  5 to 15 wt. % of the glass fibers, wherein the glass fibers are monofilaments having a diameter of about 5 to 25 microns (micrometers) and a length of about 0.25 to 3 inches (6.3 to 76 mm),
  33.8 to 36.1 wt. % of the lightweight filler particles consisting of ceramic microspheres and up to 1.0 wt. % of the glass microspheres, the ceramic microspheres having a particle density of 0.50 to 0.80 g/mL, and
  optional superplasticizer.

12. The system of claim 4, wherein the cementitious panel comprises a core comprising the continuous phase resulting from the curing of an the aqueous mixture, and
  further comprising at least one outer layer, each said outer layer comprising a second continuous phase resulting from the curing of a second aqueous mixture comprising, on a dry basis,
    49 to 68 weight % a second blend of reactive powders,
    23 to 36.1 weight % uniformly distributed lightweight filler particles
    comprising uniformly distributed ceramic microspheres, and
    5 to 20 weight % uniformly distributed alkali-resistant glass fibers, and
    optional superplasticizer,
  the second blend of reactive powders comprising, on a dry basis,
    45 to 75 wt. % calcium sulfate alpha hemihydrate,
    20 to 40 wt. % Portland cement,
    0.2 to 3.5 wt. % lime, and
    5 to 25 wt. % of an active pozzolan comprising silica fume,
  the second continuous phase being uniformly reinforced with the alkali-resistant glass fibers, and the lightweight filler particles comprising ceramic microspheres having a particle specific gravity of from 0.02 to 1.00 and an average particle size of about 10 to 500 microns (micrometers),
  at least one outer layer having reduced phase density relative to the core, wherein each outer layer has a thickness of about $\frac{1}{32}$ to $\frac{4}{32}$ inches (0.8 to 3.2 mm).

13. The system of claim 12, wherein the second aqueous mixture the outer layer(s) has been formed from comprises, each on a dry basis:
  58 to 68 wt. % of the reactive powders,
  6 to 10 wt. % of the glass fibers, up to 1.0 wt. % of glass microspheres having an average diameter of about 10 to 350 microns (micrometers), and
  23 to 34 wt. % of the lightweight filler particles comprising ceramic microspheres.

14. The system of claim 4, wherein the cementitious panel thickness is ¾ inch and the ¾ inch (19 mm) thick cementitious panel when tested according to ASTM 661-88 and APA S-1 test methods effective 1988 (reapproved 1997) and effective Aug. 12, 1980, respectively, over a span of 16 inches (406.4 mm) on centers, has an ultimate load capacity greater than 550 lb (250 kg), under static loading, an ultimate load capacity greater than 400 lb (182 kg) under impact loading, and a deflection of less than 0.078 inches (1.98 mm) under both static and impact loading with a 200 lb (90.9 kg) load.

15. The system of claim 4, wherein the flexural strength of a cementitious panel having a dry density of 65 lb/ft³ to 95 lb/ft³ after being soaked in water for 48 hours is at least 1650 psi as measured by the ASTM C 947-03 test, effective 2003.

16. The system of claim 4, wherein the blend of reactive powders consists of:
- 65 to 75 wt. % calcium sulfate hemihydrate,
- 20 to 25 wt. % Portland cement,
- 0.75 to 1.25 wt. % lime, and
- 10 to 15 wt. % silica fume active pozzolan.

17. The system of claim 4, wherein the panels are ¾ inch (19 mm) thick and the horizontal shear diaphragm load carrying capacity of the system will not be lessened by more than 25% when exposed to water in a test wherein a 2 inch head of water is maintained over ¾ inch thick cementitious panels fastened on a 10 foot by 20 foot metal frame for a period of 24 hours.

18. The system of claim 4, wherein the cementitious panel comprises:
- a core layer comprising the continuous phase, the continuous phase comprising 5 to 17 wt % glass fibers, on a dry basis, and
- at least one outer layer of respectively a second continuous phase resulting from the curing of an aqueous mixture comprising, on a dry basis,
- 49 to 68 weight % second blend of reactive powder,
- 23 to 36.1 weight percent lightweight filler comprising ceramic microspheres, and
- 7 to 20 weight % alkali-resistant glass fibers, and
- optional superplasticizer;
- the second continuous phase being reinforced with glass fibers and containing the lightweight filler particles, the lightweight filler particles having a particle specific gravity of from 0.02 to 1.00 and an average particle size of about 10 to 500 microns (micrometers) on each opposed side of the inner layer,
- wherein the at least one outer layer has a higher percentage of glass fibers than the inner layer.

19. The system of claim 4, wherein the system comprises a sloped roof comprising said cementitious panel attached to a corrugated metal sheet, said metal sheet attached to said metal framing.

20. The system of claim 4, wherein the system comprises a flat roof comprising said cementitious panel and Type X fire rated gypsum wallboard attached to a corrugated metal sheet, said metal sheet attached to said metal framing.

21. The system of claim 4, wherein the system has a horizontal design shear capacity of the roof diaphragm of 400 to 800 pounds per linear foot.

* * * * *

UNITED STATES PATENT AND TRADEMARK OFFICE
CERTIFICATE OF CORRECTION

PATENT NO. : 8,065,852 B2
APPLICATION NO. : 12/916565
DATED : November 29, 2011
INVENTOR(S) : Timothy D. Tonyan et al.

Page 1 of 1

It is certified that error appears in the above-identified patent and that said Letters Patent is hereby corrected as shown below:

Title Page, correct Item (75) Inventors, to read:

--(75) Inventors: Timothy D. Tonyan, Wheaton, IL (US);
James M. Ullett, McHenry, IL (US);
James E. Reicherts, Gary, IL (US);
Ashish Dubey, Grayslake, IL (US)--

Signed and Sealed this
Twenty-first Day of April, 2015

Michelle K. Lee
*Director of the United States Patent and Trademark Office*